(12) United States Patent
Lemay et al.

(10) Patent No.: US 11,163,569 B2
(45) Date of Patent: Nov. 2, 2021

(54) HARDWARE APPARATUSES, METHODS, AND SYSTEMS FOR INDIVIDUALLY REVOCABLE CAPABILITIES FOR ENFORCING TEMPORAL MEMORY SAFETY

(71) Applicant: Intel Corporation, Santa Clara, CA (US)

(72) Inventors: Michael Lemay, Hillsboro, OR (US); Vedvyas Shanbhogue, Austin, TX (US); Deepak Gupta, Portland, OR (US); Ravi Sahita, Portland, OR (US); David M. Durham, Beaverton, OR (US); Willem Pinckaers, San Francisco, CA (US); Enrico Perla, Centallo (IT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,358

(22) Filed: Dec. 28, 2019

(65) Prior Publication Data
US 2021/0200546 A1    Jul. 1, 2021

(51) Int. Cl.
*G06F 16/90* (2019.01)
*G06F 12/14* (2006.01)
(Continued)

(52) U.S. Cl.
CPC ........ *G06F 9/30145* (2013.01); *G06F 9/3836* (2013.01); *G06F 9/449* (2018.02); *G06F 9/468* (2013.01); *G06F 16/9017* (2019.01)

(58) Field of Classification Search
CPC ........ G06F 3/06; G06F 12/14; G06F 12/1009; G06F 11/00; G06F 16/9017
See application file for complete search history.

(56) References Cited

U.S. PATENT DOCUMENTS 5,809,564 A * 9/1998 Craze .................... G06F 12/023
                                                   711/208
9,436,847 B2   9/2016 Durham et al.
(Continued)

OTHER PUBLICATIONS https://courses.cs.washington.edu/courses/cse351/17wi/lectures/CSE351-L02-memory-I_17wi.pdf Author: Ceze; Title: CSE351: Memory, Data, & Addressing I, Date: Winter, 2017 (Year: 2017).*
(Continued)

*Primary Examiner* — David E Martinez
(74) *Attorney, Agent, or Firm* — Nicholson De Vos Webster & Elliott LLP

(57) ABSTRACT

Systems, methods, and apparatuses relating to circuitry to implement individually revocable capabilities for enforcing temporal memory safety are described. In one embodiment, a hardware processor comprises an execution unit to execute an instruction to request access to a block of memory through a pointer to the block of memory, and a memory controller circuit to allow access to the block of memory when an allocated object tag in the pointer is validated with an allocated object tag in an entry of a capability table in memory that is indexed by an index value in the pointer, wherein the memory controller circuit is to clear the allocated object tag in the capability table when a corresponding object is deallocated.

24 Claims, 55 Drawing Sheets

US 11,163,569 B2
Page 2

(51) Int. Cl.

| | | |
|---|---|---|
| *G06F 12/1009* | (2016.01) | |
| *G06F 9/30* | (2018.01) | |
| *G06F 9/38* | (2018.01) | |
| *G06F 16/901* | (2019.01) | |
| *G06F 9/46* | (2006.01) | |
| *G06F 9/448* | (2018.01) | |

(56) References Cited

U.S. PATENT DOCUMENTS

| | | | |
|---|---|---|---|
| 10,162,694 B2* | 12/2018 | Stark | G06F 9/38 |
| 2018/0060250 A1* | 3/2018 | Hildesheim | G06F 12/1491 |
| 2018/0074715 A1* | 3/2018 | Farmahini-Farahani | G06F 13/00 |
| 2020/0004953 A1 | 1/2020 | Lemay et al. | |

OTHER PUBLICATIONS

BIIN: "CPA Architecture Reference Manual", 1988, 401 pages.
Burow et al., "CUP: Comprehensive User-Space Protection for C/C++", Session 9: Software Security, ASIACCS'18, Jun. 4-8, 2018, pp. 381-392.
Carr et al., "DataShield: Configurable Data Confidentiality and Integrity", ASIA CCS '17, Apr. 2-6, 2017, pp. 193-204.
Chen et al., "Shreds: Fine-grained Execution Units with Private Memory", IEEE Symposium on Security and Privacy, 2016, pp. 56-71.
Cheri, "Capability Hardware Enhanced RISC Instructions (CHERI)", available online at <https://www.cl.cam.ac.uk/research/security/ctsrd/cheri/>, 2010-2019, 2 pages.
Dartmouth, "ELFbac: Runtime Intent-Level ABI-Granular Memory Protection for Linux", available online at <https://www.cs.dartmouth.edu/~sergey/io/elfbac,/>, retrieved on May 1, 2020, 1 page.
Duck et al., "EffectiveSan: Type and Memory Error Detection using Dynamically Typed C/C++", PLDI'18, Jun. 18-22, 2018, pp. 181-195.
Gil et al., "There's a Hole in the Bottom of the C: On the Effectiveness of Allocation Protection", IEEE Cybersecurity Development (SecDev), Sep. 30-Oct. 2, 2018, 8 pages.
Gretton-Dann et al., "Arm A—Profile Architecture Developments 2018: Armv8.5-A", available online at <https://community.arm.com/developer/ip-products/processors/b/processors-ip-blog/posts/arm-a-profile-architecture-2018-developments-armv85a>, Sep. 17, 2018, 5 pages.
Jeon et a., "HexType: Efficient Detection of Type Confusion Errors for C++", CCS '17, Session K3: Program Analysis, Oct. 2017, pp. 2373-2387.
Kwon et al., "Low-Fat Pointers: Compact Encoding and Efficient Gate-Level Implementation of Fat Pointers for Spatial Safety and Capability-based Security", Proceedings of the 2013 ACM SIGSAC Conference on Computer & Communications Security, 2013, pp. 721-732.
Liljestrand et al., "PAC it up: Towards Pointer Integrity using ARM Pointer Authentication", Cornell University, Nov. 22, 2018, 21 pages.

LogMeIn Support, "What is Privilege Separation in SSH?", available online at <https://web.archive.org/web/20191218064501/https://help.logmein.com/articles/en_US/FAQ/What-is-Privilege-Separation-in-SSH-en1>, Dec. 18, 2019, 1 page.
M. Rutland, "ARMv8.3 Pointer Authentication",, Linux Security Summit, Sep. 14, 2017, 24 slides.
McIlroy et al., "Spectre is Here to Stay: An Analysis of Side-Channels and Speculative Execution", Cornell University, Feb. 15, 2019, pp. 1-26.
Menon et al., "Shakti-T: A RISC-V Processor with Light Weight Security Extensions", Conference: the Hardware and Architectural Support for Security and Privacy, Jun. 25, 2017, 9 pages.
Miller, Matt, "Trends, Challenges, and Strategic Shifts in the Software Vulnerability Mitigation Landscape", Microsoft Security Response Center (MSRC), Feb. 7, 2019, 32 pages.
Nagarakatte et al., "CETS: Compiler-Enforced Temporal Safety for C", ISMM 10, Jun. 5-6, 2010, pp. 31-40.
Qualcomm, "Pointer Authentication on ARMv8.3: Design and Analysis of the New Software Security Instructions", Jan. 2017, 12 pages.
Serebryany et al., "AddressSanitizer: A Fast Address Sanity Checker", 2012 Usenix Annual Technical Conference, Jun. 13-15, 2012, 10 pages.
Serebryany et al., "Memory Tagging and How It Improves C/C++ Memory Safety", Feb. 2018, 14 pages.
Serebryany et al., "Memory Tagging: How It Improves C/C++ Memory Safety" Google, LLVM Developers' Meeting, Oct. 2018, 29 slides.
Serebryany, Kostya, "Security: ARM Memory Tagging Extension and How It Improves C/C++ Memory Safety", vol. 44, No. 2, Summer 2019, pp. 12-16.
Suh et al., "Secure Program Execution via Dynamic Information Flow Tracking", ASPLOS'04, Oct. 9-13, 2004, pp. 85-96.
T. Nyman et al., "HardScope: Thwarting DOP attacks with Hardware-Assisted Run-time Scope Enforcement", May 2017, pp. 1-20.
The Chromium Projects, "Multi-Process Architecture", available online at <https://web.archive.org/web/20191030200549/https://www.chromium.org/developers/design-documents/multi-process-architecture>, Oct. 30, 2019, 2 pages.
Tsampas et al., "Towards Automatic Compartmentalization of C Programs on Capability Machines", In Proceedings of the International Conference on Foundations of Computer Science, 2017, 14 pages.
Vasilakis et al., "BreakApp: Automated, Flexible Application Compartmentalization", Network and Distributed Systems Security (NDSS) Symposium, Feb. 18-21, 2018, 15 pages.
Watson et al., "CHERI: A Hybrid Capability-System Architecture for Scalable Software Compartmentalization", IEEE Symposium on Security and Privacy, 2015, pp. 20-37.
Watson, "Capsicum: Practical capabilities for UNIX", USENIX Security, 2010, 17 pages.
Wesley et al., "Cornucopia: Temporal Safety for CHERI Heaps", . In Proceedings of the 41st IEEE Symposium on Security and Privacy, 2020, pp. 1507-1524.
Xia et al., "CHERIvoke: Characterising Pointer Revocation using CHERI Capabilities for Temporal Memory Safety", MICRO '52, Oct. 2019, pp. 545-557.

* cited by examiner

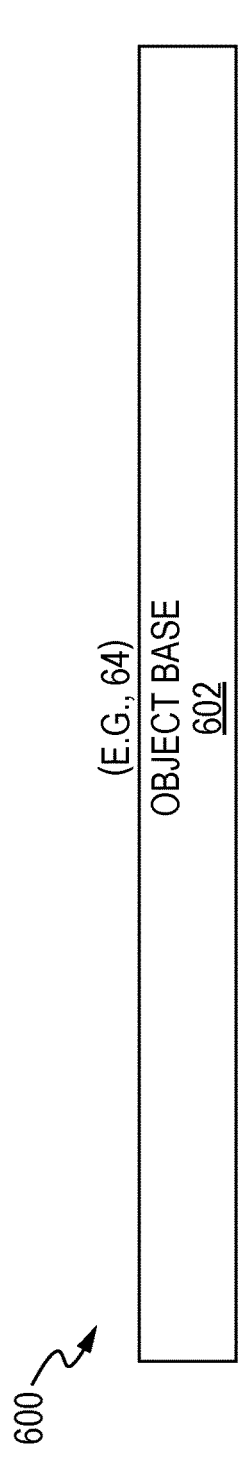
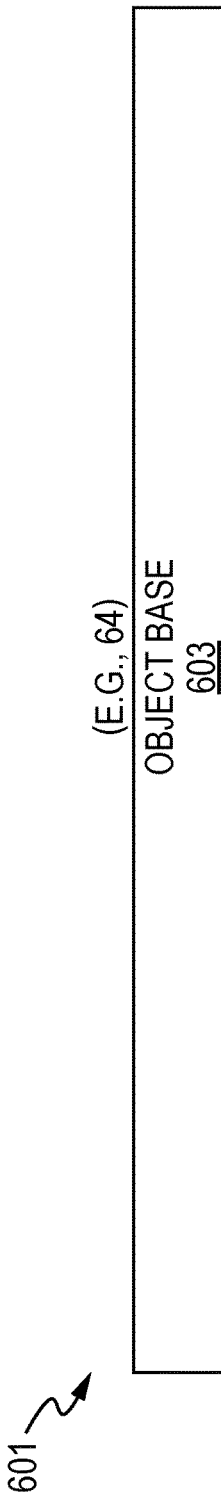

```
  enum statement_type t;
  int brDistance, val;
  int execed;
};
```

⟵ 700

```
define MAX_STMTS 50 struct script;

struct script {
  struct statement stmts[MAX_STMTS]; //< Parsed script statements.
  int stmt_ctr[PRIV_CMD]; //< Count the number of each type of non-privileged statements executed.
  int accum;
  int ip;
  // The next two variables are vulnerable to a buffer overflow of
  // stmts, but we focus on the effects of overwriting isPriv in this
  // sample program.
  void (*interpreter)(struct script *scr, struct statement *stmt);
  int isPriv;
} __attribute__((packed));

void interpret_statement(struct script *scr, struct statement *stmt) {
  if (stmt->t != PRIV_CMD) scr->stmt_ctr[stmt->t]++;

bool br = false;
  switch (stmt->t) {
  case QUIT:
    scr->ip = MAX_STMTS-1;
  case JE:
    br = scr->accum == stmt->val;
    break;
  case ADD:
    scr->accum += stmt->val;
    break;
  case PRIV_CMD:
    assert(scr->isPriv);
    printf("priv_cmd\n");
    // Imagine that this performs some privileged command.
    break;
  }
  if (br)
    scr->ip += stmt->brDistance;
  else
    scr->ip++;
  stmt->execed = true;
```

FIG. 7A

```
} void exec_script(struct script *scr) {
  printf("Generating a narrowed ZMS TBC for the statements array in the script:\n");
  // Narrowing the capability would mitigate the non-control data
  // vulnerability illustrated in this program if the capabilities
  // were actually enforced.
  zms_tbc_gen_cap((uintptr_t)scr->stmts, sizeof(scr->stmts));

while (scr->ip != MAX_STMTS) {
    struct statement *stmt = scr->stmts + scr->ip;
    scr->interpreter(scr, stmt);
  } printf("accum = %d\n", scr->accum);
}

/// Illustrate a non-control data vulnerability.
void init_and_exec_script(struct script *scr) {
  scr[0].interpreter = interpret_statement;
  memset(scr[0].stmt_ctr, 0, sizeof(scr[0].stmt_ctr));
  // Both scripts start out as unprivileged:
  scr[0].isPriv = 0;
  scr[0].ip = 0;
  scr[0].accum = 0;
  scr[0].stmts[0].t = ADD;
  scr[0].stmts[0].val = 42;
  scr[0].stmts[1].t = JE;
  scr[0].stmts[1].val = 42;
  // This results in the script ip being set to MAX_STMTS+1.
  //
  // The next statement to be executed is actually the contents
  // of the script structure starting at the ip field.
  //
  // The ip field does not match any statement type, so the
  // interpret_statement function just increments ip and
  // sets execed to 1. However, since the "statement" is
  // actually a portion of the script structure, the isPriv
  // field ends up getting set to 1. Script execution then
  // continues in the statements array for the next script
  // object...
  scr[0].stmts[1].brDistance = MAX_STMTS;

scr[1].interpreter = interpret_statement;
  memset(scr[1].stmt_ctr, 0, sizeof(scr[1].stmt_ctr));
```

FIG. 7B

```
  scr[1].isPriv = 0;
  scr[1].ip = 0;
  // The first statement executed a privileged command,
  // which is able to complete due to the isPriv field
  // in the first script structure being set to 1.
  scr[1].stmts[0].t = PRIV_CMD;
  scr[1].stmts[1].t = QUIT;

exec_script(scr);
} int main(int argc, const char *argv[]) {
  srand(time(NULL));

struct script *scr = malloc(2*sizeof(struct script));
  printf("Generating a ZMS TBC for the first heap allocation:\n");
  zms_tbc_gen_cap((uintptr_t)scr, 2*sizeof(struct script));
  init_and_exec_script(scr);
  free(scr);

scr = malloc(2*sizeof(struct script));
  printf("Generating a ZMS TBC for the second heap allocation:\n");
  zms_tbc_gen_cap((uintptr_t)scr, 2*sizeof(struct script));
  init_and_exec_script(scr);
  free(scr);

struct script stk_scr0[2];
  printf("Generating a ZMS TBC for the first stack allocation:\n");
  zms_tbc_gen_cap((uintptr_t)stk_scr0, 2*sizeof(struct script));
  init_and_exec_script(stk_scr0);

struct script stk_scr1[2];
  printf("Generating a ZMS TBC for the second stack allocation:\n");
  zms_tbc_gen_cap((uintptr_t)stk_scr1, 2*sizeof(struct script));
  init_and_exec_script(stk_scr1);

return 0;
}
```

Generating a ZMS IRC for the first heap allocation:

Generating ZMS IRC for allocation of size 680 at 00007fffe93e0260

ZMS IRC table entry @ 0:

Base: 00007fffe93e0260

Type TS bits  OffWidth Chunks X W R 00 001455d8    08 0067f 1 1 1

ZMS IRC pointer:

Ctx Tbl. idx. TS bits  Offset 2 00000000  1455d8   000

Generating a narrowed ZMS IRC for the statements array in the script:

Generating ZMS IRC for allocation of size 320 at 00007fffe93e0260

ZMS IRC table entry @ 1:

Base: 00007fffe93e0260

Type TS bits  OffWidth Chunks X W R 00 0027a53c    07 0031f 1 1 1

ZMS IRC pointer:

Ctx Tbl. idx. TS bits  Offset 2 00000001  27a53c   000 priv_cmd accum = 42

Generating a ZMS IRC for the second heap allocation:

Generating ZMS IRC for allocation of size 680 at 00007fffe93e0260

ZMS IRC table entry @ 2:

Base: 00007fffe93e0260

Type TS bits  OffWidth Chunks X W R 00 001a8cc7    08 0067f 1 1 1

ZMS IRC pointer:

Ctx Tbl. idx. TS bits  Offset 2 00000002  1a8cc7   000

Generating a narrowed ZMS IRC for the statements array in the script:

FIG. 8A

Generating ZMS TBC for allocation of size 320 at 00007fffe93e0260

ZMS TBC table entry @ 3:

Base: 00007fffe93e0260

Type TS bits  OffWidth Chunks X W R 00 001459b0    07 0031f 1 1 1

ZMS TBC pointer:

Ctx Tbl. idx. TS bits  Offset 2 00000003  1459b0    000 priv_cmd accum = 42

Generating a ZMS TBC for the first stack allocation:

Generating ZMS TBC for allocation of size 680 at 00007ffff119bab0

ZMS TBC table entry @ 4:

Base: 00007ffff119bab0

Type TS bits  OffWidth Chunks X W R 00 001e9d29    08 0067f 1 1 1

ZMS TBC pointer:

Ctx Tbl. idx. TS bits  Offset 2 00000004  1e9d29    000

Generating a narrowed ZMS TBC for the statements array in the script:

Generating ZMS TBC for allocation of size 320 at 00007ffff119bab0

ZMS TBC table entry @ 5:

Base: 00007ffff119bab0

Type TS bits  OffWidth Chunks X W R 00 003d77ad    07 0031f 1 1 1

ZMS TBC pointer:

Ctx Tbl. idx. TS bits  Offset 2 00000005  3d77ad    000 priv_cmd accum = 42

FIG. 8B

Generating a ZMS TBC for the second stack allocation:

Generating ZMS TBC for allocation of size 680 at 00007ffff119c130

ZMS TBC table entry @ 6:

Base: 00007ffff119c130

Type TS bits  OffWidth Chunks X W R 00 000bc212    08 0067f 1 1 1

ZMS TBC pointer:

Ctx Tbl. idx. TS bits  Offset 2 00000006  0bc212    000

Generating a narrowed ZMS TBC for the statements array in the script:

Generating ZMS TBC for allocation of size 320 at 00007ffff119c130

ZMS TBC table entry @ 7:

Base: 00007ffff119c130

Type TS bits  OffWidth Chunks X W R 00 0013763b    07 0031f 1 1 1

ZMS TBC pointer:

Ctx Tbl. idx. TS bits  Offset 2 00000007  13763b    000 priv_cmd accum = 42

| PHYS_BASE<br>(E.G., [63:36])<br>902 | RSVD<br>(E.G., [35])<br>904 | ENT_CNT<br>(E.G., [34:29])<br>906 | CURSOR_BASE<br>(E.G., [28:0])<br>908 |
|---|---|---|---|

| (E.G., 64) |
|---|
| BASE 1102 |

| (E.G.,35) | (E.G., 6) | (E.G., 20) | (E.G., 1) | (E.G., 2) |
|---|---|---|---|---|
| RESERVED 1104 | OFFSET WIDTH 1106 | CHUNKS 1108 | RESERVED 1110 | WR 1112 |

| (E.G., 64) |
|---|
| BASE 1202 |

| (E.G., 35) | (E.G., 6) | (E.G., 20) | (E.G., 1) | (E.G., 2) |
|---|---|---|---|---|
| RESERVED 1204 | OFFSET WIDTH 1206 | CHUNKS 1208 | X 1210 | RESERVED 1212 |

FIG. 12

```
Pseudocode 2300

// MAC-Tr32
//
// Generate a Message Authentication Code (MAC) using Advanced Encryption Standard (AES)
MAC-Tr32(param Input) {
    RETURN AES_ECB_Encrypt(Input, {EIC_AUTH_KEY_HI, EIC_AUTH_KEY_LO})[24:0]
}
```

FIG. 23A

```
Pseudocode 2310

// GenCap
//
// Generate an encoded, authenticated capability granting access to
// a message object stored in the shared heap and having the specified base and size.
//
GenCap(param ObjBase, param ObjSize) {
    ChunkSize = {1'b0, ObjBase[31:28]} + 7 // Infer chunk size from address LB = ObjBase[ChunkSize+2:ChunkSize] // Compute the lower bound
    Chunks = ObjSize[ChunkSize+3:ChunkSize] // Compute the number of chunks required to store the object IF ObjBase[63:32] != EIC_SDR_BASE[63:32]      OR // Check that the object is within the shared data region
            ObjSize[63:ChunkSize+4] != 0          OR // Check that the object size is not too large to represent
            Chunks not in [5, 8]                  OR // Check that the number of chunks is representable
            ObjSize[ChunkSize-1:0] != 0           OR // Check that size is even number of chunks representable
            ObjBase[ChunkSize-1:0] != 0           OR // require a 0 offset when creating a capability
            8 <= LB + Chunks AND AND_REDUCE(ObjBase[27:ChunkSize+3]) == 1 // i.e. object crosses
                    boundary between chunk sizes, which is unsupported since the carry would destroy the
                    size info represented in ObjBase[31:28] when the pointer crosses the boundary.
                    AND_REDUCE accepts a bit vector as input, performs a binary AND operation on
                    all of the bits, and returns the single-bit result.
    {
            #GP(0) // Generate a general-protection fault
    }
    CompChunks = Chunks - 5 (truncated to 2 bits)
    MAC = MAC-Tr32({ObjBase[31,ChunkSize+3], {0}*(ChunkSize+3), CompChunks, LB, {0}*91})
    RETURN {2'b01, MAC, CompChunks, LB, ObjBase[31:0]}
}
```

FIG. 23B

```
Pseudocode 2320

// CheckCap
//
// Given an encoded, authenticated capability or an unauthenticated memory pointer and
// access size, test whether access is permitted to the indicated memory location(s).
//
// If access is to be granted, a memory pointer is returned. If access is denied,
// a #GP exception is generated.
//
CheckCap(param Pointer, param MaxOffset) {
    Context = Pointer[63:62]
    IF Context[1] != Context[0] // Pointer may be an encoded, authenticated capability
        IF Context == 2'b10 // The context field has an invalid value
                #GP(0)

CheckBounds(Pointer)
        CheckBounds(Pointer + MaxOffset)

RETURN {EIC_SDR_BASE[63:32], Pointer[31:0]}
    ELSE
        IF Pointer AND EIC_PDR_MASK != EIC_PDR_BASE OR
                (Pointer + MaxOffset) AND EIC_PDR_MASK != EIC_PDR_BASE
        {
                #GP(0)
        } ELSE {
                RETURN Pointer
        }
}
```

FIG. 23C

```
Pseudocode 2330

// CheckBounds
//
// Check that a pointer value is within its authorized bounds.
CheckBounds(param Pointer) {
    CompChunks = Pointer[36:35]
    Chunks = {1'b0, CompChunks} + 3'h5 // Note that this is truncated to three bits ChunkSize = {1'b0, Pointer[31:28]} + 7 // Infer chunk size from address LB = Pointer[34:32] // Extract the lower bound
    UB = LB + Chunks // Note that this is truncated to three bits ChunkIndex = Pointer[ChunkSize+2:ChunkSize]

IF (LB < UB AND (ChunkIndex < LB OR UB <= ChunkIndex)) OR
       (UB <= LB AND UB <= ChunkIndex AND ChunkIndex < LB)
        #GP(0)

Atop = Pointer[31:ChunkSize+3]        // Extract address bits above the chunk index IF UB <= LB AND ChunkIndex < UB       // has been a carry out of the chunk index into upper address bits
        Atop = Atop − 1                   // Decrement Atop to compensate for carry out of the chunk index ExpectedMAC = Pointer[61:37]

// If CheckBounds is being invoked for Pointer + MaxOffset, this MAC computation
    // and the subsequent comparison against ExpectedMAC is not actually necessary.
    // Instead, it is sufficient to check that the input
    // that would have been passed to MAC-Tr32 this time is identical to the input
    // that was passed when checking the bounds for Pointer.
    ActualMAC = MAC-Tr32({Atop, {0}*(ChunkSize+3), CompChunks, LB, {0}*91})

IF ExpectedMAC != ActualMAC
        #GP(0)
}
```

FIG. 23D

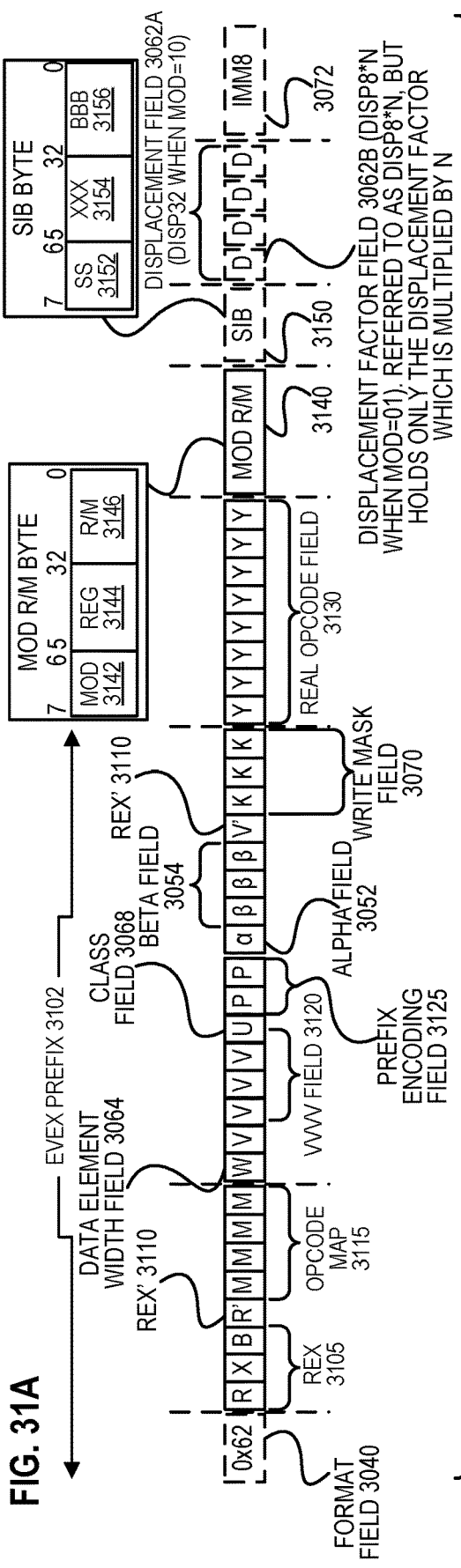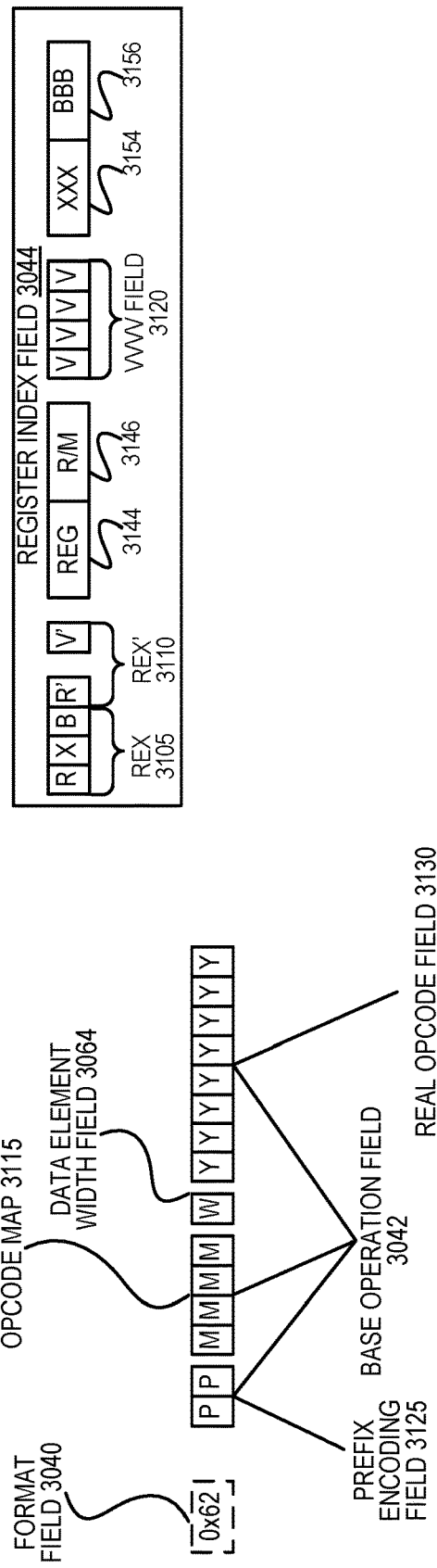

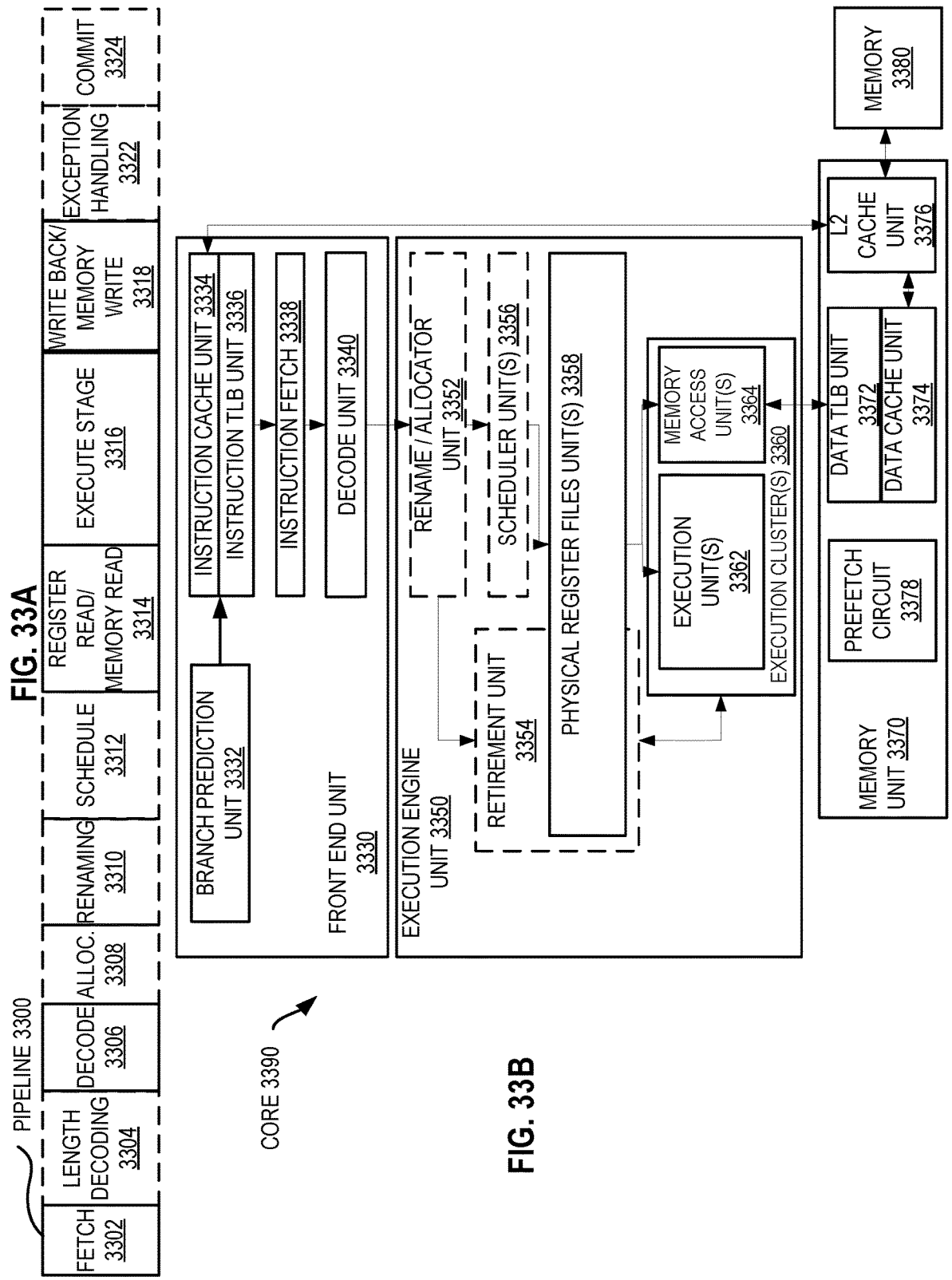

HARDWARE APPARATUSES, METHODS, AND SYSTEMS FOR INDIVIDUALLY REVOCABLE CAPABILITIES FOR ENFORCING TEMPORAL MEMORY SAFETY

TECHNICAL FIELD

The disclosure relates generally to electronics, and, more specifically, an embodiment of the disclosure relates to circuitry to implement individually revocable capabilities for enforcing temporal memory safety.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6A illustrates an example format for an entry in a capability table for individually revocable capabilities according to embodiments of the disclosure.

FIG. 6B illustrates another example format for an entry in a capability table for individually revocable capabilities according to embodiments of the disclosure.

FIGS. 7A-7C illustrate pseudocode that shows individually revocable capabilities data formats and how pointer narrowing can mitigate a sample vulnerability according to embodiments of the disclosure.

FIGS. 8A-8C illustrate output of an execution of the pseudocode in FIGS. 7A-7C that shows usage of a pointer controlled using individually revocable capabilities and a capability table for individually revocable capabilities according to embodiments of the disclosure.

FIG. 9 illustrates an example format for a capability table identification (ID) model specific register (MSR) according to embodiments of the disclosure.

FIG. 11 illustrates an example format for one or more default data capability (DDC) model specific registers (MSRs) according to embodiments of the disclosure.

FIG. 12 illustrates an example format for one or more current code capability (CCC) model specific registers (MSRs) according to embodiments of the disclosure.

FIGS. 23A-23D are pseudocode illustrating capability generation, capability checking flows, and associated sub-flows, according to embodiments of the disclosure.

FIG. 23A is pseudocode for generating a message authentication code (MAC), according to embodiments of the disclosure.

FIG. 23B is pseudocode for a GenCap instruction, according to embodiments of the disclosure.

FIG. 23C is pseudocode for a CheckCap instruction, according to embodiments of the disclosure.

FIG. 23D is pseudocode for a CheckBounds helper function, invoked by a CheckCap instruction, according to embodiments of the disclosure.

FIG. 31A is a block diagram illustrating fields for the generic vector friendly instruction formats in FIGS. 30A and 30B according to embodiments of the disclosure.

FIG. 31B is a block diagram illustrating the fields of the specific vector friendly instruction format in FIG. 31A that make up a full opcode field according to one embodiment of the disclosure.

FIG. 31C is a block diagram illustrating the fields of the specific vector friendly instruction format in FIG. 31A that make up a register index field according to one embodiment of the disclosure.

FIG. 33A is a block diagram illustrating both an exemplary in-order pipeline and an exemplary register renaming, out-of-order issue/execution pipeline according to embodiments of the disclosure.

FIG. 33B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
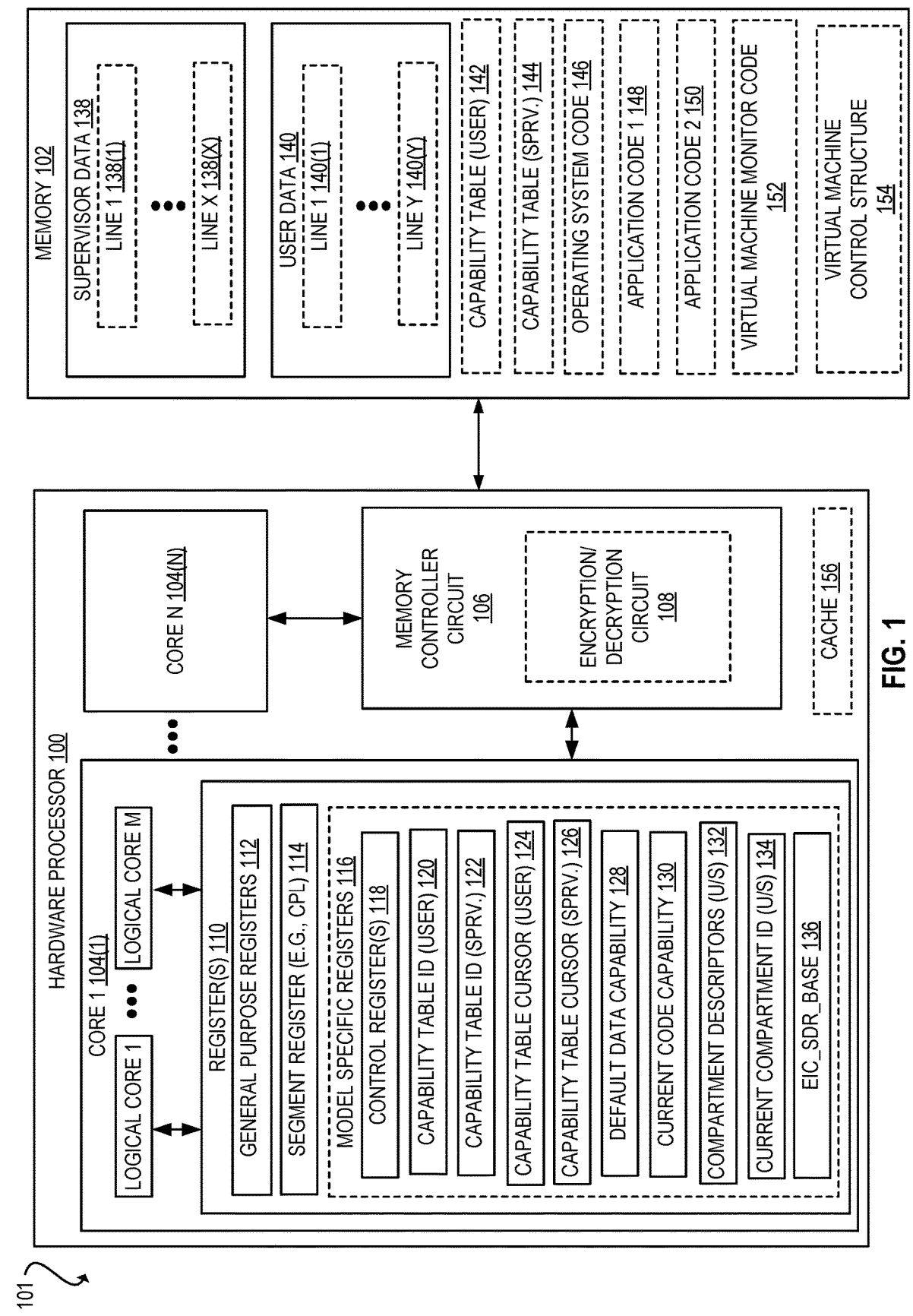
FIG. 1 illustrates a block diagram of a multiple core hardware processor utilizing memory safety enforcement according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. There is an urgent need to support memory safety and scalable compartmentalization in hardware. Finer-grained compartmentalization of software can also be used to harden against side channel attacks.

The embodiments herein include circuitry, instructions, primitives, and methods for memory safety enforcement. Certain embodiments herein include circuitry, instructions, primitives, and methods utilizing individually revocable capabilities for enforcing temporal memory safety, e.g., without expanding a pointer size. Certain embodiments herein provide deep memory safety and compartmentalization by offering deterministic bounds checks and byte-level granularity for allocations that require it, as well as (e.g., infinite) compartment nesting to most precisely enforce the principle of least privilege with no nesting overhead during normal operation, e.g., unlike paging-based nesting.

Certain embodiments herein utilize (i) memory protection keys (MPK). Certain embodiments herein utilize (ii) memory tagging. Certain embodiments herein utilize capability-based memory safety, for example, (iii) individually revocable capabilities (IRC) or (iv) encoded inline capabilities (EIC). Certain embodiments herein utilize (v) zones (e.g., "red zones") between allocated objects. Certain embodiments herein utilize a combination of (i)-(v) above (e.g., in a single address space) to maximize flexibility and security while also minimizing total space and time overhead. This combined approach may be referred to as zoned memory safety (ZMS). In one embodiment, ZMS is used to define multiple types of zones with mechanisms utilizing (i)-(v) for enforcing memory safety.

Enforcing memory safety and type safety in hardware efficiently mitigates prevalent types of vulnerabilities and enables new software models such as single-address space cloud hosting. The embodiments herein overcome common stumbling blocks for other memory safety mechanisms. For example, the embodiments herein mitigate temporal memory safety violations, for example, in contrast to spatial memory safety violations. Non-limiting examples of temporal memory safety violations (e.g., errors) are dangling pointer dereferences (e.g., referencing an object that has been deallocated), double "free" functions (e.g., calling free(pointer) function on the same object multiple times). In one embodiment, the free function (e.g., taking an input of a pointer) deallocates the memory previously allocated by an allocation call (e.g., a call to a contiguous allocation (calloc) function, memory allocation (malloc) function, or resize a previous memory allocation (realloc) function). Further non-limiting examples of temporal memory safety violations (e.g., errors) are a dangling reference to a re-allocated heap location or a dangling pointer to the stack.

As another example, the embodiments herein mitigate non-adjacent spatial memory errors, for example, where the prevalence of non-adjacent spatial memory errors reduces the effectiveness of memory safety mechanisms that match a tag value in the pointer to a tag value associated with data storage locations (e.g., where adjacent spatial memory errors are easier for such mechanisms to address, since adjacent allocations are assigned different tag values). Workloads that tend to allocate a few large objects and access many small portions of them in a scattered fashion confounds caching of security metadata stored in a table but does not confound the embodiments herein.

As yet another example, certain embodiments herein do not increase the pointer size used by a system in contrast to a memory safety mechanism that increases pointer size and results in a significant memory overhead for some workloads.

As another example, certain embodiments herein do not impose data alignment requirements, e.g., do not require alignment greater than a certain number of bytes (e.g., 16 bytes), and thus improve the performance of the computer by not causing an increase in memory usage.

As yet another example, for certain embodiments herein, narrowed bounds are utilized to refer to particular fields within a structure/object to mitigate certain vulnerabilities, e.g., those that overrun a buffer within a structure to corrupt an adjacent code pointer or critical control variable.

As another example, certain embodiments herein are applicable to stack allocations and to heap allocations, and thus increase coverage to reduce additional risks.

As yet another example, certain embodiments herein provide fine-grained memory safety enforcement by assigning different permissions to individual executed instructions, e.g., without using expensive context switches that impede such precision. For example, it may be possible to place each instruction of a program in its own process context that grants access to only the data required by that instruction, which would enforce a policy as precise as one enforced by capabilities, but the time/power/processing/memory overhead of the multi-process approach may be prohibitive. Furthermore, the multi-process approach may be unable to efficiently satisfy requirements for sub-page, object-granular access control.

When a service compartment is acting on behalf of a client compartment using inputs (e.g., pointers) provided by the client compartment, as another example, certain embodiments herein are directed to a policy enforcement mechanism to prevent confused deputy attacks in which a buggy service compartment is influenced by a malicious client compartment to compromise the security of a third, victim, compartment. For example, protection keys for a user mode may restrict access to user pages even by the kernel (e.g., operating system (OS)) to help prevent a system call (e.g., how an application requests a service from the kernel of the OS) that is servicing a particular compartment from being manipulated into compromising a different compartment in the same process.

As yet another example, certain embodiments herein provide finer-grained compartmentalization than multi-address space isolation, for example, to avoid context-switching between many fine-grained processes that is sufficiently expensive due to factors including system call overhead and page walk overhead from translation lookaside buffer (TLB) entries being evicted as a result of address space identifier (ASID) exhaustion.

As yet another example, certain embodiments herein make it easier to formally verify relevant security properties compared to other approaches, e.g., paging.

The following shows how to efficiently enforce compartmentalization all the way down to instruction granularity to achieve memory-safety and type-safety. In certain embodiments, memory safety checks are to check for memory access errors, e.g., for buffer overflows and dangling pointers. In one embodiment, a memory safety check is to check array bounds and pointer dereferences. In certain embodiments, type safety checks are to check (e.g., for a memory access request) for discrepancy between differing data types for the program's constants, variables, and methods (e.g., functions), for example, the error of treating data that is an integer (int) as a floating-point number (float). In one embodiment, a type is an attribute of data which tells the compiler (or interpreter) how the programmer intends to use the data. Disclosed enforcement mechanisms herein comprehend speculative execution so that security policies are enforced even during transient execution.

In certain embodiments, memory safety and compartmentalization are fundamentally related in that they enforce similar types of policies, albeit generally with different granularities and methods for specifying policies. Compartmentalization may generally refer to the mitigation of vulnerabilities by decomposing applications into isolated components, each granted only the rights it requires to operate. Thus, a compartment may be a software component granted access to necessary resources, e.g., code, data, system call permissions, IO ports, etc. Compartments can be defined at various granularities. Memory safety can be viewed as a specialization of compartmentalization in which the software component is a single execution of a particular instruction and the resources to which it is granted access include the particular regions of memory and registers referenced by the instruction operands (implicit or explicit).

Temporal safety violations may be a significant vulnerability, particularly in non-adjacent spatial safety vulnerabilities.

Type safety may further refine memory safety by ensuring that each resource accessed by an instruction has the expected type. Coarser-grained compartmentalization mechanisms may also perform type safety checks, e.g., to ensure that a compartment's data region has a type that is permitted to be accessed by the compartment's code region. For example, this may be useful for preventing type confusion in object-oriented programming languages by checking the type of the supplied object storage when invoking a method.

Compartments can be nested such that an outer compartment has access to a superset of the resources accessible within its sub-compartments. Some compartmentalization mechanisms also may support sub-compartments that have access to resources that are inaccessible from parent compartments, but those parent and child compartments are actually all sub-compartments of some other compartment that is managing them as peers. For example, security enclaves may effectively rely on the processor (e.g., central processing unit (CPU)) implementation to serve as a root compartment managing the enclave and the rest of the system as peer sub-compartments.

A great deal of compartmentalization and memory safety policy information can be inferred from program source code, but limitations in hardware and development toolchains have henceforth resulted in limited enforcement of such policies. Numerous programming languages define distinct allocations with associated types, even languages that are generally considered to be loosely-typed, such as C. However, the availability of object bounds and type information in source code does not imply that memory safety is enforced for programs in that language. C and C++ compilers have not traditionally enforced memory safety, and common idioms such as temporarily taking pointers well outside of the bounds of their associated objects complicate the application of certain memory safety mechanisms. Other strongly-typed languages, such as Rust, may be utilized. For example, a strongly-typed language may deeply embed the concept of ownership transfer that dynamically revokes access to an object from certain scopes when granting access to the object to a different scope if there is a possibility that simultaneous access from both scopes would result in a race condition. Thus, race conditions are impossible to construct in those strongly-typed languages without resorting to the use of low-level "escape hatches" to bypass the type system. It may be possible to enforce a similar policy in other languages, even C and C++, but that likely involves error-prone usage of non-default program constructs.

Compartment boundaries can be inferred from source code or even binary executable metadata. A compartment can be defined for each scope (e.g., block of statements) within a program, for each instance of an object in object-oriented languages, for each source file (e.g., in C programming language), or for each (e.g., JavaScript) library. Defining compartments with as fine a granularity as possible may be important to most precisely enforce the principle of least privilege, which is widely accepted as being useful for limiting the extent of information leakage or corruption due to exploits.

However, explicitly-defined compartment boundaries (e.g., process boundaries) may be enforced by hardware due to the lack of hardware support for efficient, fine-grained compartmentalization, e.g., and with the lack of development tools that would also need to be enhanced to compile implicit compartment boundaries into a form that could be enforced by hardware.

Another reason that explicitly-defined compartment boundaries may remain relevant in the future is the varying levels of trust that relevant stakeholders place in particular compartmentalization mechanisms. For example, software-based bounds checks are generally regarded as less secure than processes defined using page tables, and cryptographic separation (e.g., encrypting pages in different compartments using different keys) may be viewed as even more secure in most respects, and also covers an expanded threat model that includes physical attacks. The size and nature of the total trusted computing base (TCB), including software, associated with each type of compartmentalization solution also helps to determine its trustworthiness. For example, virtual machine monitors (VMMs) may offer a reduced TCB compared to OSes, even though they both fundamentally rely on paging to enforce isolation. It is unlikely that the whole range of compartmentalization mechanisms supported by future platforms can all be made equally efficient, so a nested hierarchy of compartments with differing enforcement mechanisms is likely to persist. At some coarse-grained levels, explicit policies seem likely to play a role.

Explicitly-defined policies can be static or dynamic, and it may be important for memory safety mechanisms to be able to efficiently enforce both types. Dividing programs into multiple, separately-compiled components as in Function-as-a-Service (FaaS) is one example of a static policy. OpenSSH privilege separation uses a single binary, but spawns a separate, deprivileged process from it with different privilege levels at a statically-defined point in its execution. Static information flow tracking starting from variables that are annotated as sensitive can also be used to define a compartment containing data that either influences or is tainted by sensitive data as well as the instructions that may process such data.

On the other hand, a dynamic policy with site isolation enabled launches new processes when it is used to browse different websites. Another example is dynamic information flow tracking, which can be used to define an effective compartment for sensitive information in a program.

In certain embodiments, enhanced developer tools and OSes are needed to define both static and dynamic compartmentalization policies. OS-enforced policies on resources such as system calls and file descriptors here may be defined at less than process granularity.

Compartmentalization at instruction-level granularity may be basically indistinguishable from memory safety. Achieving memory safety may be an important goal to most effectively mitigate the broadest possible range of vulnerabilities. For that reason, the policy that is sought to be enforced may be referred to as "memory safety", which also encompasses what may be traditionally considered compartmentalization and type safety policies. Memory safety enforcement and compartmentalization enforcement during transient execution may provide hardening against data leakage via side channels.

System-on-a-chips (SoCs) and platforms are becoming increasingly heterogeneous, so certain embodiments herein provide uniform security mechanisms across processors (e.g., CPUs), graphical processing units (GPUs), accelerators, etc. For example, it may be difficult to identify a single threat model for all of the mechanisms (e.g., primitives, circuitry, methods, etc.) that may be involved in enforcing memory safety. The following is a list of generalized aspects of certain embodiments of a threat model.

In this example, a threat model may assume all code from a single originator is mutually trusting. However, code from different originators may be assumed to be mutually distrustful. That being said, the finest granularity of isolation and permission minimization that is possible, even between different components or instances of code from a single originator, may still be desirable for minimizing the extent of security compromises and to enhance robustness. The definition of a code originator is the responsibility of the relevant authority, e.g., an administrator who defines corporate policies for information classification. For example, one department in a company may be responsible for processing sensitive personal information, so it may be defined as a separate code originator from another department in the same company that is responsible for a webpage with public information about the company. An organization may decide that even finer-grained divisions may be desirable to mitigate insider threats within a department after weighing the productivity tradeoffs, but those factors are orthogonal to the technical aspects of enforcing the policy.

As another example, a threat model may assume the compiler is trusted to correctly indicate the desired policy to the targeted enforcement mechanism, and some mechanisms may even rely on it to correctly instrument code with security check instructions. In certain embodiments, this implies that any organization relying on the compiler for security must also trust the provider of the compiler. For example, if compiler instrumentation is used to isolate workloads from multiple code originators, then both originators must trust the compilers applied to both of their workloads in certain embodiments. This may be feasible, e.g., if the compiler is provided by a trusted third party such as, but not limited to, a FaaS host. It may be possible to minimize trust in the compiler by constructing a validator that is applied to the output from the compiler. Validators can often be much simpler than compilers, since they only check a narrow set of rules and lack complex logic for optimizing code. Thus, it may be more feasible to formally verify the correctness of validators or otherwise establish their trustworthiness.

As another example, a threat model may assume that even if a compiler or validator is not in the TCB for a particular type of enforcement mechanism, some way of specifying the policy to the enforcement mechanism is needed, and that must be trusted by all code originators who have resources managed by that enforcement mechanism in certain embodiments. For example, containers may be isolated using kernel-configured page tables and kernel routines that control access to file descriptors, etc., so tenants/originators must trust the kernel to properly configure the page tables and the structures indicating the permissions for each container on kernel resources in certain embodiments. There may be other, higher-level software components that must also be trusted, e.g., a container management daemon.

As another example, a threat model may assume that some customers desire to avoid trusting the OS or VMM, so they may instead rely on a deeper layer, e.g., a trust domain resource manager (TDRM) or the secure enclave (e.g., Intel® Software Guard Extensions (SGX)) implementation, to correctly configure the relevant policy enforcement primitives.

As another example, a threat model may assume that certain policy enforcement mechanisms can resist physical attacks, but others may not. Even if a mechanism is not resistant to physical attacks, certain embodiments herein strive to make it composable so that it can be layered on top of a mechanism that is resistant when required.

As another example, a threat model may assume it is beneficial to minimize the hardware TCB, e.g., using cryptography to minimize the portion of the design that needs to be trusted to correctly control access to the plaintext. Formal verification can help to establish the trustworthiness of the remaining hardware components in the TCB.

As noted above, certain embodiments herein utilize (i) memory protection keys (MPK). Certain embodiments herein utilize (ii) memory tagging. Certain embodiments herein utilize capability-based memory safety, for example, (iii) individually revocable capabilities (IRC) or (iv) encoded inline capabilities (EIC). Certain embodiments herein utilize (v) zones (e.g., "red zones") between allocated objects. Certain embodiments herein utilize a combination of (i)-(v) above (e.g., in a single address space) to maximize flexibility and security while also minimizing total space and time overhead. This combined approach may be referred to as zoned memory safety (ZMS). In one embodiment, ZMS is used to define multiple types of zones with mechanisms utilizing (i)-(v) for enforcing memory safety. ZMS may unify multiple memory safety enforcement primitives within each address space to satisfy the requirements of a variety of workloads with greater efficiency and security assurance than is possible by using any of the primitives exclusively. In one ZMS composes in a straightforward fashion with coarser-grained compartmentalization mechanisms such as Multi-Key Total Memory Encryption (MK-TME) with integrity, SGX, and Intel® Trusted Domain Extensions (TDX) that mitigate physical attacks.

The following first provides an overview of the zone types, an example system in FIG. 1 to implement one or more of the mechanisms of ZMS, which is followed by detailed descriptions of the mechanisms used in the various zones.

Certain embodiments of ZMS minimize total space and performance overhead for enforcing memory safety by defining multiple zones in each program that store and check memory safety metadata differently, e.g., where there is no single memory safety approach that is optimal for protecting all allocations. Different zones can also be selected based on the sensitivity of particular allocations. Next, is a discussion of the high-level attributes of each of the five mechanisms (i)-(v) and the motivation for supporting all of them. Each of these mechanisms can be implemented and used independently, which presents opportunities for a phased roadmap that provides value at every stage with a multiplicative increase in value once all of the mechanisms are available. It may be important to be mindful of the opportunities for synergy between all of these mechanisms from the outset to ensure that they are compatible and minimally redundant.

FIG. 1 illustrates a block diagram of a multiple core hardware processor 100 utilizing memory safety enforcement according to embodiments of the disclosure. Hardware processor 100 including a plurality of cores 104(1) to 104(N) e.g., where N is any integer greater than one. Hardware processor 100 is depicted as coupled to a system memory 102, e.g., forming a computing system 101. In the depicted embodiment, a core of (e.g., each core of) hardware processor 100 includes a plurality of logical cores (e.g., logical processing elements or logical processors), for example, where M is any integer 1 or greater. In certain embodiments, each of physical core 104(1) to physical core 104(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain embodiments, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 110 of core 104(1). In certain embodiments, each core includes its own set of registers 110. Registers 110 may include one or more general purpose (e.g., data) registers 112 to perform (e.g., logic or arithmetic) operations in, for example, additionally or alternatively to accessing (e.g., load or store) data in memory 102. Registers 110 may include a segment register 114, e.g., to store data indicating a current privilege level of software operating on a logical core, e.g., separately for each logical core. In one embodiment, current privilege level is stored in a current privilege level (CPL) field of a code segment selector register of segment register 114. In certain embodiments, processor 100 requires a certain level of privilege to perform certain actions, for example, actions requested by a particular logical core (e.g., actions requested by software running on that particular logical core).

Registers 110 may include one or more model specific registers 116. In one embodiment, model specific registers 112 include configuration and/or control registers. In one embodiment, control registers are separate/distinct from model specific registers. In certain embodiments, each physical core has its own respective set of registers 110. In certain embodiments, each logical core (e.g., of multiple logical cores of a single physical core) has its own respective set of registers 110. In certain embodiments, each logical core has its own respective configuration and/or control registers. In one embodiment, one or more (e.g., model specific) registers are (e.g., only) written to at the request of the OS running on the processor, e.g., where the OS operates in privileged (e.g., system) mode but does not operate in non-privileged (e.g., user) mode. In one embodiment, a model specific register can only be written to by software running in supervisor mode, and not by software running in user mode. Registers 110 may include control register(s) 118, e.g., to indicate if the processor (e.g., core) is capable of performing the instruction(s) or other functionality discussed herein.

Registers 110 (e.g., model specific registers 116) may include one or more of control register(s) 117, capability table ID (user) register(s) 120, capability table ID (supervisor) register(s) 122, capability table cursor (user) register(s) 124, capability table cursor (supervisor) register(s) 126, default data capability register(s) 128, current code capability register(s) 130, compartment descriptors register(s) 132 (e.g., one for user (U) and one for supervisor (S)), current compartment identification (ID) register(s) 134 (e.g., one for user (U) and one for supervisor (S)), and an encoded inline capabilities (EIC) register(s) 136 (e.g., EIC shared data region base address (EIC_SDR_BASE), e.g., in addition to other MSRs. Usage of these registers is described further herein. In one embodiment, each logical core has its own respective set of MSRs 116, or any combination thereof. In one embodiment, a plurality of logical cores share a single register.

In certain embodiments, each logical core includes its own (e.g., not shared with other logical cores) MSRs 116, e.g., separate from the data registers 112. In certain embodiments, MSRs 116 are each read and write registers, e.g., with a write allowed when the write requestor (e.g., software) has an appropriate (e.g., permitted) privilege level and/or a read allowed for any privilege level. Each register may be read only (e.g., by a logical core operating in a privilege level below a threshold) or read and write (e.g., writable by a logical core operating in a privilege level above the threshold). In certain embodiments, read and write registers are readable and writeable only in supervisor privilege level. In certain embodiments, write-only registers are writeable only in supervisor privilege level and not readable for any privilege level. In certain embodiments, read-only registers are readable only in supervisor privilege level and not writeable for any privilege level.

System 101 (e.g., hardware processor 100) includes a memory controller circuit 106 (e.g., memory management unit), for example, to perform and/or control access (e.g., by core 104(1)) to memory 102. In one embodiment, hardware processor includes a connection to the memory. Additionally or alternatively, memory controller circuit 106 may include a connection to memory 102. System 101 (e.g., memory controller circuit 106) may include an encryption/decryption circuit 108, for example, the encrypt or decrypt data for memory 102.

Memory 102 may include supervisor data 138 (e.g., not accessible by a user), e.g., one or more of line 1 138(1) to line X 138(X), where X is any integer greater than 1 (e.g., a block of lines). Memory 102 may include user data 140 (e.g., accessible by a user and/or supervisor), e.g., one or more of line 1 140(Y) to line X 140(Y), where Y is any integer greater than 1 (e.g., a block of lines).

Memory 102 may include a capabilities table (user) 142 and/or a capabilities table (supervisor) 144. Capabilities table is described further herein (e.g., in reference to individually revocable capabilities (IRC)).

Memory 102 may include (e.g., store) one or more of (e.g., any combination of) the following software: operating system (OS) code 146, first application code 148, second (or more) application code 150, virtual machine monitor code 152, a virtual machine control structure VMCS) 154, or any combination thereof. First application code 148 or second application code 150 may be a respective user program.

In one embodiment, a cache 156 is provided (e.g., within or separate from a core). Cache circuitry 156 may be used to cache data from memory, e.g., to cache a capability table.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

Figure 2:
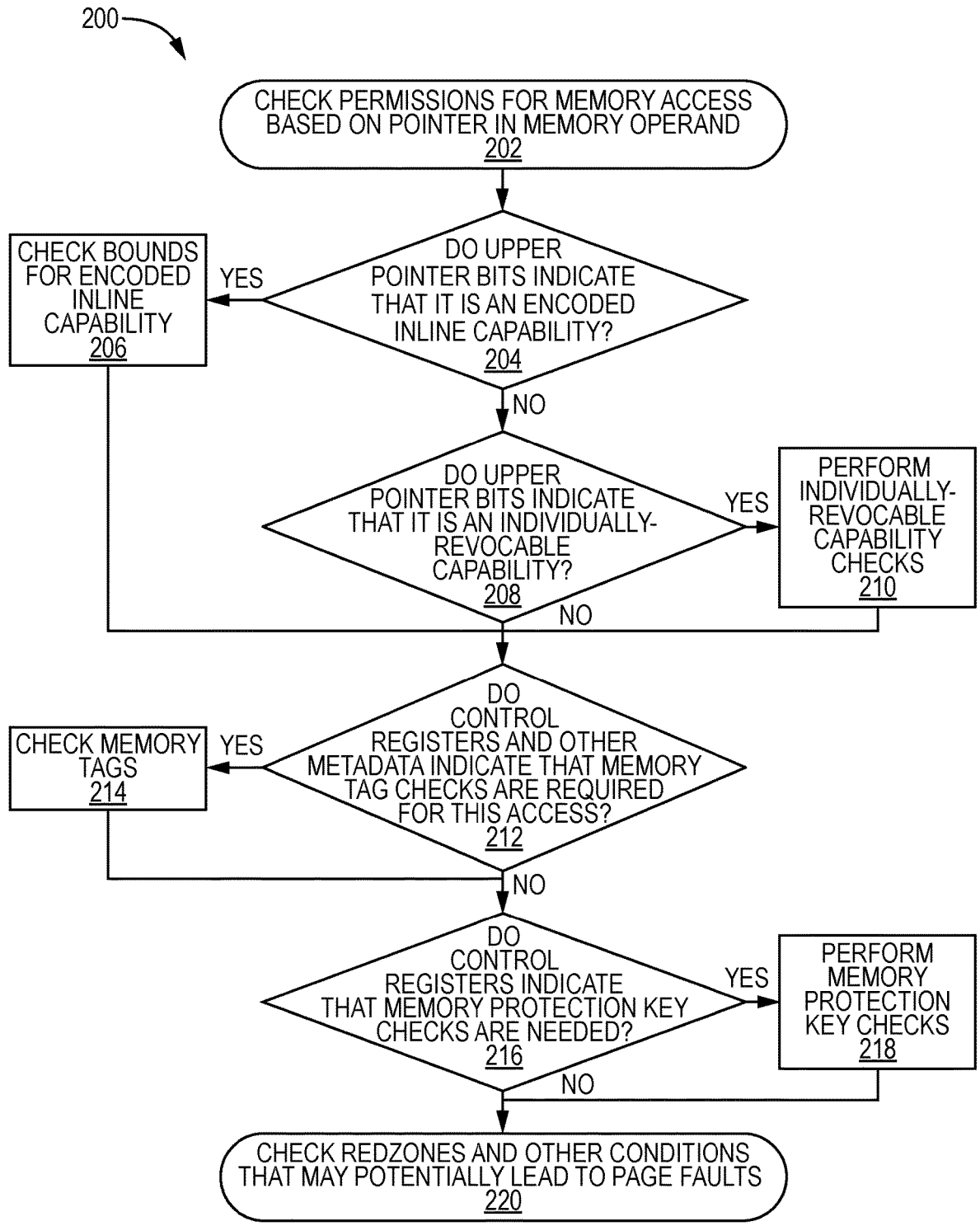
FIG. 2 illustrates a flow diagram for enforcing memory safety utilizing multiple memory safety enforcement primitives according to embodiments of the disclosure.

FIG. 2 illustrates a flow diagram 200 for enforcing memory safety utilizing multiple memory safety enforcement primitives according to embodiments of the disclosure. Flow diagram 200 includes checking permissions for a memory access based on a pointer for the memory operand 202, checking if a portion (e.g., the upper bit or bits) of the pointer indicate the pointer is an encoded inline capability (EIC) pointer, and if yes, checking bounds for encoded inline capability at 206, and if no, checking if the portion of the pointer indicates the pointer is an individually revocable capability (IRC) pointer, and if yes, then performing one or more EIC check(s), and if no transitioning to 212 (also transitioning to 212 after completion of 206 and 210). At 212, depicted flow diagram 200 includes checking if control register(s) and/or metadata indicate that memory corruption detection (e.g., using memory tags) checks are required for this access, and if yes, checking the memory corruption detection values (e.g., memory tags) 214, and then checking if control register(s) indicate that memory protection keys (MPK) are required for this access 216, and if yes, then performing the MPK checks at 218, and then transitioning to 220 to check any zones (e.g., red zones) or other conditions that may potentially lead to page faults.

If any of the checks (e.g., 206, 210, 214, 218, 220, etc.) fail, the flow may cease (e.g., fault), for example, and cause the memory access for flow 200 to be denied.

Figure 3:
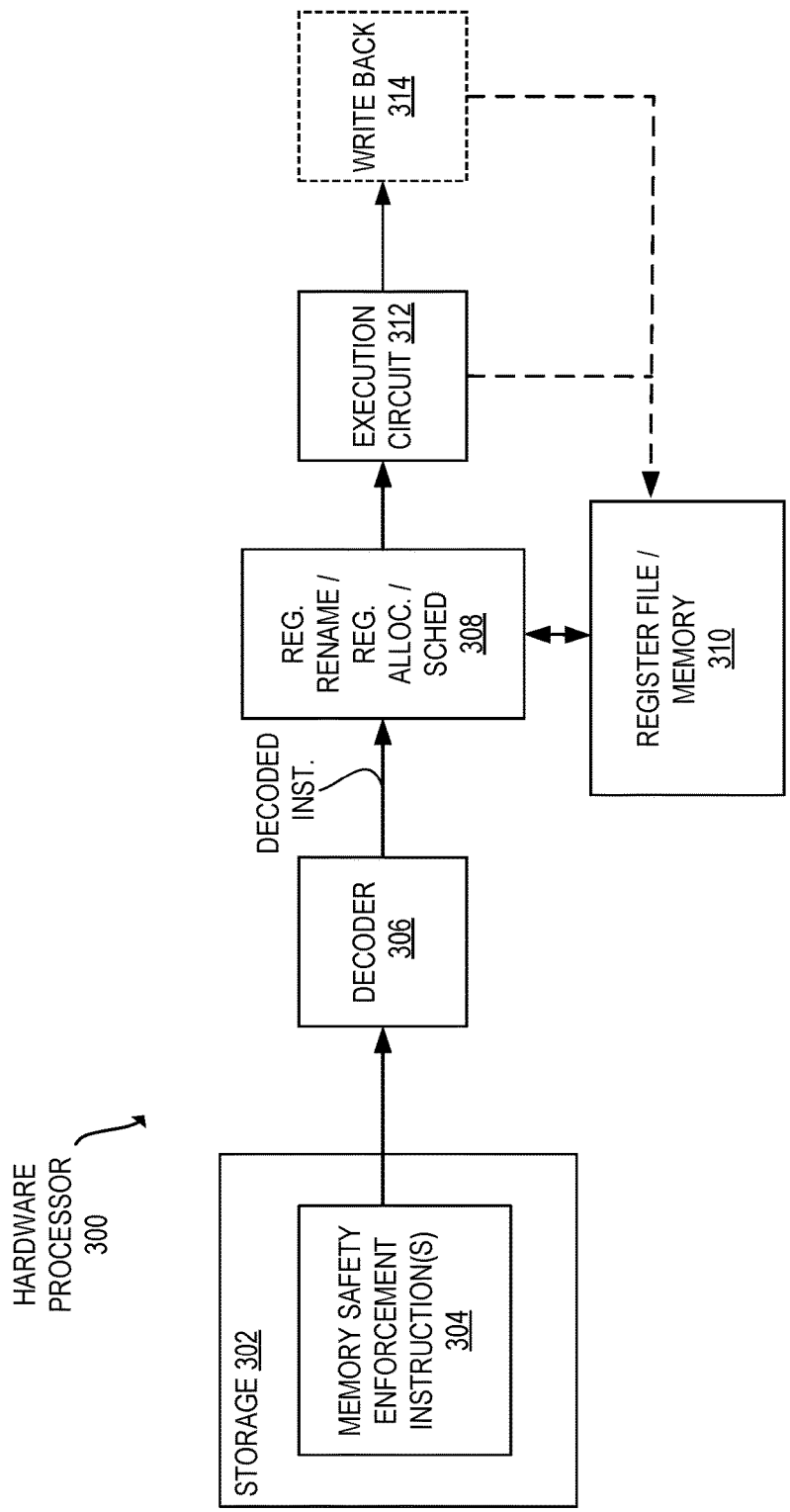
FIG. 3 illustrates a hardware processor coupled to storage that includes one or more memory safety enforcement instructions according to embodiments of the disclosure.

FIG. 3 illustrates a hardware processor 300 coupled to storage 302 that includes one or more memory safety enforcement instructions 304 according to embodiments of the disclosure. Register file may be registers 110 from FIG. 1. Memory may be memory 102 from FIG. 1. In certain embodiments, a memory safety enforcement is according to any of the disclosure herein. In one embodiment, e.g., in response to a request to perform an operation, the instruction (e.g., macro-instruction) is fetched from storage 302 and sent to decoder 306. In the depicted embodiment, the decoder 306 (e.g., decoder circuit) decodes the instruction into a decoded instruction (e.g., one or more micro-instructions or micro-operations). The decoded instruction is then sent for execution, e.g., via scheduler circuit 308 to schedule the decoded instruction for execution.

In certain embodiments, (e.g., where the processor/core supports out-of-order (OoO) execution), the processor includes a register rename/allocator circuit coupled to register file/memory circuit 310 (e.g., unit) to allocate resources and perform register renaming on registers (e.g., registers associated with the instruction). In certain embodiments, (e.g., for out-of-order execution), the processor includes one or more scheduler circuits 308 coupled to the decoder. The scheduler circuit(s) may schedule one or more operations associated with decoded instructions, including one or more operations decoded from a memory safety enforcement instruction, for execution on the execution circuit 312.

In certain embodiments, a write back circuit 314 is included to write back results of an instruction to a destination (e.g., write them to a register(s) and/or memory), for example, so those results are visible within a processor (e.g., visible outside of the execution circuit that produced those results).

One or more of these components (e.g., decoder 306, register rename/register allocator/scheduler 308, execution circuit 312, register file/memory 310, or write back circuit 314) may be in a single core of a hardware processor (e.g., and multiple cores each with an instance of these components.

In certain embodiments, if a check (e.g., for one or more of the five ZMS mechanisms (i)-(v)) being performed for a memory safety enforcement instruction fails (e.g., throws an exception), the failure generates an exception (e.g., causes setting of a flag) and/or does not allow access to the data corresponding to a memory access for which the memory safety enforcement check is being performed.

The following is a more detailed discussion of the five ZMS mechanisms (i)-(v).

Memory Protection Keys (MPK)

In certain embodiments, memory protection keys (MPK) support page-granular, discontiguous data compartmentalization. In one embodiment, compartment switching does not require a system call, since a Write Data to User Page Key Register (WRPKRU) instruction can be executed in user mode (for example, in contrast to a higher privileged mode, e.g., kernel or supervisor mode). MPK may be limited to a fixed number of (e.g., 16) hardware-recognized compartments due to limitations in available bits in page table entries (PTEs) and challenges in managing an enlarged protection key rights (PKRU) register. The below discussed how MPK, can be combined with individually revocable capabilities (IRCs) to support a larger (e.g., unlimited) number of compartments. Its support for discontiguous memory regions is complementary with capabilities' control over contiguous regions in certain embodiments.

Memory Tagging

Tagging may be especially useful for small objects, since it stores a relatively small amount of metadata for each block of some granularity within an allocation. It can also help to reduce performance overheads for workloads with scattered access patterns, assuming that tags are stored in such a way that tag lookups for such accesses do not thrash the cache.

In one embodiment, a hardware processor includes an execution unit to execute an instruction to request access to a block of a memory through a pointer to the block of the memory, and a memory controller (e.g., memory management unit) to allow access to the block of the memory when a memory corruption detection value (e.g., tag) in the pointer is validated with a memory corruption detection value (e.g., tag) in the memory for the block, for example, where a position of the memory corruption detection value in the pointer is selectable between a first location and a second, different location.

It is noteworthy that proposals for enabling the OS to select for each page whether tagging metadata needs to be stored may be complementary with ZMS. For pages that are managed solely using capabilities or zones (e.g., red zones), storing tagging metadata may introduce unnecessary overhead. In certain embodiments, tagging is combined with other memory safety techniques (i)-(v) to maximize overall protection and performance.

Individually Revocable Capabilities (IRC)

In certain embodiments, each address space has capability tables for storing a capability associated with each memory allocation, and each pointer to that allocation contains a field (e.g., tag) referencing the corresponding table entry (e.g., a tag in that entry). In certain embodiments, IRC deterministically mitigates spatial vulnerabilities, which makes IRC well-suited to protecting sensitive data such as (e.g., Secure Sockets Layer (SSL) protocol and Transport Layer Security (TLS) protocol) key material, and for mitigating non-adjacent linear overflows, which may account for the majority of spatial vulnerabilities in certain OSes.

In one embodiment, a memory controller (e.g., memory controller circuit 106 in FIG. 1) allows access to a block of allocated memory when an allocated object tag in the pointer provided for a memory request is validated with an allocated object tag in an entry of a capability table (e.g., capability table 142 or 144) in memory (e.g., where the entry is indexed by an index value in the pointer). In certain embodiments, the memory controller is to clear the allocated object tag in the capability table when a corresponding object is deallocated, for example, at the instruction of a compiler. Example formats for an IRC pointer are discussed below in reference to FIGS. 5A and 5B. Example formats for an IRC capability table entry are discussed below in reference to FIGS. 6A and 6B.

In one embodiment, each IRC is associated with a table entry for each allocation containing bounds, permissions, type, version metadata, or any combination thereof for the allocation. In one embodiment, each entry uses more storage than the metadata that tagging associates with each block of an allocation, but only a single entry is required for each allocation (e.g., with some exceptions discussed below), so the amortized storage overhead for large objects is actually lower than for tagging. It is also possible to determine the exact bounds of an allocation in constant time. This also permits the efficient initialization of range registers. Only needing to initialize a single table entry when allocating a large object also eliminates the overhead of needing to tag every block in the allocation in certain embodiments. In one embodiment, flow diagram 400 in FIG. 4A uses an IRC pointer format 500 from FIG. 5A and an IRC capability table entry format 600 from FIG. 6A. In one embodiment, flow diagram 401 in FIG. 4B uses an IRC pointer format 501 from FIG. 5B and an IRC capability table entry format 601 from FIG. 6B.

Figure 4A:
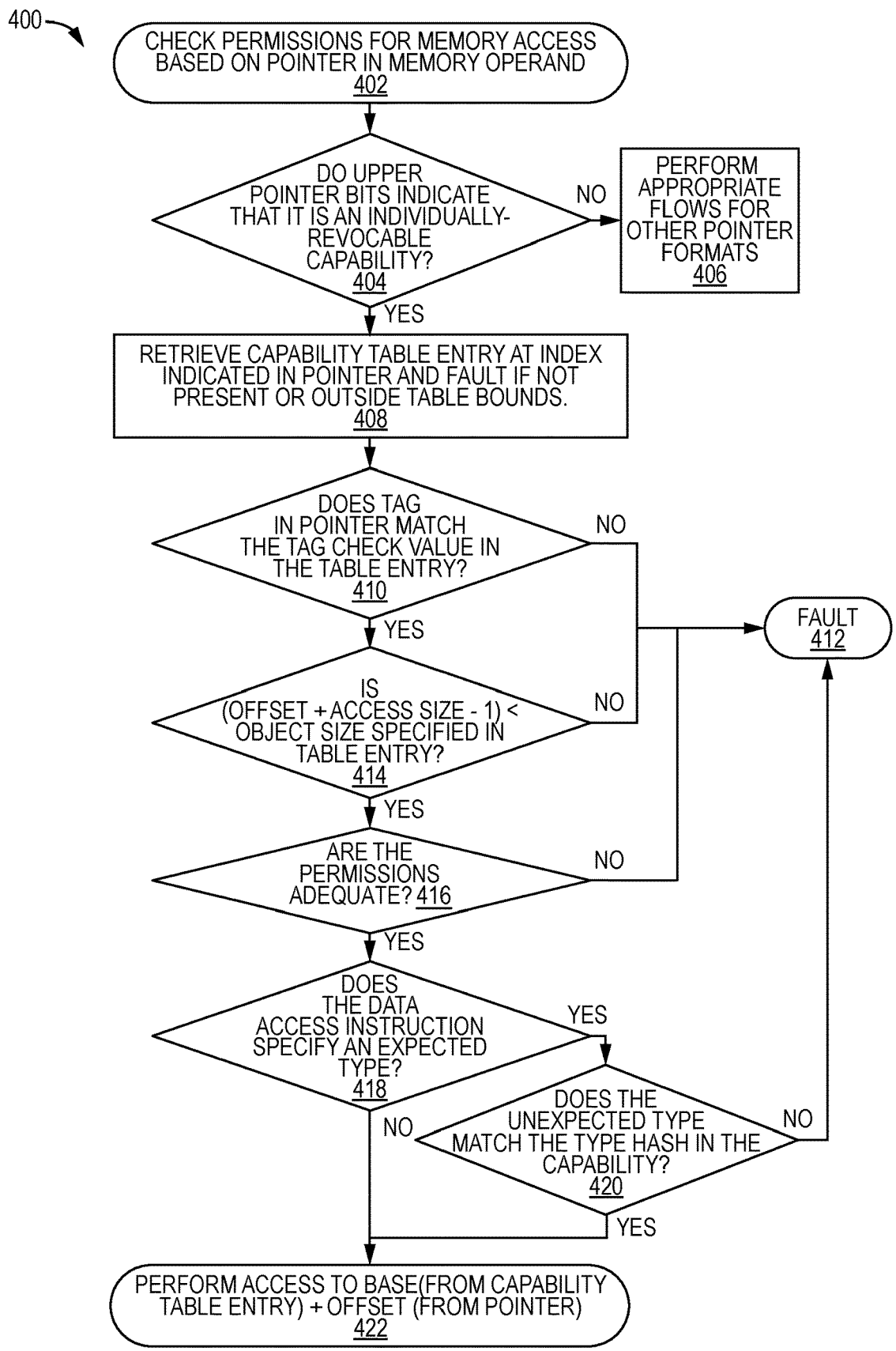
FIG. 4A illustrates a flow diagram for enforcing memory safety utilizing individually revocable capabilities (IRC) according to embodiments of the disclosure.

FIG. 4A illustrates a flow diagram 400 for enforcing memory safety utilizing individually revocable capabilities (IRC) according to embodiments of the disclosure. Flow diagram 400 includes checking permissions for memory access based on a pointer in memory operand 402, then checking if a portion (e.g., the upper bit or bits) of the pointer indicate the pointer is an encoded inline capability (EIC) pointer, and if no, performing other flows for other pointer formats 406 (e.g., a pointer format without any metadata within the pointer), and if yes, retrieving a capability table entry (for example, from capability table 142 for a user mode pointer and from capability table 144 for a supervisor mode pointer, e.g., with user mode or supervisor mode indicated by the address (e.g., pointer) being a user address (e.g., user data 140 in FIG. 1) or supervisor address (e.g., supervisor data 138 in FIG. 1), e.g., and not based on the current ring level the CPL in segment register 114 in FIG. 1) at the index indicated in the pointer and fault if not present or outside the bounds of the table 408, then if no fault, check if the tag (e.g., allocated object tag) from the pointer matches the tag (e.g., allocated object tag) from the capability table entry 410, and if no, then fault 412, and if yes, then perform a bounds check for the pointer and the object size specified in the table entry 414 (e.g., by checking if the offset plus access size minus one is less than the object size specified in the table entry, e.g., as shown in FIG. 6A), and if no, then fault 412, and if yes, then check if the permissions 612 in the table entry, e.g., with a set R bit indicating read permission, a set W bit representing write permission, and a set X bit representing execute permission, permit the requested access 416, and if no, then fault 412, and if yes, check if the data access instruction specifies an expected type 418, and if no, perform an access using the pointer 422 (e.g., an access to base value from capability table entry plus an offset from the pointer), and if yes, compare the expected type for the memory request access instruction to the object type from the capability table entry field 420 (e.g., the type value (e.g., hash) in FIG. 6A), and if no, then fault 412, and if yes, perform an access using the pointer 422 (e.g., an access to base value from capability table entry plus an offset from the pointer). In some embodiments, a bit may be defined in the capability table entry (e.g. a bit that would otherwise be reserved or unused) that indicates that a type check must always be performed at 420 prior to accessing memory using the capability. If the data access instruction does not specify an expected type when accessing such a capability, a fault may be generated.

In certain embodiments, a processor is able to simultaneously reference separate capabilities tables for both user and supervisor modes. For example, where the capability table that is used is selected based on whether the pointer (e.g., address) is a user or supervisor address, e.g., not based on the current ring level. For example, if the kernel attempts to access a capability referring to user memory, the user capability table will be consulted. User and supervisor addresses may be distinguished by configuring a specialized range register (e.g., within control register 118 in FIG. 1).

In one embodiment, if Supervisor Mode Access Prevention (SMAP) is enabled and a status register (e.g., EFLAGS.AC) is set to zero, then any capability-controlled access to a user address immediately faults and the user capability table is not consulted. Alternatively, paging-based enforcement of SMAP may be utilized, with capabilities used with paging set to map the entire physical memory as user-accessible.

Note that 402 in FIG. 4A may include the selection of user or supervisor capability tables and/or SMAP enforcement.

Checks can be performed automatically on all memory operands, e.g., selecting the appropriate type of check to perform based on the contents of the upper (e.g., three) most significant bits in each pointer. Alternatively, a new Check-Cap instruction could be defined that is inserted by the compiler to convert capabilities to unencoded pointers after performing the appropriate security checks. One advantage of an explicit check instruction is the opportunity to elide checks that the compiler can statically determine to be unneeded. However, this may mean that the compiler or validator must be trusted to enforce isolation between mutually-distrustful compartments, and it increases the TCB.

Data instructions can be extended to specify an expected type. The type can be conveyed by being encoded into a new type of prefix, which is then matched against the type (e.g., hash) field in the capability table entry. The type (e.g., hash) field may also be used differently when entering multi-instruction compartments, as is described below.

There are opportunities to optimize repeated bounds checks against a single capability, e.g., by computing an expanded form of the bounds and storing them in registers that are reused for subsequent checks, e.g., hidden registers associated with the register containing the pointer. For example, if it is more costly in terms of time or energy to perform a bounds check using the encoded form of an offset width and a number of chunks in a capability table entry than it is to perform a direct comparison between an upper limit and an offset, then it may be more efficient to cache the upper limit in registers that are reused for subsequent checks. Other fields from the capability table entry may similarly be cached in registers.

A challenge in efficiently enforcing byte-granular range register checks for byte-granular ranges is that they may require a pair of 64-bit comparators, which may be power-hungry and high-latency. The encoding scheme described herein enables potential optimizations to reduce energy consumption and latency. First, the object size field may have a width (e.g., of 22 bits) which is less than the entire width of the register (e.g., 64 bits), and be compared against a same sized (e.g., 22-bit) slice of the (offset+access size−1) value, with that slice being selected based on the value of the object (e.g., chunk) size field. An efficient OR logic gate tree can be used to check that any more significant bits in (offset+access size−1) than those checked by the comparator all have the value 0 by verifying that the result is 0 for the OR logic gate tree with all of those bits as inputs. However, it may still be necessary to add the offset to the base. This can at least be parallelized with the offset check. Marking base bits above the linear address width for the current paging mode (e.g., 48 bits for 4-level paging and 57 bits for 5-level paging) would enable reducing the width of the adder.

Other encodings are possible and may support more efficient bounds checks. For example, floating-point-style bounds encodings that rely on only narrow-width comparators and no adder, since the absolute virtual address is contained within the pointer itself. However, this may necessitate bounds checks whenever the pointer is updated in addition to when the pointer is dereferenced, for example, which requires a tag bit to preserve pointer integrity, and it may require expanding the pointer size to 128 bits (e.g., instead of 64 bits) to provide space for security metadata in the pointer. Expanding pointer sizes and adding a tag bit increases memory overhead, register file widths, etc.

Figure 4B:
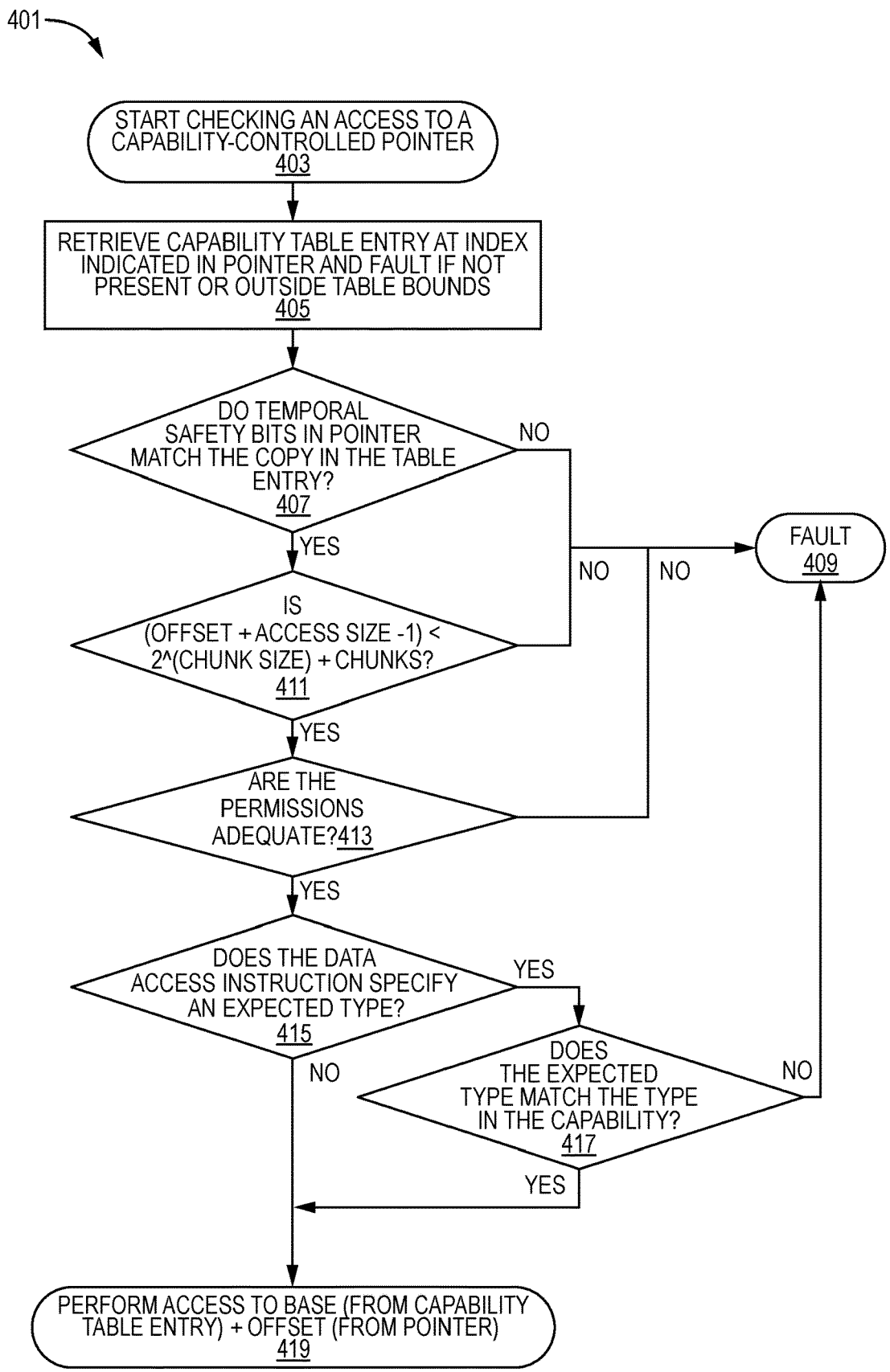
FIG. 4B illustrates another flow diagram for enforcing memory safety utilizing individually revocable capabilities (IRC) according to embodiments of the disclosure.

FIG. 4B illustrates a flow diagram 401 for enforcing memory safety utilizing individually revocable capabilities (IRC) according to embodiments of the disclosure. Flow diagram 401 includes checking a memory access based on a capability-controlled pointer 403 (e.g., after checking if a portion (e.g., the upper bit or bits) of the pointer indicate the pointer is an encoded inline capability (EIC) pointer), retrieving a capability table entry (for example, from capability table 142 for a user mode pointer and from capability table 144 for a supervisor mode pointer, e.g., with user mode or supervisor mode indicated by the address (e.g., pointer) being a user address (e.g., user data 140 in FIG. 1) or supervisor address (e.g., supervisor data 138 in FIG. 1), e.g., and not based on the current ring level the CPL in segment register 114 in FIG. 1) at the index indicated in the pointer and fault if not present or outside the bounds of the table 405, then if no fault, check if the tag (e.g., temporal safety bits) from the pointer matches the tag (e.g., temporal safety bits) from the capability table entry 407, and if no, then fault 409, and if yes, then perform a bounds check for the pointer and the object size specified in the table entry 411 (e.g., by checking if the offset plus access size minus one is less than the object size specified in the table entry, e.g., as shown in FIG. 6B) (e.g., utilizing a chunk size that is computed as the maximum of (0, Offset width minus a value (e.g., 20)), and if no, then fault 409, and if yes, then check if the permissions 613 in the table entry, e.g. with a set R bit indicating read permission, a set W bit representing write permission, and a set X bit representing execute permission, permit the requested access 413, and if no, then fault 409, and if yes, check if the data access instruction specifies an expected type 415, and if no, perform an access using the pointer 419 (e.g., an access to base value from capability table entry plus an offset from the pointer), and if yes, compare the expected type for the memory request access instruction to the object type from the capability table entry field 417 (e.g., the type value (e.g., hash) in FIG. 6B), and if no, then fault 409, and if yes, perform an access using the pointer 419 (e.g., an access to base value from capability table entry plus an offset from the pointer). In some embodiments, a bit may be defined in the capability table entry (e.g. a bit that would otherwise be reserved or unused) that indicates that a type check must always be performed at 417 prior to accessing memory using the capability. If the data access instruction does not specify an expected type when accessing such a capability, a fault may be generated.

In certain embodiments, a processor is able to simultaneously reference separate capabilities tables for both user and supervisor modes. For example, where the capability table that is used is selected based on whether the pointer (e.g., address) is a user or supervisor address, e.g., not based on the current ring level. For example, if the kernel attempts to access a capability referring to user memory, the user capability table will be consulted. User and supervisor addresses may be distinguished by configuring a specialized range register (e.g., within control register 118 in FIG. 1).

In one embodiment, if Supervisor Mode Access Prevention (SMAP) is enabled and a status register (e.g., EFLAGS.AC) is set to zero, then any capability-controlled access to a user address immediately faults and the user capability table is not consulted. Alternatively, paging-based enforcement of SMAP may be utilized, with capabilities used with paging set to map the entire physical memory as user-accessible.

Note that 403 in FIG. 4B may include the selection of user or supervisor capability tables and/or SMAP enforcement.

Checks can be performed automatically on all memory operands, e.g., selecting the appropriate type of check to perform based on the contents of the upper (e.g., three) most significant bits in each pointer. Alternatively, a new Check-Cap instruction could be defined that is inserted by the compiler to convert capabilities to unencoded pointers after performing the appropriate security checks. One advantage of an explicit check instruction is the opportunity to elide checks that the compiler can statically determine to be unneeded. However, this may mean that the compiler or validator must be trusted to enforce isolation between mutually-distrustful compartments, and it increases the TCB.

Data instructions can be extended to specify an expected type. The type can be conveyed by being encoded into a new type of prefix, which is then matched against the type (e.g., hash) field in the capability table entry. The type (e.g., hash) field may also be used differently when entering multi-instruction compartments, as is described below.

There are opportunities to optimize repeated bounds checks against a single capability, e.g., by computing an expanded form of the bounds and storing them in registers that are reused for subsequent checks, e.g., hidden registers associated with the register containing the pointer. For example, if it is more costly in terms of time or energy to perform a bounds check using the encoded form of an offset width and a number of chunks in a capability table entry than it is to perform a direct comparison between an upper limit and an offset, then it may be more efficient to cache the upper limit in registers that are reused for subsequent checks. Other fields from the capability table entry may similarly be cached in registers.

A challenge in efficiently enforcing byte-granular range register checks for byte-granular ranges is that they may require a pair of 64-bit comparators, which may be power-hungry and high-latency. The encoding scheme described herein enables potential optimizations to reduce energy consumption and latency. First, the object size field may have a width (e.g., of 10, 16, or 20 bits) which is less than the entire width of the register (e.g., 64 bits), and be compared against a same sized (e.g., 20-bit) slice of the (offset+access size−1) value, with that slice being selected based on the value of the object size field (e.g., the value indicating the number of chunks). An efficient OR logic gate tree can be used to check that any more significant bits in (offset+access size−1) than those checked by the comparator all have the value 0 by verifying that the result is 0 for the OR logic gate tree with all of those bits as inputs. However, it may still be necessary to add the offset to the base. This can at least be parallelized with the offset check. Marking base bits above the linear address width for the current paging mode (e.g., 48 bits for 4-level paging and 57 bits for 5-level paging) would enable reducing the width of the adder.

Other encodings are possible and may support more efficient bounds checks. For example, floating-point-style bounds encodings that rely on only narrow-width comparators and no adder, since the absolute virtual address is contained within the pointer itself. However, this may necessitate bounds checks whenever the pointer is updated in addition to when the pointer is dereferenced, for example, which requires a tag bit to preserve pointer integrity, and it may require expanding the pointer size to 128 bits (e.g., instead of 64 bits) to provide space for security metadata in the pointer. Expanding pointer sizes and adding a tag bit increases memory overhead, register file widths, etc.

Figure 5A:
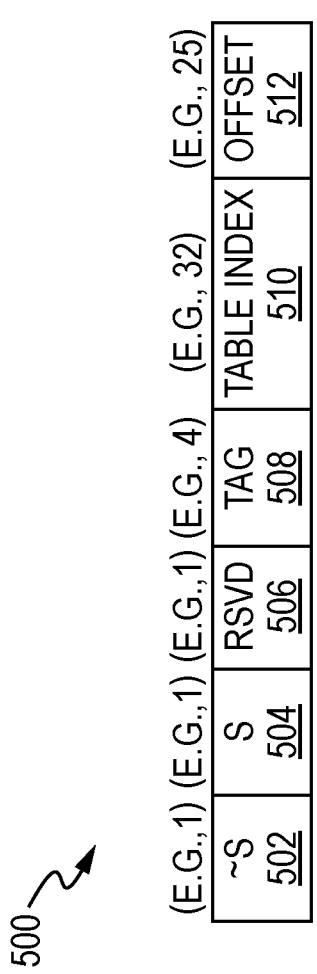
FIG. 5A illustrates an example format for a pointer controlled using individually revocable capabilities according to embodiments of the disclosure.

FIG. 5A illustrates an example format 500 for a pointer controlled using individually revocable capabilities according to embodiments of the disclosure. Pointer (e.g., 64 bit pointer) may include any one or more of fields of format 500. For example, a pointer may include a leading bit field 502 (e.g., which may be on either end of the pointer as determined by endianness of the pointer) followed by a next leading bit field 504. In certain pointers (e.g., canonical pointers), these two bits are to be the same value to indicate a valid pointer. In certain embodiments herein, the bits are to have opposite values (e.g., first bit being a one or zero and the next bit being the opposite of that) to indicate (e.g., to memory controller circuit 106 in FIG. 1) that the pointer is using individually revocable capabilities (IRC). The next field 506 (e.g., a single bit) may be reserved for future use. The next field 508 may be used to store the tag (e.g., a four bit tag) to serve as an allocated object tag for an IRC pointer. For example, such that a pointer to an allocated object in memory is to include the allocated object tag. The next field 510 (e.g., 32 bits) may be used to store an index into a capability table (e.g., capability table 142 for a user mode pointer or capability table 144 for a supervisor mode pointer). For example, an index identifying a particular entry of a plurality of entries in a capability table. The next field 512 may be used to store a pointer offset for example, an offset from an object base (e.g., object base 602 in FIG. 6A) stored in a capability table entry for that pointer).

In certain embodiments, only allocations up to a certain size (e.g., up to 4GiB) can be referenced using a single capability, although it is possible to generate multiple capabilities to reference consecutive portions of larger allocations. In reference to FIGS. 5A and 5B, in some embodiments the upper 32 bits are needed to denote pointers that are encoded in an IRC format and to index an entry in the table of capabilities (e.g., the entry indicating the capability controlling this pointer). Given the small size of certain objects, in certain embodiments, not all of the lower 32 bits are needed for expressing an offset within the object. Certain embodiments herein thus use those available bits to store (e.g., randomized) data that will differ between multiple allocations occupying the same capability table entry to enforce memory safety. In certain embodiments, larger objects have fewer bits available to store the tag (e.g., a tag being used as temporal safety bits) for a given size (e.g., width) of pointer, and thus may reduce the strength of temporal safety enforcement. In one embodiment, individual applications with varying requirements for temporal safety enforcement impose a limit on the minimum number of temporal safety bits and split larger allocations to be covered by multiple capabilities such that each of them has at least that minimum number of temporal safety bits.

Figure 5B:
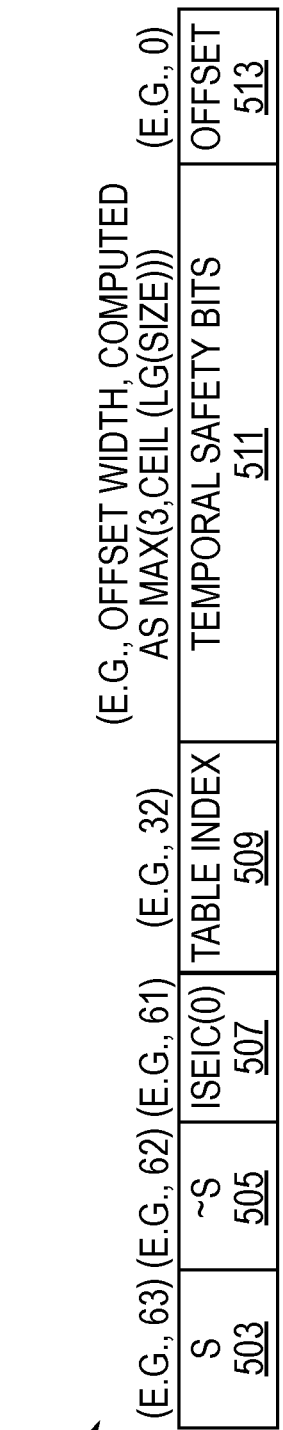
FIG. 5B illustrates another example format for a pointer controlled using individually revocable capabilities according to embodiments of the disclosure.

FIG. 5B illustrates an example format 501 for a pointer controlled using individually revocable capabilities according to embodiments of the disclosure. Pointer (e.g., 64 bit pointer) may include any one or more of fields of format 501. For example, a pointer may include a leading bit field 503 (e.g., which may be on either end of the pointer as determined by endianness of the pointer) followed by a next leading bit field 505. In certain pointers (e.g., canonical pointers), these two bits are to be the same value to indicate a valid pointer. In certain embodiments herein, the bits are to have opposite values (e.g., first bit being a one or zero and the next bit being the opposite of that) to indicate (e.g., to memory controller circuit 106 in FIG. 1) that the pointer is using individually revocable capabilities (IRC). The next field 507 (e.g., a single bit) may be used to store a value that when set (e.g., to 0 instead of 1) indicates the pointer is an IRC pointer, e.g., instead of an EIC pointer. The next field 509 (e.g., 29 bits) may be used to store an index into a capability table (e.g., capability table 142 for a user mode pointer or capability table 144 for a supervisor mode pointer). For example, an index identifying a particular entry of a plurality of entries in a capability table. The next field 511 may be used to store the tag (e.g., temporal safety bits) to serve as an allocated object tag for an IRC pointer. For example, such that a pointer to an allocated object in memory is to include the allocated object tag. The next field 513 may be used to store a pointer offset for example, an offset from an object base (e.g., object base 603 in FIG. 6B) stored in a capability table entry for that pointer).

In certain embodiments, only allocations up to a certain size (e.g., up to 4GiB) can be referenced using a single capability, although it is possible to generate multiple capabilities to reference consecutive portions of larger allocations. In reference to FIGS. 5A and 5B, in some embodiments the upper 32 bits are needed to denote pointers that are encoded in an IRC format and to index an entry in the table of capabilities (e.g., the entry indicating the capability controlling this pointer). Given the small size of certain objects, in certain embodiments, not all of the lower 32 bits are needed for expressing an offset within the object. Certain embodiments herein thus use those available bits to store (e.g., randomized) data that will differ between multiple allocations occupying the same capability table entry to enforce memory safety. In certain embodiments, larger objects have fewer bits available to store the tag (e.g., a tag being used as temporal safety bits) for a given size (e.g., width) of pointer, and thus may reduce the strength of temporal safety enforcement. In one embodiment, individual applications with varying requirements for temporal safety enforcement impose a limit on the minimum number of temporal safety bits and split larger allocations to be covered by multiple capabilities such that each of them has at least that minimum number of temporal safety bits.

FIG. 6A illustrates an example format 600 for an entry in a capability table for individually revocable capabilities according to embodiments of the disclosure. Capability table entry (e.g., 128 bit entry) may include any one or more of fields of format 600. For example, an entry may include a field 602 to store a value that identifies an object base (e.g., address of the first portion of the object). The next field 604 (e.g., 19 bits) may be reserved for future use. The next field 606 (e.g., 16 bits) may be used to store a value that indicates a type (e.g., from type safety) of the corresponding object that the entry corresponds to. In one embodiment, value in field 606 is a hash value. The next field 608 may be used to store the tag (e.g., a four bit tag) to serve as an allocated object tag for an IRC capability table entry (e.g., as the tag that is checked against the pointer tag 508 (e.g., a four bit tag) from FIG. 5A). The next field 610 (e.g., 22 bits) may be used to store a value that indicates a size of the object (e.g., the size in 8B chunks) corresponding to the entry in format 600. The next field 612 (e.g., 3 bits) may be used to store a value that indicates permissions for the data object, e.g., an "X" bit, that when set to a value (e.g., one), indicates that the object can be executed, a "W" bit, that when set to a value (e.g., one), indicates that the object can be written to, and an "R" bit, that when set to a value (e.g., one), indicates that the object can be read.

FIG. 6B illustrates an example format 601 for an entry in a capability table for individually revocable capabilities according to embodiments of the disclosure. Capability table entry (e.g., 128 bit entry) may include any one or more of fields of format 601. For example, an entry may include a field 603 to store a value that identifies an object base (e.g., address of the first portion of the object). The next field 605 (e.g., 6 bits) may be used to store a value that indicates a type (e.g., from type safety) of the corresponding object that the entry corresponds to. In one embodiment, value in field 605 is a hash value. The next field 607 may be used to store the tag (e.g., temporal safety bits check value) (e.g., 29 bits) to serve as an allocated object tag for an IRC capability table entry (e.g., as the tag that is checked against the pointer tag 511 (e.g., temporal safety bits) from FIG. 5B). The next field 609 (e.g., 6 bits) may be used to store a value that indicates an offset width. The next field 611 (e.g., 20 bits) may be used to store a value that indicates a size of the object (e.g., the size in 8B chunks) corresponding to the entry in format 601. The next field 613 (e.g., 3 bits) may be used to store a value that indicates permissions for the data object, e.g., an "X" bit, that when set to a value (e.g., one), indicates that the object can be executed, a "W" bit, that when set to a value (e.g., one), indicates that the object can be written to, and an "R" bit, that when set to a value (e.g., one), indicates that the object can be read.

Certain embodiments of an access checking flow indicate the semantics of each field of the pointer and table entry formats. The formats may or may not be defined architecturally, e.g., even though capabilities are stored in memory. In one embodiment, if it is not defined architecturally, then particular instruction(s) are used for generating and querying capabilities, which provides opportunities to potentially redefine how capabilities are formatted and stored.

In one embodiment, byte-granular bounds are supported, but tags (e.g., temporal safety bits check values) are limited to a smaller width (e.g., 29 bits) to conserve space in the table entries. Thus, the effective offset width field values can range from 3 to 64 in certain embodiments. To encode this range into a 6-bit field, the stored offset width field value is increased by three prior to being used in checks in certain embodiments. Larger widths (e.g., up to 64 bits) may be supported to enable initializing default capability registers, e.g., as described below. However, for capabilities that control accesses by pointers with a given (e.g., 32-bit) offset, the maximum offset width may be the same number of bits (e.g., 32 bits). The offset width may generally refer to the effective offset width. However, the sample offset width values printed by the sample program below are the raw, stored values. The object size field may also be adjusted prior to storage. Certain embodiments do not need to represent the value 0, e.g., where all usable allocations must cover at least a single chunk. If a capability is needed for representing an empty object, a capability table entry with the RWX bits all zeroed can be used for that purpose. In one embodiment, the number of chunks is decremented prior to storing it in the capability table entry so that an object with the full (e.g., $2^{20}$) chunks for each chunk size can be represented. The object size may generally refer to the effective number of chunks. However, the sample chunks field values printed by the sample program below are the raw, stored values. Turning now to FIGS. 7A-7B, examples of pointers and their corresponding table entries for various representative allocations are made by a scripting engine that exhibits a non-control data vulnerability.

FIGS. 7A-7C illustrate pseudocode 700 that shows individually revocable capabilities data formats and how pointer narrowing can mitigate a sample vulnerability according to embodiments of the disclosure. Pseudocode 700 illustrates a program with library routine invocations to generate ZMS capabilities at illustrative locations. In reality, a compiler may automatically instrument a program with calls to instructions that perform the equivalent functionality to the library routine, and the results of the instructions would be used in place of ordinary pointers. The point of this sample program is solely to illustrate example capability data formats and how pointer narrowing can mitigate a sample vulnerability. Pointer narrowing may be applied by a compiler to many more locations in addition to the one highlighted below. Furthermore, a compiler may instrument code to deallocate capabilities when they are no longer needed, which is not something that this code illustrates. A compiler may also use actual narrowing operations (e.g., described below) that check that the bounds of the narrowed capability fall within the bounds of some authorized parent capability.

FIGS. 8A-8C illustrate output 800 (e.g., including dumps of the generated capabilities) of an execution of the pseudocode in FIGS. 7A-7C that shows usage of a pointer controlled using individually revocable capabilities and a capability table for individually revocable capabilities according to embodiments of the disclosure.

In certain embodiments, new MSRs are defined to point to physically-addressed user capability table (e.g., capability table ID (user) register 120) and supervisor capability table (e.g., capability table ID (supervisor) register 122). FIG. 9 illustrates an example format 900 for a capability table identification (ID) model specific register (MSR) according to embodiments of the disclosure. This may be for a user or supervisor capability table entry. Format 900 may include one or more of a physical base field 902 (e.g., in bit positions [63:36]), reserved field 904 (e.g., in bit position [35]), number of allowed entries in the table (e.g., ENT_CNT) 906 (e.g., in bit positions [34:29]), and minimum entry in the table (e.g., cursor base) 908 (e.g., in bit positions [28:0]). In one embodiment, each user or supervisor capability table has a fixed size, e.g., to store up to $2^{29}$ entries, e.g., $2^{36}$ bytes. In certain embodiments, the bases of the tables are required to be aligned to that fixed size (e.g., $2^{36}$ bytes) to permit computation of entry addresses. The allowable entry (e.g., cursor) values can be constrained by configuring the minimum entry in the table (e.g., cursor base) 908 to specify a minimum value (CURSOR_BASE) and the (e.g., log 2) of the number of allowed entries (ENT_CNT) 906 (e.g., cursor values). This may be useful for saving memory if different multi-instruction compartments are assigned separate capability tables by assigning each compartment a different slice of a table with a single base address. It may also be useful for fitting capability tables into regions that are not aligned to the maximum size of the table by limiting the cursor values to prevent using some regions as capability table entries, e.g., even though they are within the $2^{36}$ bytes referenced by the base value. Those blocked regions can then be used to store other data.

In certain embodiments, new MSRs are also defined to store cursors pointing into each of the capability tables, e.g., a capability table cursor for user (CAP_CURSOR_U) and a capability table cursor for supervisor (CAP_CURSOR_S). In certain embodiments, the cursor points to the next table entry to be considered for storing the next capability that is added to the capability table on the current (e.g., logical core or logical processor), as described herein. In one embodiment, it is desirable to assign each logical processor a different range of the capability table to avoid atomic accesses to the same cache line. Referring again to FIG. 1, capability table cursor (user) is stored in register 124 and capability table cursor (supervisor) is stored in register 126.

In certain embodiments, a virtual machine control structure (e.g., VMCS 154 in FIG. 1) contains fields representing both the guest and host variants of these MSRs. Simply using a MSR save and restore facility may be inadequate, for example, where the host is to access the guest MSR values as discussed below.

The capability tables may either be contiguous in physical memory or arranged as multi-level tables analogous to page tables, e.g., to avoid requiring the OS to allocate large, contiguous regions of physical memory. It is also possible to place the capability table in linear memory, but that may introduce a requirement to protect the table from unauthorized accesses since the user mode table would become addressable by data accesses issued from user mode, and it would introduce additional page table walk overheads when accessing capability table entries. An advantage of storing the tables in linear memory is that, in certain embodiments, they would be automatically managed by an OS swap routine, and also that a contiguous table arrangement could be supported without requiring a contiguous physical memory allocation and wasted space for unused regions of the table.

Certain embodiments herein allow for the probabilistic detection of memory safety violations. For example, where adjacent overflows are detected deterministically, assuming that the memory controller (e.g., memory manager) ensures that adjacent capability table entries have different temporal safety values or that they cover non-adjacent memory ranges. In one embodiment, the probability of detecting non-adjacent overflows or temporal safety violations depends on how likely an adversary is to guess both the temporal safety value and the index of an object with the bounds desired by the adversary. Thus, the number of bits in a tag (e.g., temporal safety bits) for the targeted allocation has a bearing on the probability and may thus be adjusted accordingly in certain embodiments.

Figure 10:
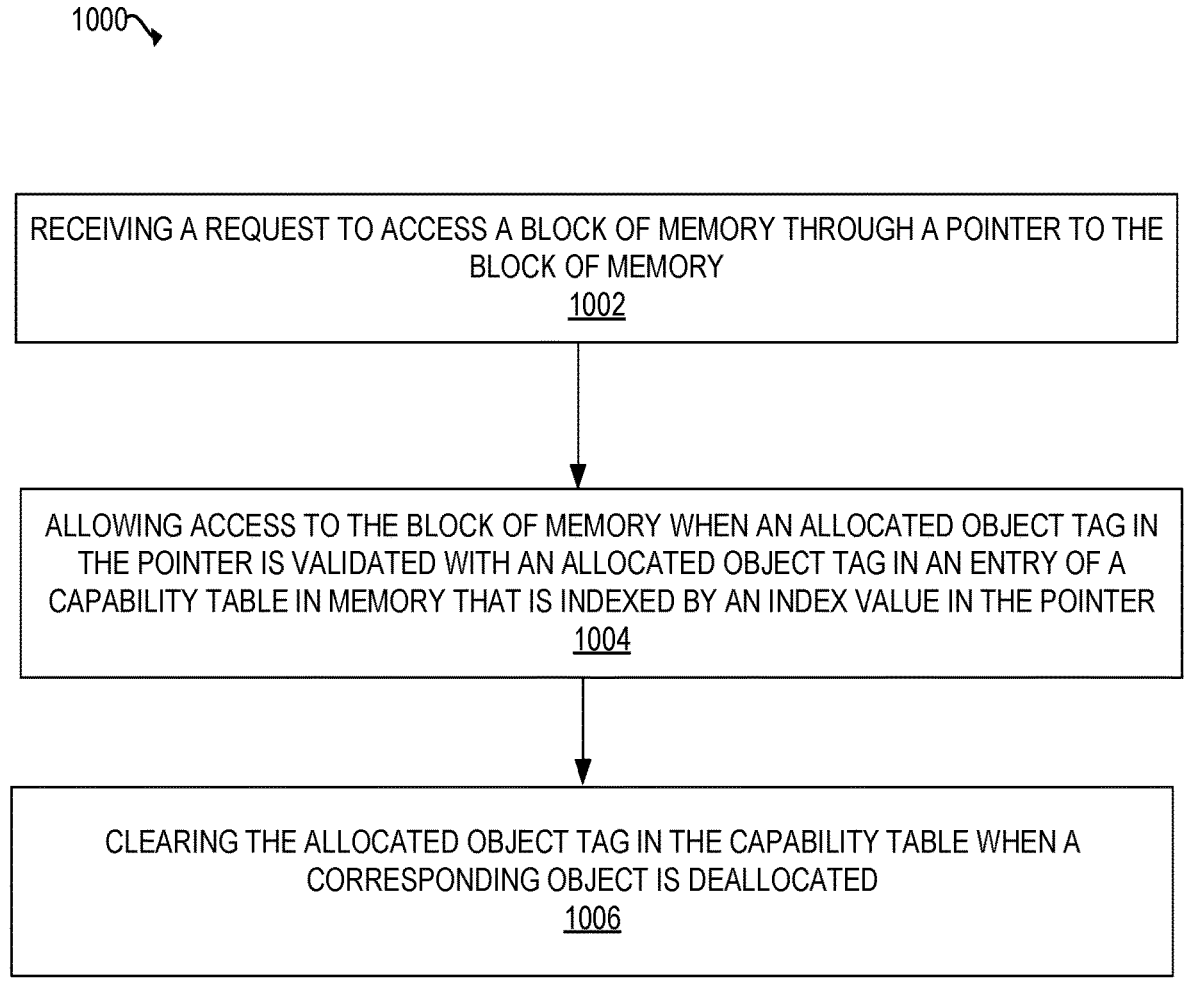
FIG. 10 illustrates a method of enforcing memory safety utilizing individually revocable capabilities for an access request to a block of memory according to embodiments of the disclosure.

FIG. 10 illustrates a method 1000 of enforcing memory safety utilizing individually revocable capabilities for an access request to a block of memory according to embodiments of the disclosure. Depicted method 1000 includes receiving a request to access a block of memory through a pointer to the block of memory 1002; allowing access to the block of memory when an allocated object tag in the pointer is validated with an allocated object tag in an entry of a capability table in memory that is indexed by an index value in the pointer 1004; and clearing the allocated object tag in the capability table when a corresponding object is deallocated 1006.

In some embodiments, uninitialized use can be mitigated by initially marking an object as write-only in its capability table entry. Software can be instrumented to only mark the object as readable after it has been initialized. In alternative embodiments, a dedicated initialized flag bit may be defined in the capability table entry to indicate whether the object has been initialized. The processor may automatically set the bit when the object is written if the bit was previously unset. The processor may generate a fault if an attempt is made to read using a capability table entry with an unset initialized flag. In alternative embodiments, multiple initialized flag bits may be defined covering different portions of the represented allocation. For example, if four initialized flag bits are defined, each may cover a quarter of the represented allocation and may indicate whether the corresponding quarter of the represented allocation has been initialized.

For each new capability (e.g., for a corresponding, allocated object), in certain embodiments only supervisor mode is permitted to generate completely new capabilities, e.g., although user mode is permitted to narrow existing capabilities to which it has access. Table 1 below describes the name (e.g., example mnemonic), input operands, output operands, and operations for a generate capability (GenCap) instruction. In one embodiment, GenCap is a privileged instruction.

TABLE 1

| GenCap Instruction | |
|---|---|
| Name | GenCap |
| Input operands | Object base<br>Object size<br>Object type hash<br>HU/HS/GU/GS indicator<br>Permissions |
| Output operands | Pointer encoded as capability |
| Operation | GenCap atomically inserts a new entry into a capability table and outputs an encoded capability referencing the new capability table entry. GenCap checks whether the capability cursor points past the end of the capability table. If so, GenCap faults. GenCap then checks the entry pointed to by the capability cursor. If it is present, then GenCap faults. If it is not present, then GenCap populates that entry and increments the cursor. The table is selected based on the HU/HS/GU/GS indicator. HU indicates the "host user" table, HS "host supervisor", GU "guest user", and GS "guest supervisor". Host indicators actually direct accesses to guest tables when GenCap is invoked from (e.g., VMX) non-root mode. The guest indicator refers to the guest of the current software rather than the mode that is typically used to execute guests, e.g., non-root mode. This naturally accommodates nested virtualization.<br>GenCap can be configured to exit to the VMM so that a VMM can use ZMS to sandbox a virtualized kernel. GenCap may generate a capability table entry based on the input parameters to GenCap and other inputs. For example, the object base 603 may be set to match the object base input operand, the type field 605 may be set to match the object type hash input operand, the temporal safety bits check value 607 may be set to a random value, the offset width 609 may be set to the maximum of 3 or the ceiling of the log base 2 of the object size input operand, the chunks field 611 may be set to the ceiling of the object size divided by the maximum of one or two to the power of the computed offset width 609 minus the width of the chunks field 611, and the permission bits 613 may be set to match the permissions input operand.<br>GenCap may generate a capability to be output based on the input parameters to GenCap, other inputs, and the capability table entry contents computed |

TABLE 1-continued

GenCap Instruction

| Name | GenCap |
|---|---|
| | by GenCap. For example, the IsEIC bit 507 may be unset, the table index 509 may be set to the table index for the newly-allocated capability, the temporal safety bits 511 may be set to match the temporal safety bits check value 607, and the offset 513 may be set to zero. Analogous operations to those described above may be performed for alternative capability table entry and pointer formats, e.g. as depicted in FIGS. 5A and 6A. |

In alternative embodiments, a GenCapU instruction variant may be defined to access the usermode capability table for the current guest or host to avoid the need for a HU/HS/GU/GS indicator. The host may walk the guest capability table directly in memory if the table entry format is architecturally defined.

If GenCap instruction faults due to the cursor being out-of-bounds or pointing to a present entry, then the kernel/VMM is responsible for identifying an available capability table entry and updating the cursor to point there prior to re-executing the faulting instruction in certain embodiments.

If the capability table fills completely, then the kernel/VMM may swap out an entry to make room for the new capability in certain embodiments. In that case, the capability table acts as a cache backed by some other SW-managed structure that may map multiple capability table entries to a single index simultaneously. Attempts by SW to access an object corresponding to a swapped-out capability would fault, and the kernel/VMM could then swap in the appropriate capability prior to retrying the faulting instruction in certain embodiments.

To support swapping as well as simply clearing capability table entries, a read capability (ReadCap) instruction is defined in Table 2 below.

TABLE 2

ReadCap Instruction

| Name | ReadCap |
|---|---|
| Input operands | Pointer containing capability table index and tag (e.g., temporal safety bits) H/G indicator (the U/S indicator is contained implicitly in the pointer) |
| Output operands | Object base Object size Object type hash Present Indicator of whether capability is for code pointers |
| Operation | ReadCap retrieves and returns information from a capability table entry. If the delete operand is set, then the capability table entry is simultaneously zeroed. All of these operations are atomic. |

In one embodiment, a ReadCap instruction is used to free capability table entries as soon as possible (e.g., as soon as an object goes out of scope or is freed) to make room for new entries and to more precisely enforce temporal safety.

User software can narrow capabilities, e.g., to generate a capability granting access to just a single field or array entry within a larger allocation, using a narrow capability (NarrowCap) instruction as defined in Table 3 below.

TABLE 3

NarrowCap Instruction

| Name | NarrowCap |
|---|---|
| Input operands | Pointer referring to table index for parent capability to be narrowed as well as the base offset Narrowed size Narrowed RWX permissions Narrowed object type hash HU/HS/GU/GS indicator (if invoked from supervisor, otherwise fixed to GU) |
| Output operands | Table index for newly-allocated capability |
| Operation | Check that the input pointer is within the bounds of a valid parent capability, and that the narrowed XWR permissions are a subset of those in the parent. Check that adding the narrowed size to the input pointer does not take it outside the bounds of the parent capability. Generate the narrowed output capability similarly to GenCap using the base of the parent capability + the offset of the input pointer as the new base and the narrowed size as the new size. |

In certain embodiments, not all pointers are required to explicitly specify a capability table index, which can support legacy compatibility and interoperability with other memory safety mechanisms. Those pointers that do not specify a capability table index may be restricted using a default data capability (DDC) register (e.g., default data capability register 128 in FIG. 1). FIG. 11 illustrates an example format 1100 for one or more default data capability (DDC) model specific registers (MSRs) according to embodiments of the disclosure. Format 1100 may include a field 1102 to store a value that identifies an object base (e.g., address of the first portion of the object). The next field 1104 (e.g., 35 bits) may be reserved for future use. The next field 1106 (e.g., 6 bits) may be used to store a value that indicates the offset width. The next field 1108 (e.g., 20 bits) may be used to store a value that indicates a size of the object (e.g., the size in 8B chunks). The next field 1110 (e.g., 1 bit) may be reserved for future use. The next field 1112 (e.g., 2 bits) may be used to store a value that indicates permissions for the data object, e.g., a "W" bit, that when set to a value (e.g., one), indicates that the object can be written to, and an "R" bit, that when set to a value (e.g., one), indicates that the object can be read.

The format 1100 of that register may be a simplification of a capability table entry format, e.g., as shown in FIG. 6A or 6B. Field 1108 (e.g., chunks and chunk size fields) may be interpreted identically to how they are interpreted in FIG. 6A or 6B. If memory tagging is enabled or the processor is configured to ignore the slice of linear address bits containing the tag bits, then the tag bits may be ignored during the DDC check. If neither of the read or write (R/W) bits are set, then all data pointers are required to specify an explicit capability table index or access will be denied in certain embodiments.

Bounds checks for the DDC may be performed differently than for capabilities explicitly loaded from the capability table, e.g., where DDC_BASE is subtracted from the provided address to compute the offset. Once the offset has been computed, it can be checked using a (e.g., 20-bit wide) comparator and an OR logic gate tree for the more significant bits to ensure that (offset+access size)<= $2^{chunk\ size}$*chunks.

In certain embodiments, DDC checks are performed on final linear addresses, so F segment (FS)-relative and G segment (GS)-relative accesses still add the appropriate segment base when computing the pointer that will finally be checked against DDC. However, in certain embodiments software is modified to use explicit capabilities directly to refer to thread-local storage, thus avoiding redundant arithmetic operations in the memory access path.

Additional default data capabilities can be defined and consulted instead of DDC based on the effective segment of each access. For example, can define a DFC for "Default FS Capability", etc. This would eliminate redundant arithmetic without requiring TLS code to be modified.

The DDC can be initialized or updated by a user instruction to set DDC (SetDDC) as in Table 4 below, that can copy the relevant fields from any capability table entry accessible to the current program. The kernel can also use the instruction to load a capability table entry from the current supervisor capability table. In one embodiment, separate DDCs are defined for user and supervisor modes, and VMCS fields are defined for both in guest and host areas. VMM updates to the guest DDCs can be performed using a VM write instruction (VMWRITE). A clear DDC instruction as in Table 5 below may also be used.

Accesses from supervisor mode to canonical user addresses are checked against the user DDC in certain embodiments. User and supervisor addresses may be distinguished by configuring a specialized range register (e.g., within control register 118 in FIG. 1).

TABLE 4

SetDDC Instruction

| Name | SetDDC |
|---|---|
| Input operands | Pointer specifying capability to be used to initialize DDC as well as the tag (e.g., temporal safety bits). The offset in the pointer should be zero. U/S indicator (if invoked from supervisor, otherwise fixed to U) |
| Output operands | None |
| Operation | Check that the specified capability is present and has a matching tag (e.g., temporal safety value), and then use the capability to initialize the specified DDC. |

TABLE 5

ClearDDC Instruction

| Name | ClearDDC |
|---|---|
| Input operands | U/S indicator (if invoked from supervisor, otherwise fixed to U) |
| Output operands | None |
| Operation | Clear the specified DDC register. |

Some capabilities may permit fetches. A Current Code Capability (CCC) register may constrain the values of the instruction pointer (e.g., RIP).

FIG. 12 illustrates an example format 1200 for one or more current code capability (CCC) model specific registers (MSRs) according to embodiments of the disclosure. Format 1200 may include a field 1202 to store a value that identifies an object base (e.g., address of the first portion of the object). The next field 1204 (e.g., 35 bits) may be reserved for future use. The next field 1206 (e.g., 6 bits) may be used to store a value that indicates the offset width. The next field 1208 (e.g., 20 bits) may be used to store a value that indicates a size of the object (e.g., the size in 8B chunks). The next field 1210 (e.g., 1 bit) may be used to store a value that may cause all fetches to fault if it is cleared (e.g., set to zero). The next field 1212 (e.g., 2 bits) may be reserved for future use. In alternative embodiments, field 1212 may contain read and write enable bits to permit control over data accesses that are modified using a code segment override prefix.

The data formats in FIG. 11 and/or FIG. 12 may be the formats from FIGS. 5B and 6B. It should be understood that the data formats in FIG. 11 and/or FIG. 12 may be the formats of FIGS. 5A and 6A.

In certain embodiments, CCC is managed similarly to DDC, except that user software can only update it via an indirect branch that specifies a capability as a destination. Such branches operate by first checking the tag (e.g., temporal safety bits) in the pointer, then updating CCC with the value of the specified capability, computing the branch destination by adding the offset in the pointer to the base in the capability, and finally completing the branch.

The CCC can be initialized or updated by an instruction to set CCC (SetCCC) as in Table 6 below. In one embodiment, a CCCs is only defined for supervisor modes. A clear CCC instruction as in Table 7 below may also be used.

TABLE 6

SetCCC Instruction

| Name | SetCCC |
|---|---|
| Input operands | Pointer specifying capability to be used to initialize CCC as well as the tag (e.g., temporal safety bits). The offset in the pointer should be zero. |
| Output operands | None |
| Operation | Check that the specified capability is present and has a matching tag (e.g., temporal safety value), and then use the capability to initialize the user CCC. |

TABLE 7

ClearCCC Instruction

| Name | ClearCCC |
|---|---|
| Input operands | None |
| Output operands | None |
| Operation | Clear the user CCC register. |

In one embodiment, SetCCC and ClearCCC instructions are provided solely for the supervisor to update the user CCC.

In one embodiment, individually revocable capabilities for code are not intended for fine-grained control flow integrity (CFI) enforcement, but rather compartmentalization. Control flow enforcement (CET) can be used for the former.

In one embodiment, if Supervisor Mode Execution Prevention (SMEP) is enabled and a status register (e.g., EFLAGS.AC) is equal to zero, then attempts within supervisor mode to branch to a user capability will fault.

There are opportunities to optimize CCC checks for non-branching code sequences, e.g., populating a narrow counter with the remaining bytes that can be fetched without exceeding the limit of the current CCC up to the maximum capacity of the counter and efficiently decrementing that as each byte is fetched, faulting if it hits zero.

In certain embodiments of an initializing process, the kernel allocates an initial capability covering the entire linear address space with RWX permissions in the user capability table when launching a process, and it initializes both DDC and CCC using that capability.

In certain embodiments, capability table entries can be retrieved directly from the ordinary data cache (e.g., data cache 3374 in FIG. 33B). However, that may require issuing an additional cache load when performing a memory access, which will pressurize the ports available for satisfying cache loads. An alternative to avoid that pressurization and to reduce the delay for computing the linear address and checking the access request is to cache capability table entries in a dedicated microarchitectural structure (e.g., cache 156 in FIG. 1). In one embodiment, the capability cache would be indexed by the capability table index field contained in the pointer. When a capability table entry is updated, any cached copies of that entry must be invalidated. Caching of capabilities can be accomplished using new instructions that can be executed by user mode or privileged software, for example, the invalidate capability instruction in Table 8 and the invalidate all capabilities instruction in Table 9.

TABLE 8

| InvCap Instruction | |
|---|---|
| Name | InvCap |
| Input operands | Pointer containing the index of the capability table entry to be invalidated. U/S indicator (if invoked from supervisor, otherwise fixed to U). |
| Output operands | None |
| Operation | Invalidate cached copies of the capability table entry identified by the supplied pointer on the current logical processor. Only invalidate entries associated with the current value of CAP_TAB_U if the U/S indicator is set to U or CAP_TAB_S if the U/S indicator is set to S. |

TABLE 9

| InvAllCaps Instruction | |
|---|---|
| Name | InvAllCaps |
| Input operands | U/S indicator (if invoked from supervisor, otherwise fixed to U). |
| Output operands | None |
| Operation | Invalidate the entire capability cache on the current logical processor. Only invalidate entries associated with the current value of CAP_TAB_U if the U/S indicator is set to U or CAP_TAB_S if the U/S indicator is set to S. |

In one embodiment, the instruction definitions herein require software to send a message to other logical cores (e.g., logical processors) requesting that they also invalidate the affected capability table entries in their caches. Alternatively, the instructions themselves can be defined to automatically communicate with other logical cores (e.g., logical processors) to perform that operation.

In some embodiments, it is possible to define one or more levels of dedicated caches for leaf and/or non-leaf table entries to avoid accessing memory to load cached table entries. Instructions may be defined to invalidate those caches by identifying particular cache entries to invalidate, e.g., by specifying a capability table index, or by specifying that all cache entries should be invalidated.

Type confusion can be mitigated by preceding a pointer access with a series of instructions to check whether the type of the object being accessed falls within a set of expected types. In many cases, the object must precisely be of a particular type. However, in other cases, e.g., polymorphic class instances, a single method may be capable of operating on a hierarchy of types.

The following instructions in Tables 10 and 11 are defined to support type-checking:

TABLE 10

| TypeChk instruction | |
|---|---|
| Name | TypeChk |
| Input operands | Pointer containing the index of the capability table entry to be checked. Type ID |
| Output operands | None |
| Operation | Check whether the type ID in the capability table entry matches the specified type ID. If not, generate a fault. |

TABLE 11

| TypeJmp instruction | |
|---|---|
| Name | TypeJmp |
| Input operands | Pointer containing the index of the capability table entry to be checked. Type ID Branch destination |
| Output operands | None |
| Operation | Check whether the type ID in the capability table entry matches the specified type ID. If so, jump to the specified destination. |

In certain embodiments for checking polymorphic types, e.g., a class hierarchy comprising three classes A, B, and C with B and C being subclasses of A, a sequence of TypeJmp instructions is emitted in the prologue of a method in A to check whether the supplied object is an instance of A or one of its subclasses:

TypeJmp 1f, $type_id_A, % rax
TypeJmp 1f, $type_id_B, % rax
TypeChk $type_id_C, % rax
1: . . .

In one embodiment, if any of the type checks succeeds, then execution will proceed at label 1. Otherwise, a fault will be generated by the TypeChk instruction.

In some embodiments, a straightline control flow between type check instructions and the accesses guarded by those instructions may be used to prevent an adversary from manipulating control flow to bypass the type checks.

Certain embodiments herein provide defining and switching of compartments. In certain embodiments, there are two degrees of compartmentalization. In one embodiment, the first level can be managed and switched entirely by user mode software, but it only provides probabilistic isolation and it does not update privileged controls. In one embodiment, the second level requires a system call for configuration and switching, but it provides deterministic isolation, and it can update privileged controls. However, in certain embodiments, a page table switch is not required, which avoids associated overheads. The below describes additional instructions and associated data structures defined to permit user mode software to trigger a compartment switch that updates privileged structures without performing a system call.

User Mode Compartmentalization

Figure 13:
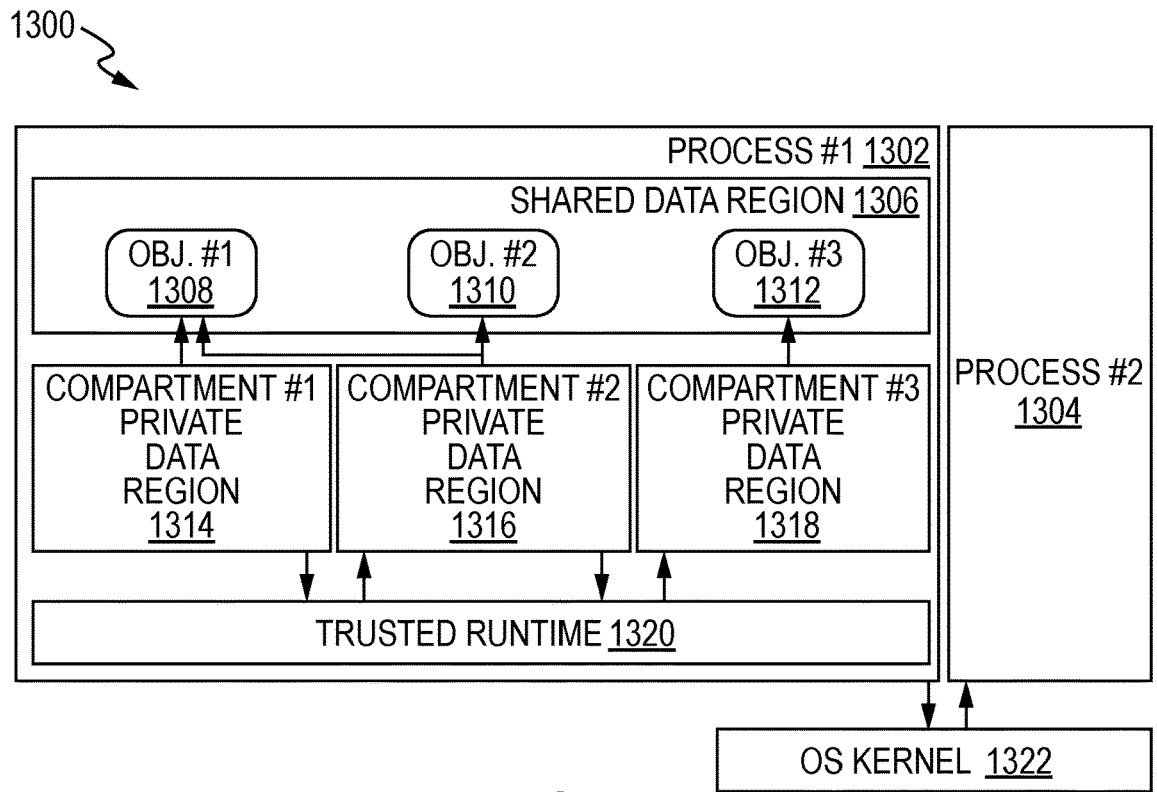
FIG. 13 illustrates architecture for user mode software-defined compartments according to embodiments of the disclosure.

In one embodiment, user mode managed compartments are configured by a trusted runtime. Such a process configuration is depicted in FIG. 13. In certain embodiments, each compartment has a private data region to contain its stack, heap, etc., and it may also need access to various objects stored in the shared data region. FIG. 13 illustrates architecture 1300 for user mode software-defined compartments according to embodiments of the disclosure. Architecture 1300 includes a first process 1302 and a second process 1304. Processes may be user applications. First process 1302 includes a shared data region 1306 having a first object 1308, second object 1310, and third object 1312 allocated therein. As depicted, a first compartment 1314 is configured to have access to first object 1308, a second compartment 1316 is configured to have access to first object 1308 and second object 1310, and a third compartment 1318 is configured to have access to third object 1312. In one embodiment, trusted runtime 1320 configures (e.g., establishes) each compartment (e.g., mediates compartment creation and switching). In one embodiment, the OS 1322 (e.g., kernel) configures each process (e.g., mediates process creation and switching).

In certain embodiments, to create a compartment, the trusted runtime 1320 determines which capabilities to delegate to the new compartment to provide access to authorized objects in the shared data region, for example, it collects pointers referencing those capabilities in the new compartment's private data region or in a dedicated memory region that will be accessible via a pointer with a capability reference passed to the new compartment via a register. Once the new compartment is running, it can retrieve capability references from the list in the prepared memory region in one embodiment. In certain embodiments, the trusted runtime then sets DDC register to cover the private data region for the new compartment prior to transferring control to it. In certain embodiments, the trusted runtime uses a branch to invoke the new compartment and to also implicitly set CCC register using a capability covering the code region for the new compartment.

In certain embodiments, it may be possible for a compartment to guess the indices and temporal safety bits associated with other capabilities in the capability table besides those that it is authorized to access, which is why this form of compartmentalization provides only probabilistic isolation. However, any failed attempt by a malicious compartment to break out of its sandbox will result in a fault, which the OS can forward to the trusted runtime so that the runtime can terminate the malicious compartment.

In certain embodiments, to call out of a compartment into the trusted runtime 1320, the compartment can perform an indirect branch to an execute-only capability into a trampoline region in the trusted runtime. In one embodiment, the trusted runtime provides this execute-only capability to the compartment when invoking it, e.g., in a register. Note that this does not affect the internal application binary interface (ABI) of the compartment in certain embodiments, e.g., analogous to a system call. In certain embodiments, the execute-only capability for the trampoline region should cover as small a region of code as possible, and that region should contain only a single end branch (ENDBRANCH) instruction so that only a single entry point can be accessed by the compartment. The trampoline can embed the code and data capabilities for the trusted runtime as immediate operands so that the trampoline can invoke the trusted runtime. In certain embodiments, the trampoline is trusted to invoke the trusted runtime at an allowable entry point, since it may have access to code with numerous end branch instructions through the executable capability for the trusted runtime.

Note that this compartmentalization approach supports infinite nesting in certain embodiments. In one embodiment, each compartment is able to establish a trusted runtime within itself and create additional sub-compartments by narrowing its capabilities. In one embodiment, the root trusted runtime may be able to forward information about a faulting access to the affected compartment if that compartment is trusted by the root to not attempt to brute-force search the capability table. If the compartment is itself hosting sub-compartments, it may then be able to terminate just the faulting sub-compartment in certain embodiments.

A potential issue with this approach is that compartments are allowed to create new capabilities, which may fill the capability table, and they are not automatically reclaimed when a compartment is terminated.

In certain embodiments, a one-pass capability table garbage collection procedure can be used to reap unused entries. For example, with the inputs to the procedure being the bounds corresponding to capabilities that the immediate parent runtime allocated to the child compartment that terminated, e.g., the capability for the private data region and all of the shared data region allocations the child was authorized to access and that are no longer accessible by any other compartments. In certain embodiments, the garbage collector, which runs in supervisor mode, performs a linear pass to identify and remove all capabilities that are narrower than the input capabilities, e.g., such that their bounds fall entirely within the bounds of the input capabilities. This assumes that no other capabilities referring to those narrowed regions were generated for some other purpose in certain embodiments. Alternatively, the garbage collector may be run on batched inputs, e.g., when the capability table runs out of space. The user mode runtimes can coordinate to identify regions that are currently unallocated and pass information on the bounds of those regions to the garbage collector. The supervisor can invoke a registered callback in the root trusted runtime requesting such information, and that callback can invoke registered callbacks in its child compartments if it lacks sufficient free memory at the top-level. This approach can even be used for non-compartmentalized processes that for whatever reason do not free capability table entries in a timely fashion.

Tagging may be enabled within all or a portion of each compartment's private data region to support fine-grained memory safety without the overheads of capabilities for small objects or objects with scattered access patterns. This zoned approach is described in more detail below.

The above may avoid the overhead and complexity of tagged 128-bit pointers while providing direct temporal safety enforcement.

Supervisor Managed Compartments

In certain embodiments, the basic software structure described for user mode managed compartments can be applied to supervisor-managed compartments, except that equivalent operations to those performed by the trusted runtime are performed by the privileged kernel instead. One advantage of managing compartments in supervisor mode is that a separate capability table can be allocated for each compartment, which deterministically isolates the compartments. Other potential advantages include being able to configure features with privileged configuration interfaces such as Intel® Resource Director Technology (RDT) on a per-compartment basis. Some side channel mitigations also have privileged configuration interfaces that are used when switching between mutually-distrustful software, e.g., an Indirect Branch Predictor Barrier (IBPB), so invoking the supervisor when switching compartments provides an opportunity for accessing such interfaces.

One new challenge that may arise when assigning a separate capability table to each compartment is that shared capabilities need to be synchronized between the tables in certain embodiments. For example, if two compartments have access to a hierarchy of objects in the shared data region such that the objects contain pointers to other objects deeper in the hierarchy, then it may be important that the capability tables for both compartments contain those capabilities at identical indexes in both tables. This may necessitate allocating identical ranges of capability table entry storage for each pair of compartments that share data.

Figure 14:
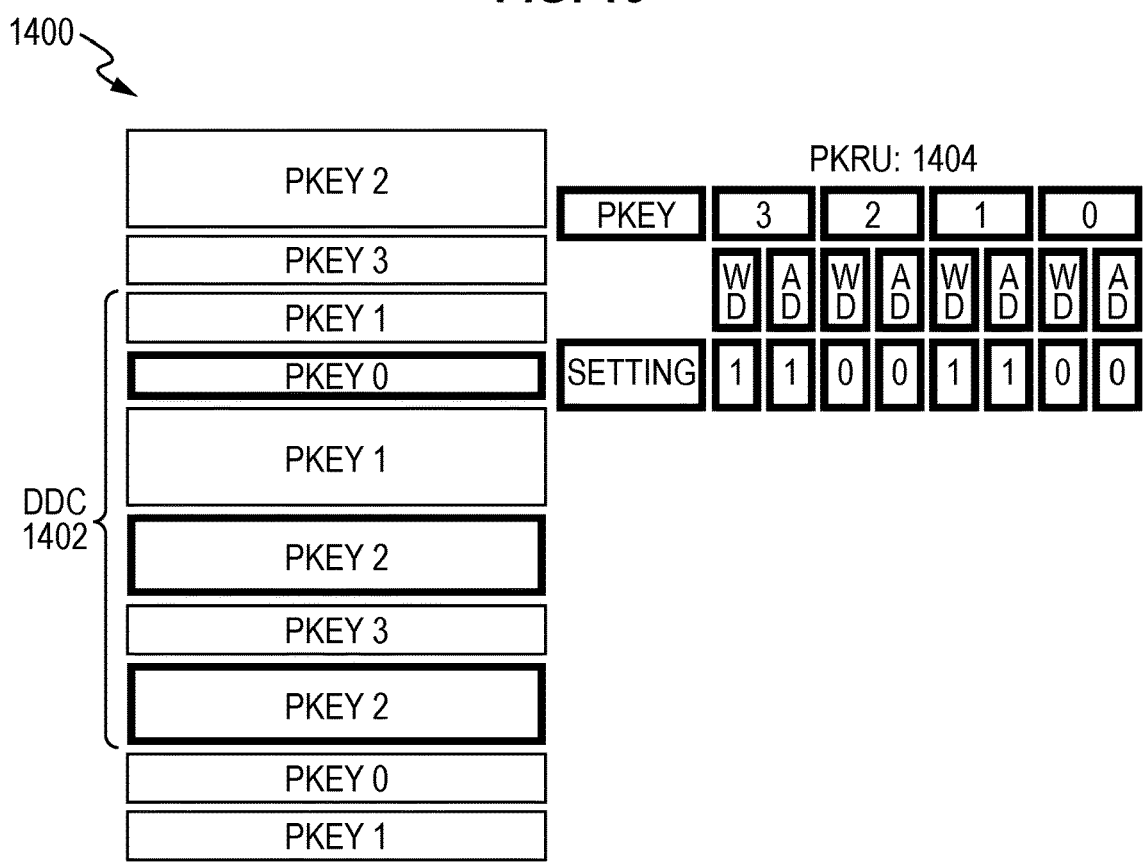
FIG. 14 illustrates an example memory layout with combined protection of memory protection keys (MPK) and IRC according to embodiments of the disclosure.

Another advantage for supervisor-managed compartments is that they can make use of MPK to support discontiguous memory allocations in certain embodiments. The scalability limitation of MPK (e.g., a limit of a fixed number of (e.g., 16) protection keys) can be overcome by defining a data capability that covers a block of up to that number of protection keys (e.g., 16) as the number of compartments, with MPK being used within the range covered by the capability to define the boundaries of the individual compartments. An example configuration is shown in FIG. 14. For the sake of compactness, it illustrates four protection key (PKEY) values. Note that MPK can be configured to grant access to multiple PKEY values simultaneously, which can be useful for defining regions to be shared between compartments. In one embodiment, only the kernel can update PKEY values in page table entries (PTEs) to define or update compartment boundaries, but user mode software can switch between compartments, e.g., by using the WRPKRU instruction to update PKRU.

FIG. 14 illustrates an example memory layout 1400 with combined protection of memory protection keys (MPK) and IRC according to embodiments of the disclosure. Layout 1400 includes a DDC 1402 and PKRU 1404. Two levels of access control checks may be performed, and if access is denied at either level, a fault may be generated and the memory access may be prevented. The checks may be performed in either order or in parallel. This effectively overcomes scalability limitations of MPK due to its support for a limited number of PKEY values by effectively defining distinct PKEY namespaces. Each DDC 1402 range setting defines a separate PKEY namespace, since even if a page outside of the current DDC 1402 range is marked accessible in the PKRU 1404 setting, it is still inaccessible, e.g., it is in a different namespace. Additional accessible ranges analogous to the one defined by DDC 1402 may be defined, e.g. using additional range registers that are checked such that a range match in one or more of the ranges is required for access to be permitted, or using range registers that are selected instead of or in addition to DDC 1402 based on the effective segment of the access, e.g. FSC, GSC, etc.

Certain embodiments herein provide instruction (e.g., instruction set architecture (ISA)) support for fast switching of deterministically-isolated compartments. In one embodiment, rather than invoking the kernel every time to switch between supervisor-managed compartments, new unprivileged instructions and descriptor formats allow user software to perform equivalent operations. An example compartment descriptor format is illustrated below in Table 12.

TABLE 12

Example Compartment Descriptor Format

CAP_TAB address
CAP_CURSOR capability table entry index
DDC capability table entry index
CCC capability table entry index
Instruction pointer (RIP)
Stack pointer (RSP)
Busy flag to block re-entry into an active compartment Compartment descriptors can be stored in a page of physically-addressed memory identified by a pair of MSRs associated with each privilege level, e.g., compartment descriptor user or compartment descriptor supervisor register(s) 132 in FIG. 1 (COMP_DESC_U/S). The current compartment ID may be stored in another MSR, e.g., current compartment ID user or current compartment ID supervisor register(s) 134 in FIG. 1 (COMP_ID_U/S). In one embodiment, all of these MSRs are also stored in VMCS 154 fields.

Note that this descriptor format can be used to associate a correctly-typed data region referenced from DDC with a corresponding code region referenced from CCC, e.g., to enforce type-safety for methods in object-oriented languages.

An instruction to enter a described compartment can be defined as follows in Table 13.

TABLE 13

CompEnter Instruction

| Name | CompEnter |
|---|---|
| Input operands | Destination compartment ID, which is an index into the compartment table. |
| Output operands | None |
| Operation | Check whether the selected destination compartment is valid, as indicated by the stored RIP value being non-zero. Also check the busy flag. If the compartment is invalid or busy, then a fault is generated.<br>Mark the destination compartment as busy.<br>Load the contents of all fields in the compartment descriptor into the corresponding (e.g., CPU) registers. |

Certain embodiments herein allocate heap memory. In certain embodiments, managing memory allocations is where a zoned approach to memory safety is useful for minimizing total overhead. For example, three types of zones can be defined as shown in FIG. 15.

Figure 15:
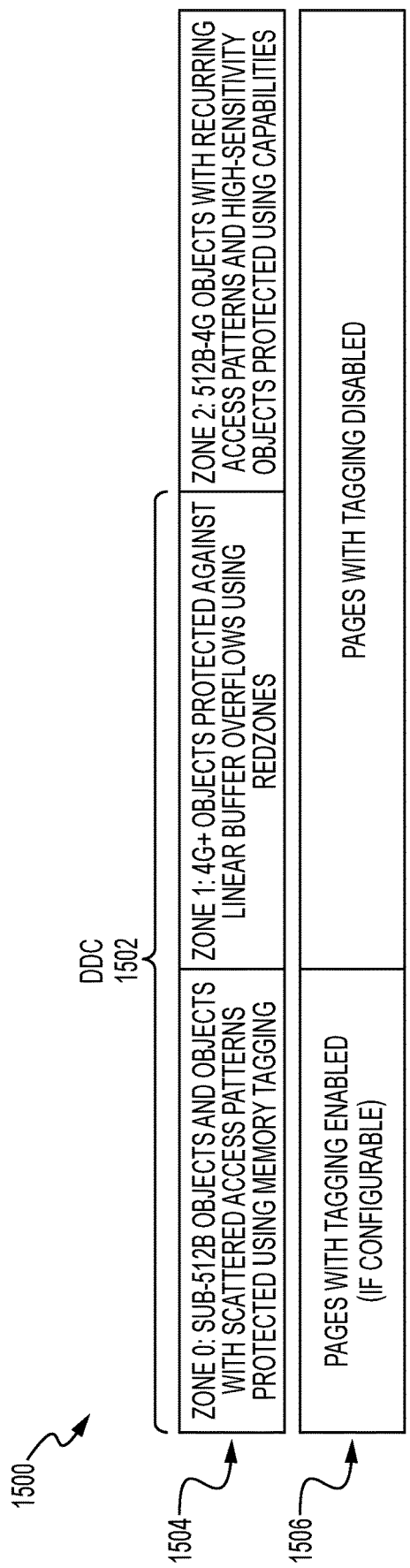
FIG. 15 illustrates multiple zones for storing objects with differing sizes, access patterns, and sensitivity levels for a zone approach to memory safety according to embodiments of the disclosure.

FIG. 15 illustrates multiple zones 1504 for storing objects with differing sizes, access patterns, and sensitivity levels for a zoned approach to memory safety according to embodiments of the disclosure.

In certain embodiments, Zone 0 relies on memory tagging. Assuming 4b of metadata per 16B of allocations, memory tagging may impose lower space overhead than IRCs with 128b of metadata per allocation for allocations smaller than 512B in certain embodiments. Memory tagging may outperform IRCs when access patterns are scattered, rarely revisiting the same allocations within short periods of time, since small amounts of tag information are retrieved alongside the data being accessed without necessitating a separate table lookup for a full 128b capability.

In certain embodiments, Zone 1 relies on zones (e.g., red zones) between allocations to mitigate linear/adjacent buffer overflows, although non-adjacent overflows may skip past the zones. This zone may be useful for objects that are too large to be covered by a single capability, and for which initializing and storing tag metadata would impose significant overhead.

In certain embodiments, Zone 2 protects objects using capabilities. It may be efficient for storing objects that are each accessed many times in a short period of time while the corresponding capability is still likely to be cached. Memory overhead may be superior to that of tagging if allocations are 512B or larger. Accessing more than 512 different bytes within the allocation while its capability is still cached may also result in less memory bandwidth and cache overhead than for tagging. Beyond overhead considerations, allocations may be placed in Zone 2 to provide deterministic mitigation of non-adjacent spatial violations and stronger temporal safety enforcement, assuming that more than four temporal safety bits are used for a given allocation. For example, objects that are accessed based on untrusted inputs, e.g., structures used in parsers, may be placed in Zone 2, even if it would be more efficient to locate them in Zone 0. Similarly, highly sensitive variables, e.g., containing cryptographic keys, may be placed in Zone 2. In one embodiment, DDC 1502 is configured to prevent bypasses of the tagging and red zone mechanisms from permitting unauthorized accesses to sensitive allocations in Zone 2.

In certain embodiments, the basic flow for allocating memory using a zoned approach is as follows:

(1) Requested allocation larger than a certain size (e.g., 4GiB)? Allocate entire pages in Zone 1:
    Find sufficient contiguous available pages in large object region.
    Invoke OS to mark zone (e.g., red zone) pages surrounding the allocation as inaccessible.
    Return unencoded pointer to allocation.
(2) Smaller than another, smaller size (e.g., 512B)? Allocate in Zone 0:
    Find available range in Zone 0 and initialize tag bits appropriately.
    Generate and return tagged pointer.
(3) Otherwise: Allocate in Zone 2:
    Find available range in Zone 2.
    Invoke NarrowCap instruction using OS-provided capability that covers the entire process space to generate a capability that only covers the new allocation and return a pointer referencing the new capability.

Certain embodiments herein deallocate heap memory. An example flow for deallocating heap memory is as follows, depending on the zone to which the pointer refers:

(1) Zone 0: Reset tag for allocation.
(2) Zone 1: Convert freed region to be tagged, e.g., to extend Zone 0. This enforces temporal safety, since attempts to reuse the Zone 1 pointer will fault after the underlying storage is converted to be tagged, assuming that it is initialized to use a different tag color than 0. Note that Zone 0 and Zone 1 do not each need to be contiguous; they can be interleaved dynamically.
(3) Zone 2: Free the capability table entry using ReadCap instruction.

Certain embodiments herein allow for allocation of stack memory. In certain embodiments, the stack (e.g., in memory 102) can be managed using either capabilities or tagging. Static analysis can identify allocations that are known to always be accessed safely, and a large capability or uniform tag (e.g., tag color) can be used to cover such allocations, although it may be desirable to randomize the "safe" tag color per-frame to prevent an adversary from forging a pointer to the covered allocations. Only allocations that may be accessed unsafely need to be assigned a distinct capability or tag color in certain embodiments.

Encoded Inline Capabilities (EIC)

In certain embodiments, encoded inline capabilities offer efficiency advantages for allocations that do not require temporal safety enforcement or that are deallocated in large groups associated with some well-defined temporal boundary, e.g., the completion of a FaaS function.

Looking up capabilities in a table may impose an overhead that is undesirable and unnecessary in some usages. For example, Function-as-a-Service (FaaS) workloads can be hosted using a software architecture like that depicted in FIG. 13, with each function being assigned a separate compartment, but each compartment may typically be short-lived. For FaaS to reach its full potential with very fine-grained functions for maximal reuse and agility, in certain embodiments, functions are to be launched and terminated rapidly with minimal overhead. Objects in the shared data region may be messages that are passed through a pipeline of functions, with each function relinquishing access to the entire set of messages that it can access after completing a brief processing session and passing it to the next function in the chain. Thus, per-object temporal safety enforcement may be superfluous, and a more direct, session-oriented capability mechanism may be preferable in certain embodiments.

Figure 16:
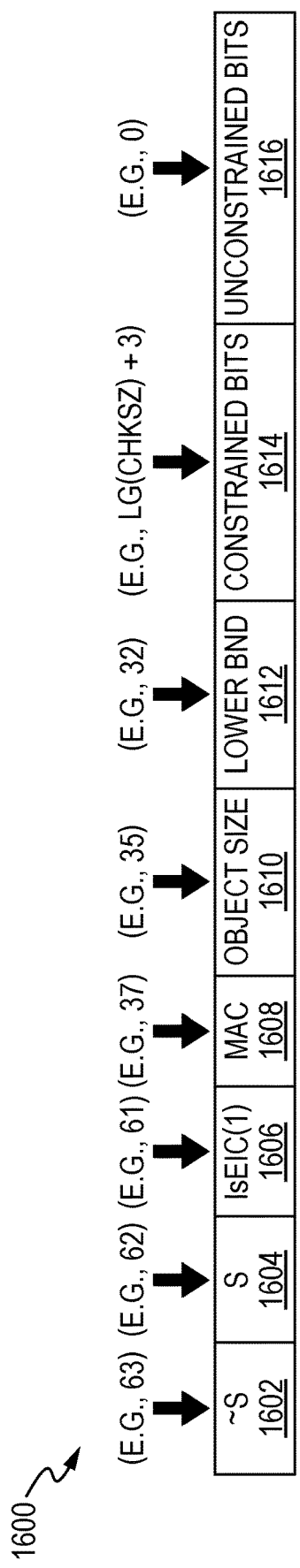
FIG. 16 illustrates an example format for a pointer controlled using encoded inline capabilities (EIC) according to embodiments of the disclosure.

In one embodiment, encoded inline capabilities (EIC) relies on a cryptographic message authentication code (MAC) in each pointer to prevent forgery of security metadata stored inline within the pointer itself rather than in a separate table. When a compartment has completed a processing session (e.g., usage of objects in the shared data region, although data may be persisted in the private data region across sessions), the key used to generate the MAC is rotated to revoke all capabilities generated using the previous key in certain embodiments. An EIC pointer format is depicted in FIG. 16. A lightweight cipher (such as a reduced-round Prince standard or an advanced encryption standard (AES)) can be used to generate the MAC. Latency for generating the MAC can thus be quite low, e.g., about 3 cycles. To conserve pointer bits, in one embodiment the chunk size (ChkSz) is derived implicitly from some of the constrained pointer bits, e.g., lg(ChkSz)=pointer[31:28]+5.

FIG. 16 illustrates an example format 1600 for a pointer controlled using encoded inline capabilities (EIC) according to embodiments of the disclosure. Pointer (e.g., 64 bit pointer) may include any one or more of fields of format 1600. For example, a pointer may include a leading bit field 1602 (e.g., which may be on either end of the pointer as determined by endianness of the pointer) followed by a next leading bit field 1604. In certain pointers (e.g., canonical pointers), these two bits are to be the same value to indicate a valid pointer. In certain embodiments herein, the bits are to have opposite values (e.g., first bit being a one or zero and the next bit being the opposite of that) to indicate (e.g., to memory controller circuit 106 in FIG. 1) that the pointer is using a component of ZMS, for example, either individually revocable capabilities (IRC), e.g., when field 1606 is set to zero, or encoded inline capabilities (EIC), e.g., when field 1606 is set to one. The next field 1606 (e.g., a single bit) may be used to store a value that when set (e.g., to 1 instead of 0) indicates the pointer is an EIC pointer, e.g., instead of an IRC pointer. The next field 1608 may be used to store cryptographic message authentication code (MAC) for the pointer. The next field 1610 (e.g., 2 bits) may be used to store a value that indicates a size of the object (e.g., the size in 8B chunks). The next field 1612 (e.g., 3 bits) may be used to store a value that indicates a lower bound of the object (e.g., specifying the chunk index for the lower bound). The next field 1614 may be used to store bits that are protected by the MAC so that software cannot forget them. The next field 1616 may be used to store bits that updated by software to point to various offsets with the allocation.

In one embodiment, the number of chunks is encoded using only two bits. In one embodiment, each object allocated is with a certain chunk size (e.g., at least five chunks). Otherwise, it may have fit in eight or fewer smaller chunks, where chunk sizes are a contiguous range of powers-of-two. Thus, a range of only four values, 5-8, needs to be encoded in the chunk count field for this example.

In certain embodiments, only the lower (e.g., 32) least-significant bits of the final pointer can be derived from the encoded pointer format, so the remaining bits are provided by a register that is configured by the trusted runtime. That register is labeled EIC_SDR_BASE (e.g., EIC_SDR_BASE register 136 in FIG. 1) for EIC shared data region base address. In certain embodiments, the register is accessible using a new user instruction called WREICCR for write EIC control reg that is analogous to WRPKRU. It is the responsibility of the trusted runtime to not invoke any untrusted compartment that contains a WREICCR instruction in certain embodiments.

In one embodiment, the parameter to WREICCR for setting EIC_SDR_BASE is a pointer referencing a read/write (RW) capability in the capability table covering a certain (e.g., 4GiB and 4GiB-aligned) memory region. Accesses performed using EIC-formatted pointers may be checked using the rules described below, and are then (e.g., immediately) issued as linear addresses without undergoing additional linear checks, e.g., against DDC. In certain embodiments, the DDC covers the private data region for each compartment and EIC_SDR_BASE denotes the separate, shared data region. WREICCR may also be used by the trusted runtime to set the key used to generate the MAC, e.g., in the EIC_KEY register.

Below further discusses Encoded Inline Capabilities (EIC) and describes encoded pointers that implement capability machine semantics. In some embodiments, an address space is partitioned into a plurality of compartments, each compartment being associated with code, having access to a private memory and access to a message object in a shared heap. In operation, a trusted execution environment (TEE) receives an instruction (e.g., GenCap, as illustrated and described with respect to FIGS. 22A-22B) to send a message from a first compartment, the request including a pointer to a message block in the heap, and a destination compartment identifier. The TEE responds by authenticating the request (e.g., ensuring that the message block is in an authorized address range), generating a corresponding encoded capability, conveying the encoded capability to the destination compartment, and scheduling the destination compartment to respond to the request.

In some embodiments, a compartment is associated with code to perform a function or a service or a microservice or a function-as-a-service (FaaS), in which case the compartment is referred to as a service, or microservice, or networked service.

It should be noted that various terminology is sometimes herein to refer to the compartments and trusted environments of disclosed embodiments. The term, "service protection domain" is sometimes used to refer to an individual service being hosted in a protected compartment. The terms "root protection domain," "trusted runtime," and "trusted execution environment" are sometimes used to refer to trusted hosting components that control execution of the service protection domains. In some embodiments, the TEE uses Intel® Software Guard Extensions (SGX). The disclosed compartments are sometimes referred to herein as "protection domains." or enclaves. Accordingly, the trusted execution environment (TEE) is sometimes referred to as a "root protection domain (PD)." The TEE is also sometimes referred to herein as the "trusted runtime." In some embodiments, multiple "protection domains" exist in a single enclave.

Subsequently, the TEE responds to a check capability request (e.g., CheckCap, as illustrated and described with respect to FIG. 23) from the destination compartment by checking the encoded capability and, when the check passes, providing a memory address to access the message block, and, otherwise, generating a fault. Disclosed embodiments thus isolate the private memory region of each compartment from that of other compartments. In other words, each compartment is only able to access its own private memory region, and not that of other compartments. Each compartment is further to access only message blocks assigned to it in the shared heap, and not message blocks assigned to other compartments.

Disclosed embodiments provide a scalable solution for subdividing an address space into an arbitrary number of compartments and for efficiently switching between them and communicating between them. Disclosed embodiments also support efficient bounds checking, which can be used to delegate access to objects between compartments or to enforce memory safety. Disclosed embodiments reduce function execution variability (a significant issue in current FaaS) by minimizing inter function communication overhead (a significant contributor to execution variability).

As used herein, the term "compartment" refers to a memory region or partition, and is associated with code to perform a function or a service. Compartments are therefore sometimes referred to herein as "microservices," "services," or "networked services."

Disclosed EIC pointers in some embodiments are used for isolating microservices or function-as-a-service (FaaS) functions. Disclosed embodiments further provide low-overhead, fine-grained access control over shared objects. Some embodiments further improve a computing apparatus by providing microarchitecturally-visible security checks and compartment boundaries to help direct and optimize side channel mitigations.

According to some embodiments, new instructions are defined (e.g., GenCap and CheckCap) that are used to perform security checks on memory accesses, or alternatively the semantics of memory operands in all instructions can be enhanced to perform security checks inline.

Some embodiments further enhance security by encrypting messaging objects. For example, some embodiments encrypt pointers using an Advanced Encryption Standard (AES) cipher, with a key stored in a user-mode-accessible register, EIC_AUTH_KEY used to specify the cryptographic key to be used for encryption. In some embodiments, AES is implemented as described in an Advanced Encryption Standard specification for the encryption of electronic data established by the U.S. National Institute of Standards and Technology (NIST) in 2001. The trusted execution environment (TEE) has access to the register, and it can update, save, and restore the key in that register. Before a pointer can be used to perform a memory access, it is checked to verify that none of the fixed bits have been modified. The detailed checks and pointer manipulations that are performed prior to accessing memory through an encoded pointer are further illustrated and described, at least with respect to FIGS. 22A, 22B and 23.

As will be described and illustrated with respect to FIG. 18 and onward, disclosed embodiments define at least one shared memory region and use encoded capabilities to refer to objects within that region so that a compartment (also referred to as a "protection domain" herein) is only permitted to access an object in the shared memory if it has a corresponding capability. In contrast, each compartment has unfettered access to the contents of its private memory region. The shared and private memory regions for the current compartment are both defined using base and mask registers, although the shared memory region may have an implicit mask register with a fixed value for reasons that will become apparent shortly. A TEE is used to configure those base and mask registers, to schedule invocations of compartments, and to allocate memory within the shared heap. The TEE has unfettered access to the entire address space, which includes all compartments within the address space.

Code associated with each compartment can be stored within the private memory region or outside of it, although it is write-protected if stored within the private memory region to ensure that its security instrumentation, control flow, instruction restrictions, etc., are not violated. In some embodiments, a separate code instance is associated with each compartment, or a single copy of the code is shared between multiple compartment instances. One advantage of using dedicated copies is that direct addressing of global variables is possible using conventional RIP-relative addresses.

In an alternative embodiment, when a single copy of code is shared, a new instruction is described that converts an offset within a private memory region to an absolute linear address by concatenating the offset with the private memory region base address. Alternatively, some embodiments describe RIP-relative memory operands to be relative to the base of the private memory region. The TEE in some embodiments enables that control when scheduling a compartment and disables it when the TEE is invoked from a compartment. Of course, in some embodiments, the underlying OS kernel and virtual machine manager (VMM) is also cognizant of these redefined memory operand semantics.

The encoded capabilities as described herein can be packed into the storage for a standard 64-bit pointer, which has significant advantages such as minimizing needed compiler changes, compatibility with standard pointer arithmetic, and efficient storage. However, it is also possible to expand this encoding, which confers other benefits such as being able to cover a larger shared heap, a stronger MAC, etc.

Figure 17A:
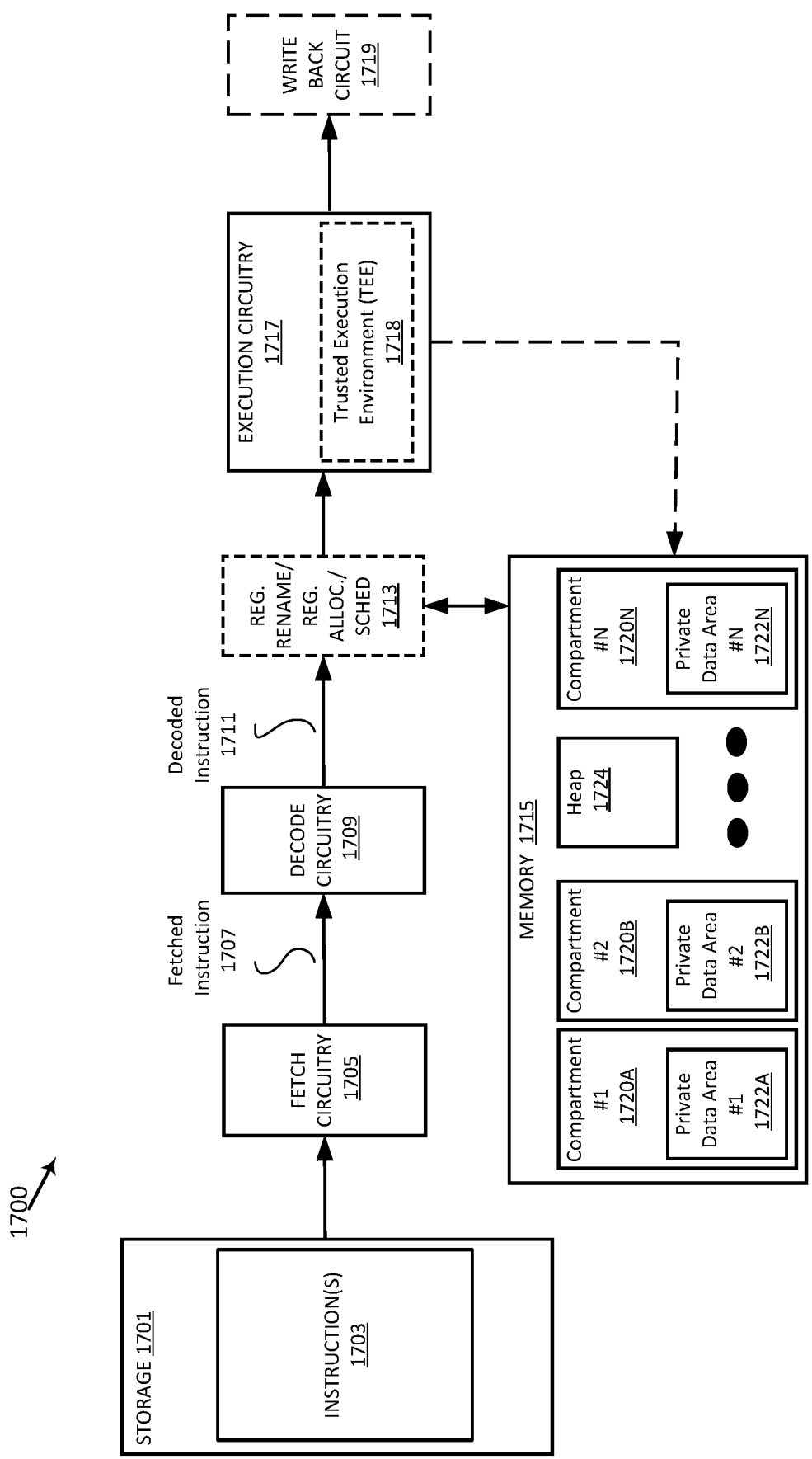
FIG. 17A is a block diagram illustrating processing components for executing instructions, according to embodiments of the disclosure.

FIG. 17 is a block diagram illustrating processing components for instructions, according to some embodiments. As illustrated, storage 1701 stores instruction(s) 1703 to be executed. In some embodiments, computing system 1700 is a SIMD processor to concurrently process multiple elements of packed-data vectors.

In operation, the instruction(s) 1703 is fetched from storage 1701 by fetch circuitry 1705. The fetched instruction 1707 is decoded by decode circuitry 1709. The instruction format is further illustrated and described with respect to FIGS. 30A-B and 31A-D. Decode circuitry 1709 decodes the fetched instruction 1707 into one or more operations. In some embodiments, this decoding includes generating a plurality of micro-operations to be performed by execution circuitry (such as execution circuitry 1717). The decode circuitry 1709 also decodes instruction suffixes and prefixes (if used). Execution circuitry 1717 is further described and illustrated below, at least with respect to FIGS. 33A-B and 34A-B.

Also shown is trusted execution environment (TEE) 1718, which is used to implement the encoded inline capabilities, according to embodiments described and illustrated with respect to FIGS. 18-30, and 33A-34B. TEE 1718 is shown with dashed borders to indicate that it can optionally be included in execution circuitry 1717. TEE 1718 may also include hardware outside of execution circuitry 1717. TEE may also include some software functionality. According to some embodiments, TEE 1718 provisions and configures a plurality of compartments #1-#N, labeled as 1720A-N, each with a private data area, labeled as 1722A-N, and all sharing heap 1724.

In some embodiments, register renaming, register allocation, and/or scheduling circuit 1713 provides functionality for one or more of: 1) renaming logical operand values to physical operand values (e.g., a register alias table in some embodiments), 2) allocating status bits and flags to the decoded instruction, and 3) scheduling the decoded instruction 1711 for execution on execution circuitry 1717 out of an instruction pool (e.g., using a reservation station in some embodiments).

Registers (register file) and/or memory 1715 store data as operands of decoded instruction 1711 to be operated on by execution circuitry 1717. Exemplary register types include writemask registers, packed data registers, general purpose registers, and floating-point registers, as further described and illustrated below, at least with respect to FIG. 32.

In some embodiments, write back circuit 1719 commits the result of the execution of the decoded instruction 1711. Execution circuitry 1717 and system 1700 are further illustrated and described with respect to FIGS. 33A-B and 34A-B.

Figure 17B:
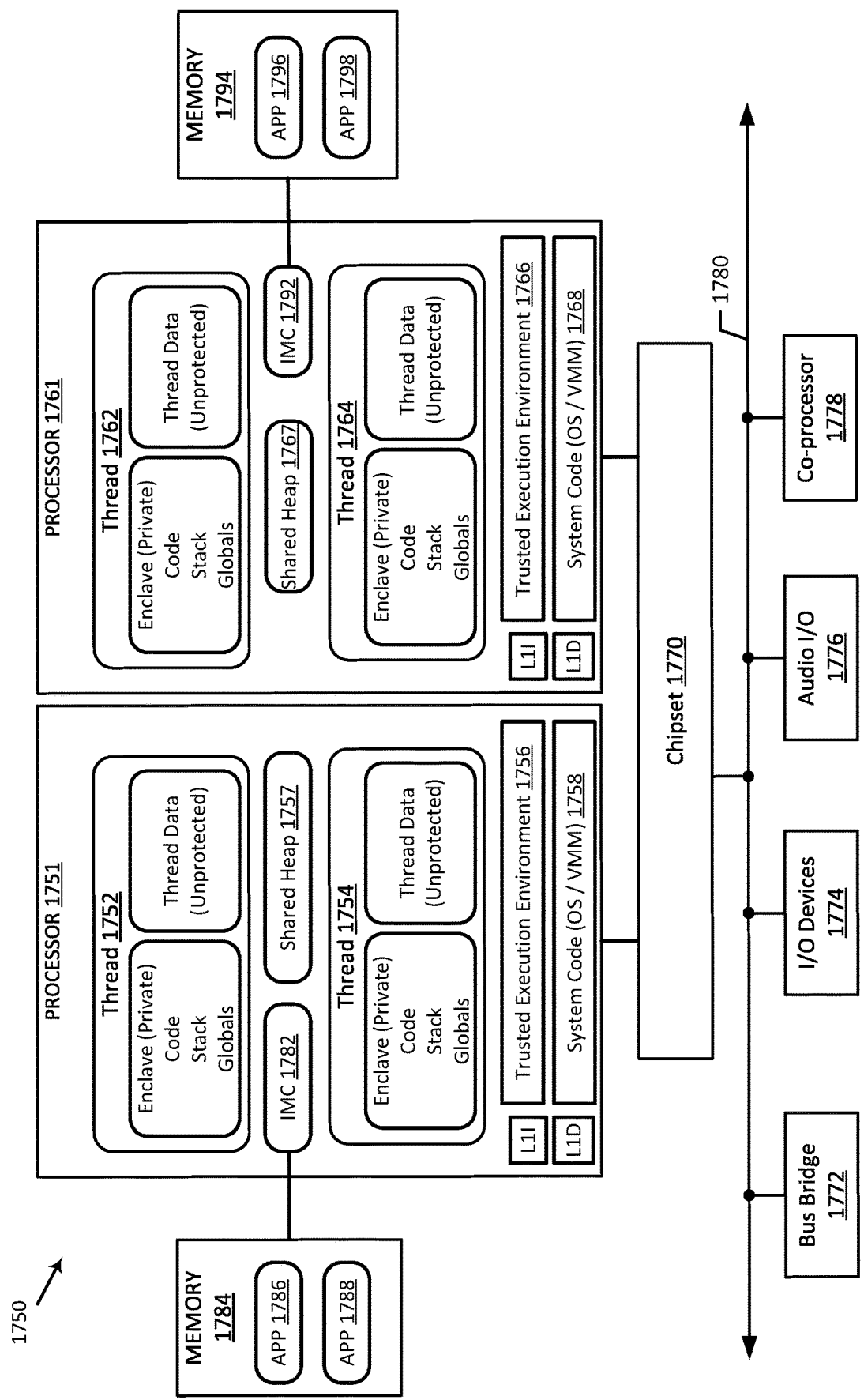
FIG. 17B illustrates a system for executing applications with protections for code and data, according to embodiments of the disclosure.
Figure 35:
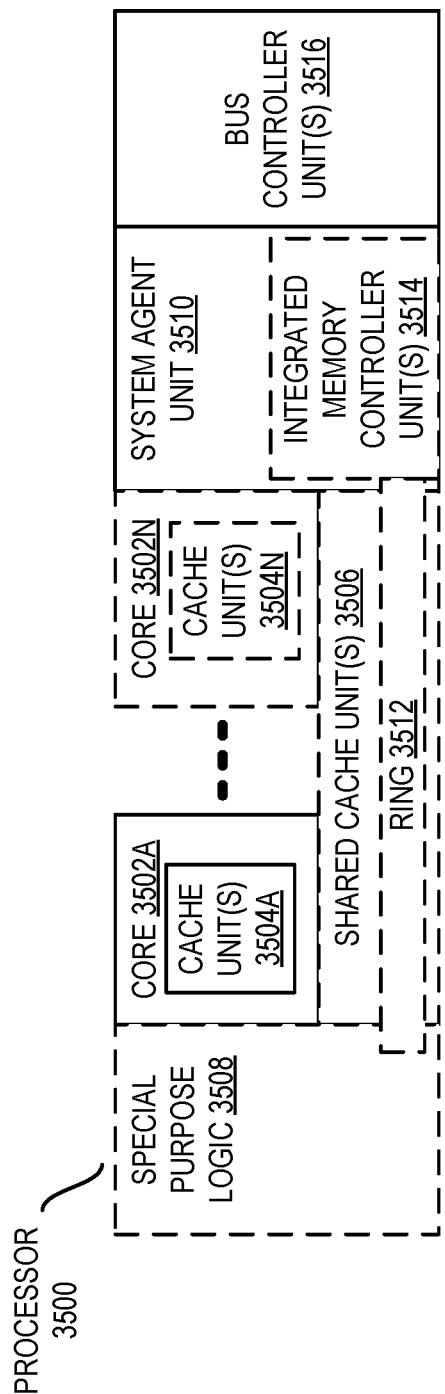
FIG. 35 is a block diagram of a processor that may have more than one core, may have an integrated memory controller, and may have integrated graphics according to embodiments of the disclosure.

FIG. 17B illustrates a system for executing applications with protections for code and data, according to an embodiment. Shown is a block diagram of a first more specific exemplary system 1750 in accordance with some embodiments. As shown in FIG. 17B, multiprocessor system 1750 includes a first processor 1751 and a second processor 1761, each of which may be some version of the processor 3500 (FIG. 35). Processors 1751 and 1761 are shown including integrated memory controller (IMC) units 1782 and 1792, respectively. As shown IMCs 1782 and 1792 couple the processors to respective memories, namely a memory 1784 and a memory 1794, which may be portions of main memory locally attached to the respective processors.

Processor 1751 includes system code 1758, including an operating system and a virtual machine manager (VMM). Processor 1751 also includes a trusted execution environment (TEE) 1756, which manages protections of threads 1752 and 1754, each of which has an enclave, or a private data region, including private code, stack, and globals. Each thread's private data region is protected from access by any other thread. Each thread 1752 and 1754 also includes thread data, an unprotected memory region. Processor 1751 has a shared heap 1757 accessible by two or more threads.

Processor 1761 includes system code 1768, including an operating system and a virtual machine manager (VMM). Processor 1761 also includes a trusted execution environment (TEE) 1766, which manages protections of threads 1762 and 1764, each of which has an enclave, or a private data region, including private code, stack, and globals. Each thread's private data region is protected from access by any other thread. Each thread 1762 and 1764 also includes thread data, an unprotected memory region. Processor 1761 has a shared heap 1767 accessible by two or more threads.

Processor 1761 also includes a trusted execution environment (TEE) 1766, which manages protections of threads 1762 and 1764, each of which as an enclave, or a private data region, including private code, stack, and globals. Each thread's private data region is protected from access by any other thread. Each thread 1762 and 1764 also includes thread data, an unprotected memory region. Processor 1761 has a shared heap 1767 in its memory, the shared heap accessible by two or more threads.

Processors 1751 and 1761 may each exchange information with a chipset 1770 which may optionally exchange information with the coprocessor 1778. In one embodiment, the coprocessor 1778 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors, such that either or both processors' local cache information may be stored in the shared cache if a processor is placed into a low power mode.

Chipset 1770 may be coupled to a first bus 1780, which. In one embodiment, is a Peripheral Component Interconnect (PCI) bus, or a bus such as a PCI Express bus or another third generation I/O interconnect bus, although the scope of disclosed embodiments is not so limited.

As shown in FIG. 17B, various I/O devices 1774 may be coupled to first bus 1780, along with a bus bridge 1772 which couples first bus 1780 to a second bus, not shown. In one embodiment, one or more additional processor(s), such as coprocessor 1778, are high-throughput MIC processors, GPGPU's, accelerators (such as, e.g., graphics accelerators or digital signal processing (DSP) units), field programmable gate arrays, or any other processor, are coupled to first bus 1780. Furthermore, an audio I/O 1776 may be coupled to the second bus (not shown). Note that other architectures are possible.

In operation, processors 1751 and 1761 are to load apps 1786, 1788, 1796, and 1798, which include computer-executable instructions, to be executed in threads 1752, 1754, stored in their associated memories, 1784 and 1794, and execute those apps in threads 1752, 1754, 1762, and 1764, respectively.

Figure 18:
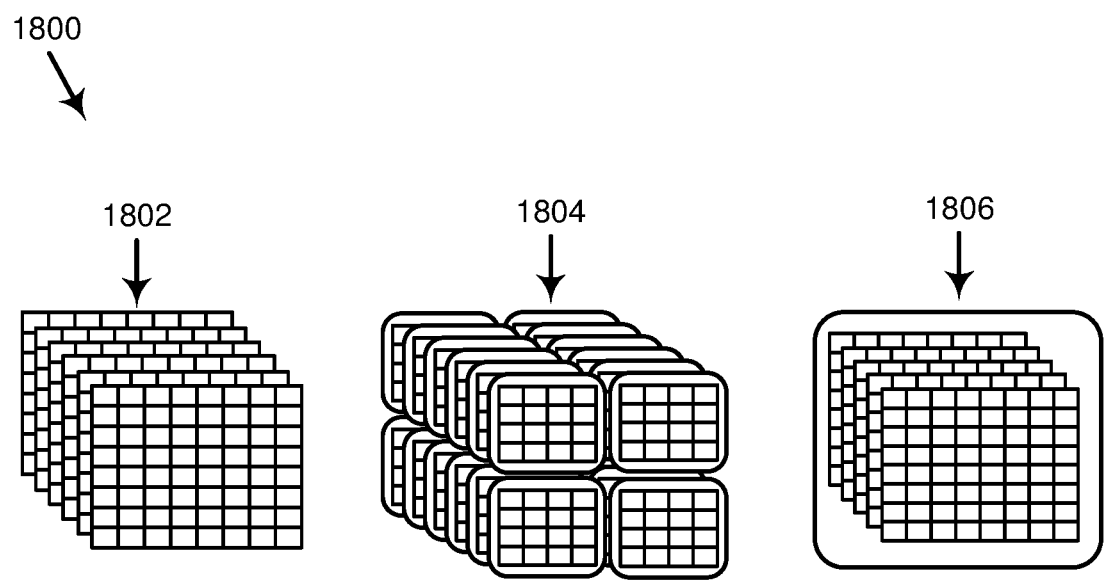
FIG. 18 illustrates memory compartments in a memory address space, according to embodiments of the disclosure.

FIG. 18 illustrates memory compartments in a memory address space, according to some embodiments. As shown, multiple compartments (a.k.a., functions, services, microservices, or FaaS) occupy address spaces in each of memory maps 1802, 1804, and 1806. In memory map 1802, each compartment has its own address space. In memory map 1804, each compartment is part of a partition of an address space, with 16 possible services per partitions. In memory map 1806, all functions are part of a single address space.

Figure 19A:
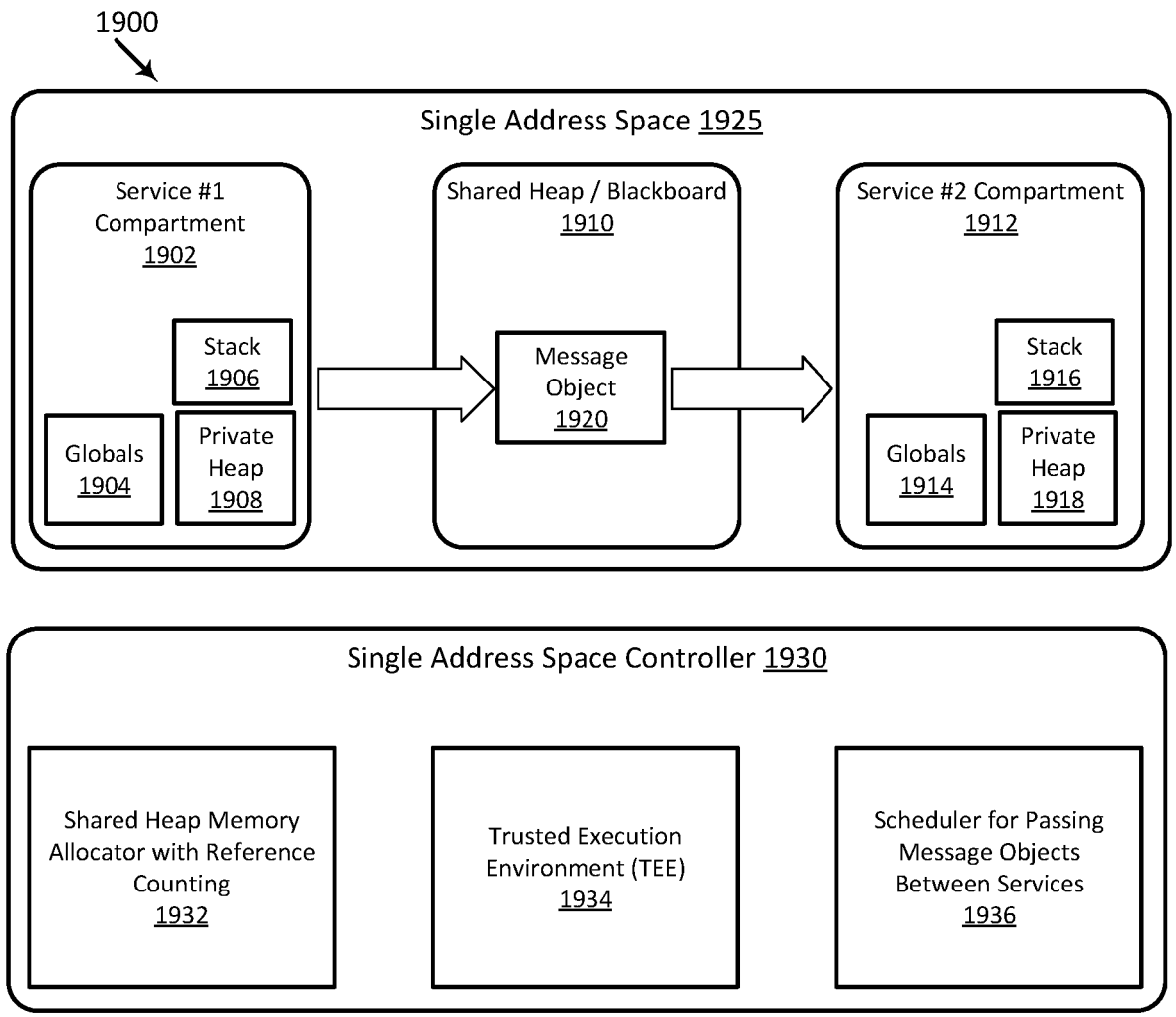
FIG. 19A illustrates a system with multiple service compartments in a memory, according to embodiments of the disclosure.

FIG. 19A illustrates a system with multiple service compartments in a memory, according to some embodiments. As shown, system 1900 includes service #1 compartment 1902, which includes its stack 1906, its private heap 1908 and its globals 1904 (e.g., global variables stored in registers or memory). Stack 1906, private heap 1908, and globals 1904 are sometimes referred to herein as existing within a "private memory area" or "private memory region" of service #1 compartment 1902. Also shown is service #2 compartment 1912, which includes its stack 1916, its private heap 1918, and its globals 1914 (e.g., global variables stored in registers or memory). Stack 1916, private heap 1918, and globals 1914 are sometimes referred to herein as existing within a "private memory area" or "private memory region" of service #2 compartment 1912. It should be understood that the stack, heap, and globals are logical structures shown for each of the compartments, but that in some embodiments, a single memory is used to serve all three functions. Also illustrated is shared heap/blackboard 1910, with a message object 1920 in transition from service #1 compartment 1902 to service #2 compartment 1912. As shown, service #1 compartment 1902, service #2 compartment 1912 and shared heap 1910 are all part of a single address space 1925.

Also illustrated is single address space controller 1930, which includes shared heap memory allocator with reference counting 1932, trusted execution environment (TEE) 1934, and a scheduler for passing message objects between services 1936. The illustrated components of single address space controller 1930 include circuitry and memory resources to perform their functions. In some embodiments, as here, code and services running as part of the service compartments is controlled by the TEE 1934, which in some embodiments is provided as Intel® SGX to defend the software runtime and the applications against the types of attacks that are in scope for the TEE in use.

In operation, the TEE 1934 is to partition an address space within the memory into a plurality of compartments, shown here as compartments 1902 and 1912, and shared heap 1910. Each compartment 1902 and 1912 here includes a private memory associated with code to execute a function. Here, compartments 1902 and 1912 have private memory areas that include their stack, private heap, and globals. In some embodiments, the TEE 1934 is to provision the functions and schedule operation of the code for service #1 compartment and service #2 compartment. As used herein, that code can be termed a service, a microservice, a networked service, or a function-as-a-service (FaaS). As part of the provisioning, the TEE 1934 assigns pointers to one or more message objects stored in the shared heap. The TEE 1934 thus allocates memory for use to buffer a message and provides a pointer to each of the compartments to access the message object(s).

Continuing operation, at some point, after the code in service #1 compartment begins to run, the TEE 1934 receives a request to send a message from a first compartment, the request including a pointer to a message block in the heap, and a destination compartment identifier (e.g., service #2 compartment 1912). In response, the TEE 1934 authenticates the request, generates a corresponding encoded capability, conveys the encoded capability to the destination compartment, and schedules the destination compartment to respond to the request. Subsequently, the TEE 1934 receives a check capability request from service #2 compartment 1912, and responds by checking the encoded capability and, when the check passes, providing service #2 compartment 1912 a memory address to access the message block, and, otherwise, generating a fault. As shown, each compartment is isolated from other compartments, is unable to access private memory regions of other compartments, and is unable to access any message objects in the heap that are assigned to other compartments.

Figure 19B:
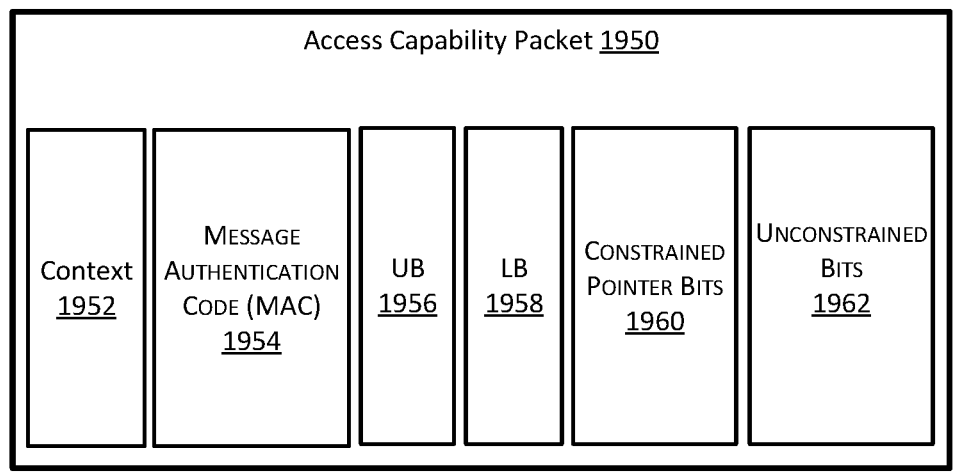
FIG. 19B illustrates an access capability packet, according to embodiments of the disclosure.

FIG. 19B illustrates an access capability packet, according to an embodiment. As shown, access capability packet 1950 includes context 1952, message authentication code (MAC) 1954, upper bound (UB) 1956, lower bound (LB) 1958, constrained pointer bits 1960, and unconstrained bits 1962. In operation, MAC 1954 is used to detect modifications of fixed bits (bounds and constrained pointer bits) by service protection domains. Fixed Bits: UB 1956, LB 1958, and constrained pointer bits 1960 are "fixed bits," which service protection domains are prevented from undetectably modifying. They indicate the base and limit of the object. Unconstrained bits 1962, on the other hand, are allowed to be modified by service protection domains (recall that as defined above, a service protection domain corresponds to an individual service being hosted). The number of unconstrained bits is determined by the size of the object, which is inferred from upper address bits of base address. For example, an 8-byte object requires 3 unconstrained bits. Objects are aligned at corresponding power-of-two chunk boundaries.

Figure 19C:
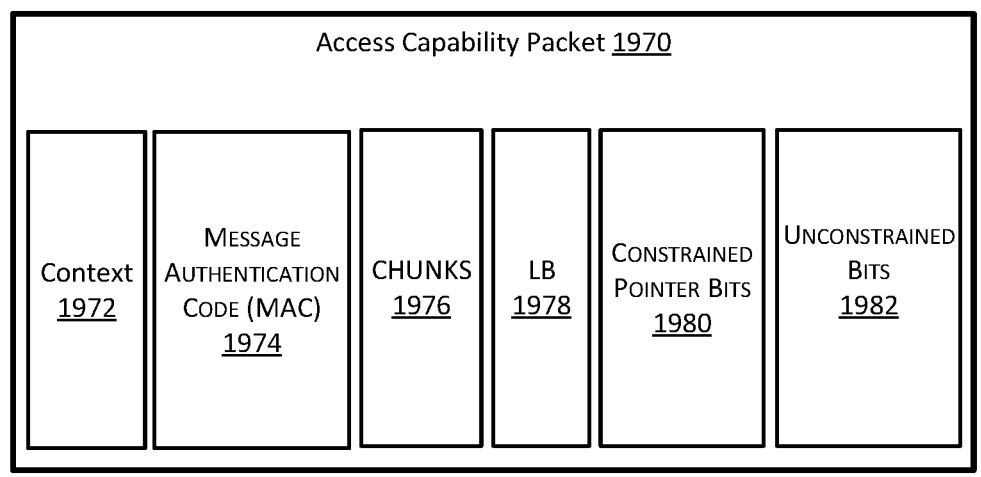
FIG. 19C illustrates an access capability packet, according to embodiments of the disclosure.

FIG. 19C illustrates an access capability packet, according to an embodiment. As shown, access capability packet 1970 includes context 1972, message authentication code (MAC) 1974, chunks 1976, lower bound (LB) 1978, constrained pointer bits 1980, and unconstrained bits 1982.

In some embodiments, chunks 1976 is encoded uses only two bits. In such embodiments, each object allocated with a certain chunk size comprises at least five chunks. Otherwise, it would have fit in eight or fewer smaller chunks, since chunk sizes are a contiguous range of powers-of-two. Thus, a range of only four values, 5-8, needs to be encoded in the chunks 1976.

In operation, MAC 1974 is used to detect modifications of fixed bits (bounds and constrained pointer bits) by service protection domains. Fixed Bits: chunks 1976, LB 1978, and constrained pointer bits 1980 are "fixed bits," which service protection domains are prevented from undetectably modifying. They indicate the base and limit of the object.

Unconstrained bits 1982, on the other hand, are allowed to be modified by service protection domains (recall that, as defined above, a service protection domain corresponds to an individual service being hosted). The number of unconstrained bits is determined by the size of the object, which is inferred from upper address bits of base address. For example, an 8-byte object requires 3 unconstrained bits. Objects are aligned at corresponding power-of-two chunk boundaries.

Figure 20A:
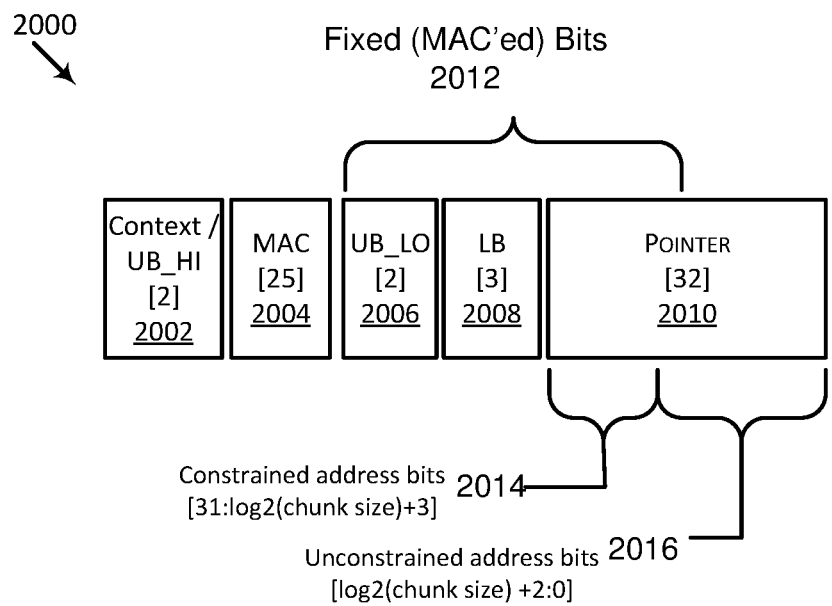
FIG. 20A illustrates an access capability packet, according to embodiments of the disclosure.

FIG. 20A illustrates an access capability packet, according to an embodiment. As shown, access capability packet 2000 includes context/UBHI [2] 2002 (which includes 2 bits), MAC [25] 2004 (25 bits), UB_LO [2] 2006 (2 bits), LB [3] 2008 (3 bits), and pointer [32] 2010 (32 bits). Also shown are fixed (MAC'ed) bits 2012, constrained address bits 2014, which include [31:log 2(chunk size)+3], and unconstrained address bits 2016, which include [log 2(chunk size)+2:0]. As used herein, the chunk size can be any power-of-2, e.g., 2, 4, 8, 16, etc.

The context field 2002 distinguishes encoded pointers from unencoded pointers so that the same instructions can be used to process both. This field also supports interoperability with memory safety solutions. EIC has the limitations of supporting restricted object sizes and alignments and objects stored within the shared heap, so it is advantageous to interoperate with other mechanisms.

The MAC 2004 prevents undetected modification of the fixed bits identified in the diagram. Those fixed bits identify the authorized bounds of the object. Note that a portion of the pointer, the unconstrained address bits, is not covered by the MAC. This is the portion that the compartment is free to modify to reference different parts of the authorized object. However, in some embodiments, not all possible values of the unconstrained address bits are accepted. The specific bounds checking logic that incorporates the upper bound ({UB_HI:UB_LO}), the lower bound (LB), and the chunk size will be described below. Alternative embodiments employ a simpler encoding by simply specifying the power-of-two size of the object in a size field or implicitly based on address bits and allow any possible values for the unconstrained address bits.

Figure 20B:
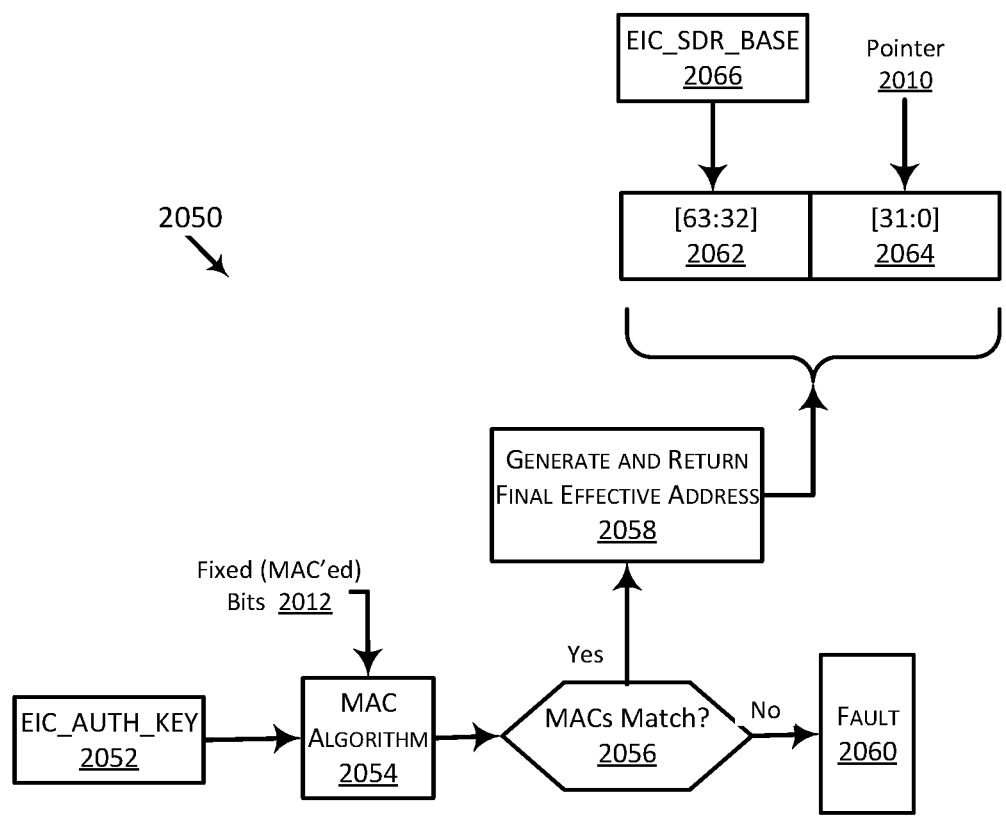
FIG. 20B is a block flow diagram illustrating an embodiment of checking a capability, according to embodiments of the disclosure.

FIG. 20B is a block flow diagram illustrating an embodiment of a trusted execution environment (TEE) checking a capability. As shown, a TEE performs check flow 2050 by retrieving EIC_AUTH_KEY at 2052, EIC_AUTH_KEY being a privileged encryption seed used by the TEE and not known to the compartments. At 2054, the TEE generates a MAC by running a MAC algorithm, with fixed (MAC'ed) bits 2012 as an input. At 2056, the TEE determines whether the generated MAC matches the MAC bits in the capability packet. If they do not, a fault is generated at 2060. But if a match exists, the TEE at 2058 generates and returns a final base address to be used to access the message object. This base address may differ from the original base address for the message object. However, in some embodiments, it is still referred to as a base address, since it is used as such to compute effective addresses in subsequent memory accesses. As shown, the final 64-bit address is labeled as 2062 and 2064, and consists of 32-bit EIC_SDR_BASE 2066 concatenated with 32-bit pointer 2010. EIC_SDR_BASE specifies the upper 32 bits of a base address of a shared data region.

Figure 20C:
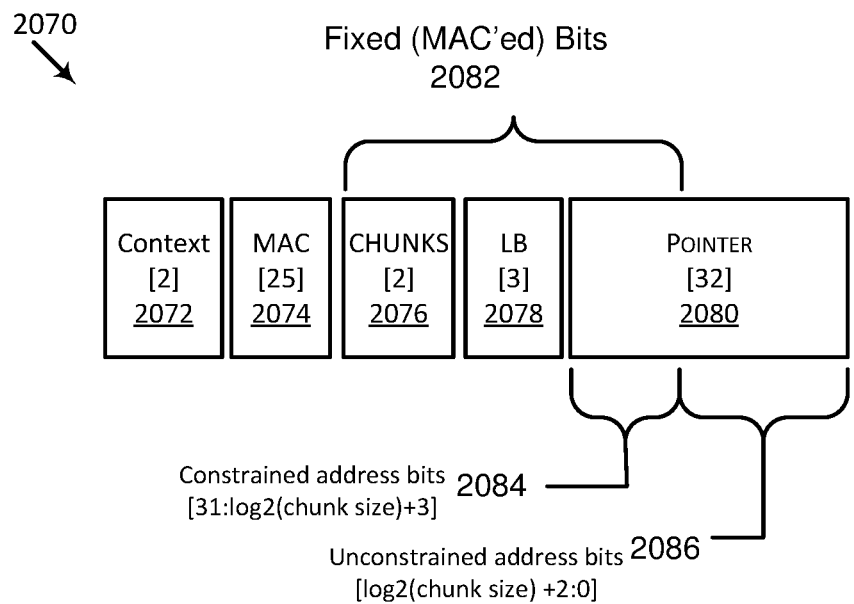
FIG. 20C illustrates an access capability packet, according to embodiments of the disclosure.

FIG. 20C illustrates an access capability packet, according to an embodiment. As shown, access capability packet 2070 includes context/UBHI [2] 2072 (which includes 2 bits), MAC [25] 2074 (25 bits), Chunks [2] 2076 (2 bits), LB [3] 2078 (3 bits), and pointer [32] 2080 (32 bits). Also shown are fixed (MAC'ed) bits 2082, constrained address bits 2084, which include [31:log 2(chunk size)+3], and unconstrained address bits 2086, which include [log 2(chunk size)+2:0]. As used herein, the chunk size can be any power-of-2, e.g., 2, 4, 8, 16, etc.

The context field 2072 distinguishes encoded pointers from unencoded pointers so that the same instructions can be used to process both. This field also supports interoperability with memory safety solutions. EIC has the limitations of supporting restricted object sizes and alignments and objects stored within the shared heap, so it is advantageous to interoperate with other mechanisms.

The MAC 2074 prevents undetected modification of the fixed bits identified in the diagram. Those fixed bits identify the authorized bounds of the object. Note that a portion of the pointer, the unconstrained address bits, is not covered by the MAC. This is the portion that the compartment is free to modify to reference different parts of the authorized object. However, in some embodiments, not all possible values of the unconstrained address bits are accepted. The specific bounds checking logic that incorporates the upper bound ({UB_HI:UB_LO}), the lower bound (LB), and the chunk size will be described below. Alternative embodiments employ a simpler encoding by simply specifying the power-of-two size of the object in a size field or implicitly based on address bits and allow any possible values for the unconstrained address bits.

Figure 21:
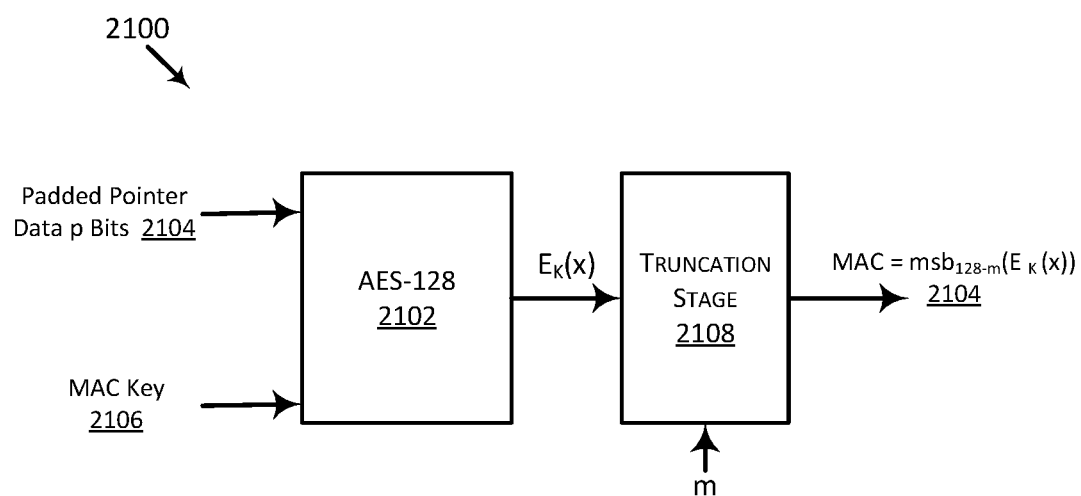
FIG. 21 is a block flow diagram illustrating encrypting a pointer to generate a capability, according to embodiments of the disclosure.

FIG. 21 is a block flow diagram illustrating encrypting a pointer to generate a capability, according to some embodiments. As shown, flow 2100 includes a standard Advanced Encryption Standard (AES-128) 2102, which receives as inputs padded pointer data p bits 2104 and MAC key 2106, and generates at its output $E_K(x)$, which is fed to truncation stage 2108, which also receives input m, and generates MAC 2104, which here is $msb_{128-m}(E_K(x))$.

The MAC may be computed using a variety of algorithms. One that is desirable, from the standpoint of being based on a standard cipher, is AES-128 2102. The MAC key 2106 is stored in a user-mode-accessible register, EIC_AUTH_KEY. The TEE has access to the register, and it can update, save, and restore the key in that register. Before a pointer can be used to perform a memory access, its MAC is checked to verify that none of the fixed bits have been modified.

The detailed checks and pointer manipulations that are performed prior to accessing memory through an encoded pointer will be described below, which will also clarify the purpose of the EIC_SDR_BASE register.

Note that an advantage of these checks compared to conventional 64-bit range registers or bounds such as those used in Intel® Memory Protection Extensions (MPX) is that the comparisons are performed on much smaller numbers, most only three bits in length, which reduces energy usage and latency.

Figure 22A:
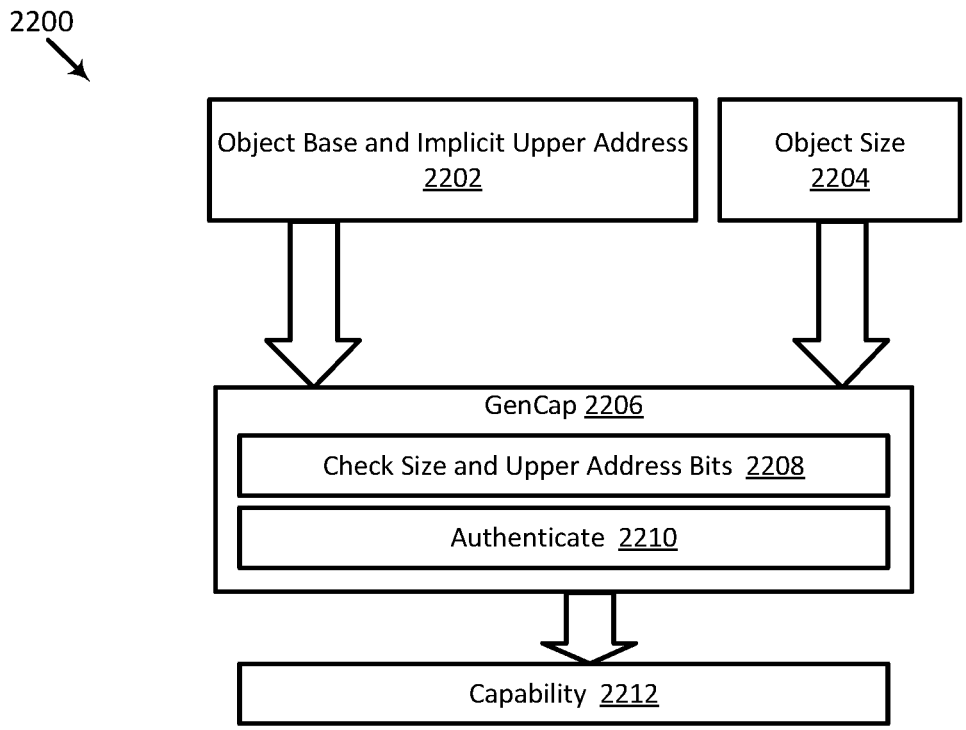
FIG. 22A is a block flow diagram illustrating execution of a GenCap instruction, according to embodiments of the disclosure.

FIG. 22A is a block flow diagram illustrating execution of a GenCap instruction, according to some embodiments. As shown, flow 2200 includes inputs object base and implicit upper address 2202 and object size 2204 being fedFcrypto into GenCap 2206, which, at 2208, checks size and upper address bits and at 2210 authenticates the request. GenCap 2206 generates a capability 2212 as its output.

Figure 22B:
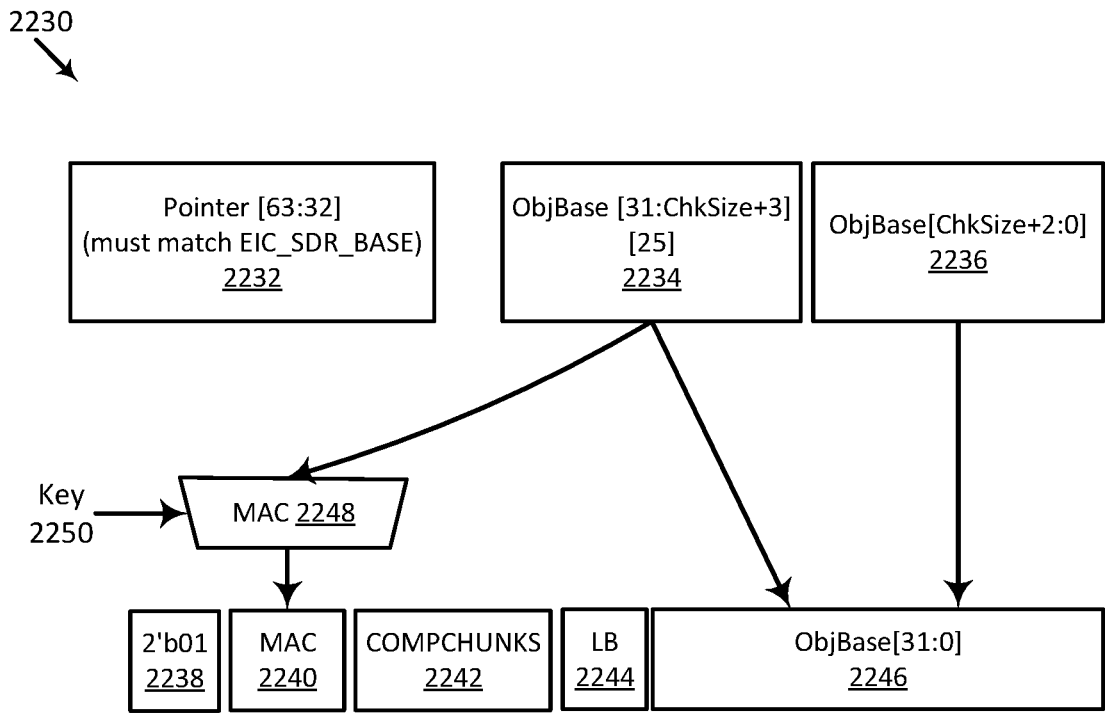
FIG. 22B illustrates inputs and outputs of a GenCap instruction, according to embodiments of the disclosure.

FIG. 22B illustrates inputs and outputs of a GenCap instruction, according to some embodiments. As shown, GenCap flow 2230 includes inputs: pointer [63:32] 2232, 25-bit ObjBase [31:ChSize+3] 2234, and ObjBase[ChkSize+2:0] 2236. GenCap is executed, including performing MAC function 2248 with key 2250 as input, to generate a 64-bit access capability consisting of encoded UB_HI (2'b01) 2238, MAC 2240, UB_LO (COMPCHUNKS) 2242, LB 2244, and ObjBase [31:0] 2246.

Figure 22C:
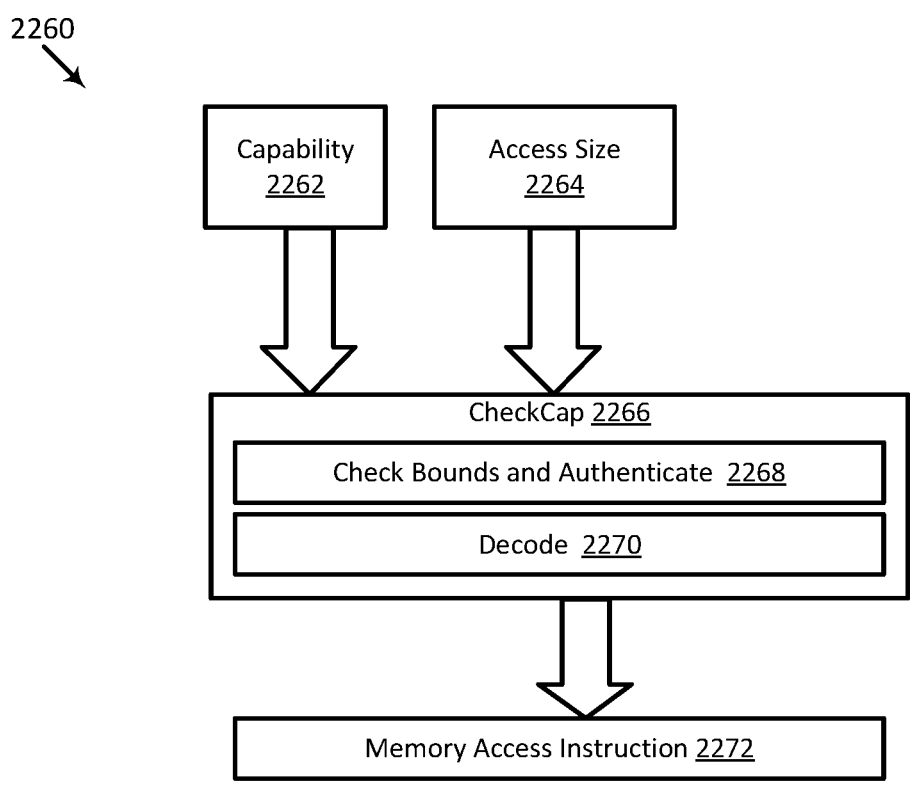
FIG. 22C is a block flow diagram illustrating execution of a CheckCap instruction, according to embodiments of the disclosure.

FIG. 22C is a block flow diagram illustrating execution of a CheckCap instruction, according to some embodiments. As shown, flow 2260 includes inputs capability 2262 and access size 2264, which are fed into CheckCap 2266, which, at 2268, checks bounds and authenticates, and at 2270 performs a decode. As a result, CheckCap generates a memory address instruction 2272.

FIGS. 23A-23D are pseudocode illustrating capability generation, capability checking flows, and associated sub-flows, according to some embodiments.

FIG. 23A is pseudocode for generating a message authentication code (MAC), according to some embodiments. As shown, pseudocode 2300 is to generate a Message Authentication Code (MAC) using Advanced Encryption Standard (AES). Execution and security checking flows of disclosed embodiments are further illustrated and described with respect to FIGS. 19A-22C, 24-28, 33A-B, and 34A-B.

FIG. 23B is pseudocode for a GenCap instruction, according to some embodiments. As shown, pseudocode 2310 is for a GenCap routine to generate an encoded, authenticated capability granting access to a message object stored in the shared heap and having a specified base address and size. Execution and security checking flows of disclosed embodiments are further illustrated and described with respect to FIGS. 19A-22C, 24-28, 33A-B, and 34A-B.

FIG. 23C is pseudocode for a CheckCap instruction, according to some embodiments. As shown, pseudocode 2320 is for a CheckCap instruction to test whether access is permitted to the indicated memory location(s), given an encoded, authenticated capability or an unauthenticated memory pointer and access size. Execution and security checking flows of disclosed embodiments are further illustrated and described with respect to FIGS. 19A-22C, 24-28, 33A-B, and 34A-B.

FIG. 23D is pseudocode for a CheckBounds helper function, invoked by a CheckCap instruction, according to an embodiment. As shown, pseudocode 2330 is for a CheckBounds instruction to check that a pointer value is within its authorized bounds. Execution and security checking flows of disclosed embodiments are further illustrated and described with respect to FIGS. 19A-22C, 24-28, 33A-B, and 34A-B.

Figure 24A:
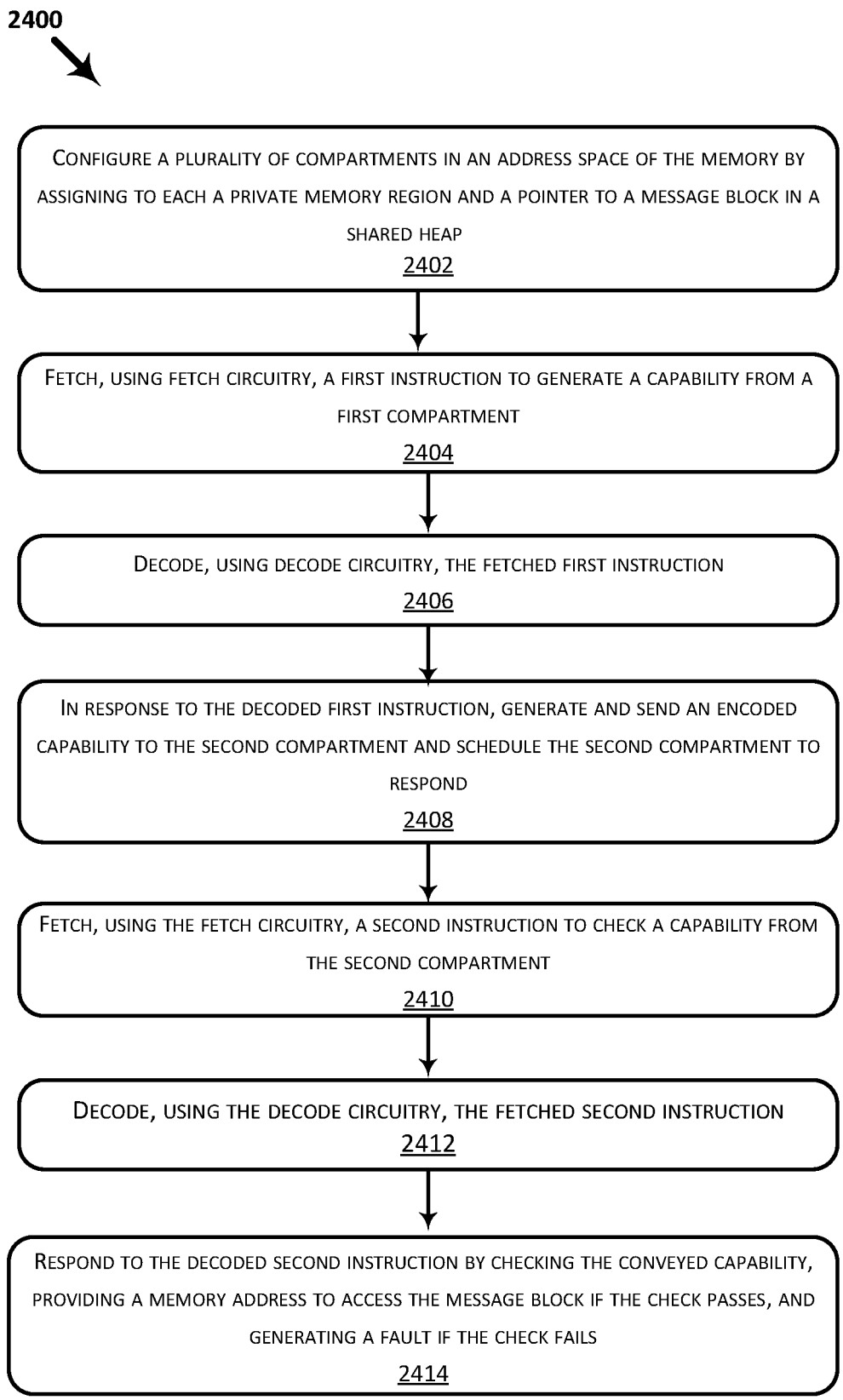
FIG. 24A is a block flow diagram illustrating a security check, according to embodiments of the disclosure.

FIG. 24A is a block flow diagram illustrating a security check performed by a trusted execution environment (TEE), according to some embodiments. As shown, a TEE performs flow 2400 starting at 2402 by invoking a CheckCap instruction with a pointer and a maximum offset to be accessed. At 2404, the TEE determines: does the context field indicate that this is an encoded pointer (e.g., its bits differ)? If so, at 2406 the TEE determines: is Pointer [ChkSz+2: ChkSz] <LB? Then, at 2408, TEE Decrement Pointer [27: ChkSize+3], and at 2410 invoke sub-Flow: Check Pointer (which is illustrated and described at FIG. 24B). On the other hand, if the answer at determination 2404 was "No," the TEE at 2412 determines: does the capability fall within the region defined by EIC_PDR_RAS (base address of private data region)/EIC_PDR_MASK (mask for private data region) base/mask register pair defining private memory region for current compartment? If so, the TEE at 2414 returns unmodified Input pointer, and, if not, the TEE generates a fault at 2416. In some embodiments, the specified private data region is enforced using a CheckCap instruction. A set bit in the EIC_PDR_MASK specifies that the corresponding bit in the address for the attempted access in the private data region is to match the value of the corresponding bit in the base, otherwise, a fault is generated.

Execution and security checking flows of disclosed embodiments are further illustrated and described with respect to FIGS. 19A-23D, 25-28, 33A-B, and 34A-B.

Figure 24B:
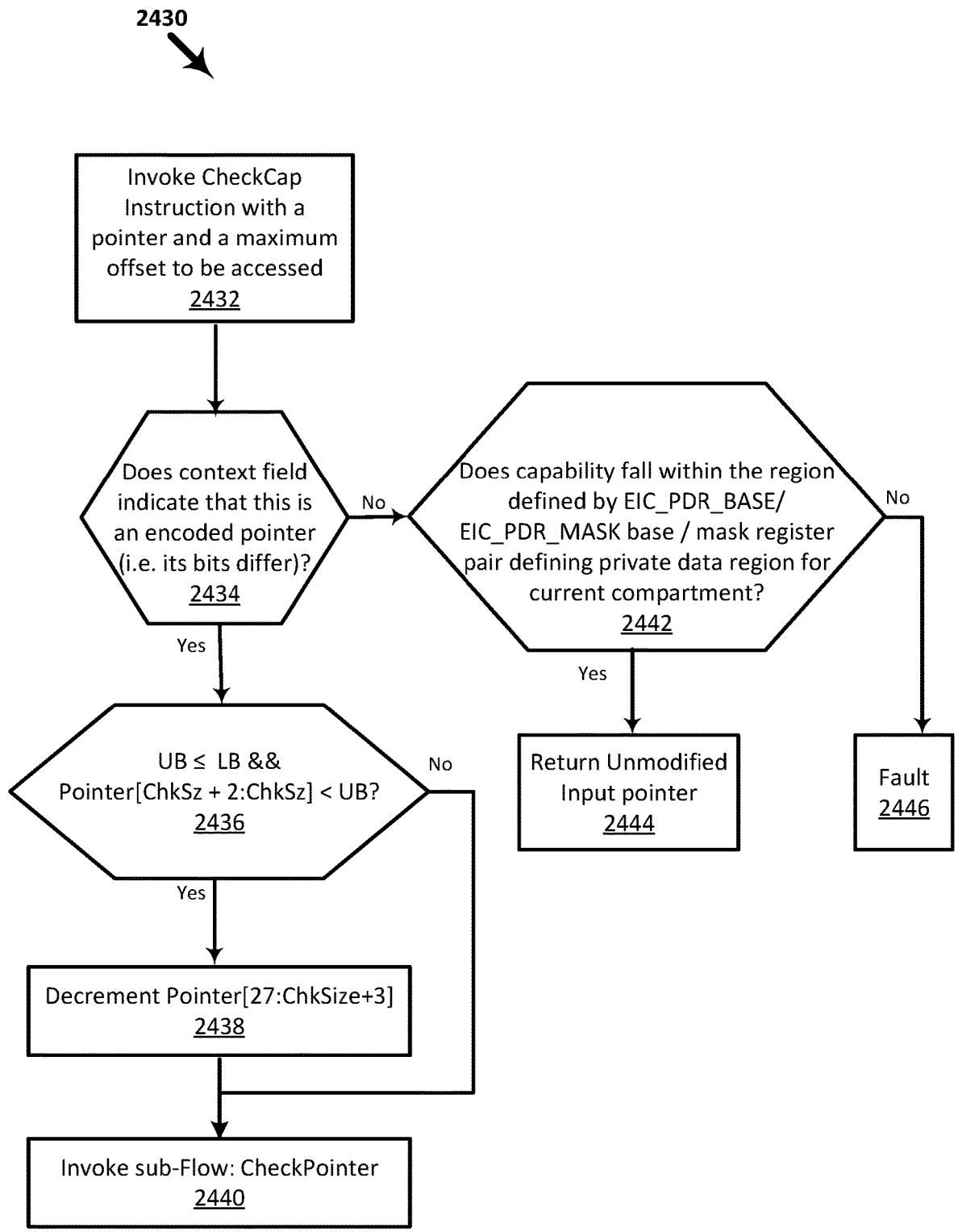
FIG. 24B is a block flow diagram illustrating a Check Pointer sub-flow of a security check, according to embodiments of the disclosure.

FIG. 24B is a block flow diagram illustrating a Check Pointer sub-flow of a security check, according to some embodiments. As shown, a trusted execution environment (TEE) is to execute flow 2430 starting at 2432, where it is to invoke CheckCap Instruction with a pointer and a maximum offset to be accessed. At 2434, the TEE is to determine: Does the context field indicate that this is an encoded pointer (e.g., its bits differ)? If not, the TEE is to determine at 2442: Does capability fall within the region defined by EIC_PDR_BASE/EIC_PDR_MASK base/mask register pair defining private data region for current compartment? If not, TEE is to generate a fault at 2446. But if the answer at 2442 is Yes, the TEE at 2444 is to return an unmodified input pointer.

Returning to 2434, if the answer is Yes, the TEE at 2436 is to determine whether UB≤LB && Pointer[ChkSz+2: ChkSz]<UB. If not, the TEE at 2440 is to invoke a CheckPointer sub-flow.

On the other hand, if the answer at 2436 was "Yes," the TEE at 2438 is to decrement pointer[27:ChkSize+3] and then, at 2440, the TEE is to invoke a CheckPointer sub-flow.

Execution and security checking flows of disclosed embodiments are further illustrated and described with respect to FIGS. 19A-23D, 25-28, 33A-B, and 34A-B.

Figure 24C:
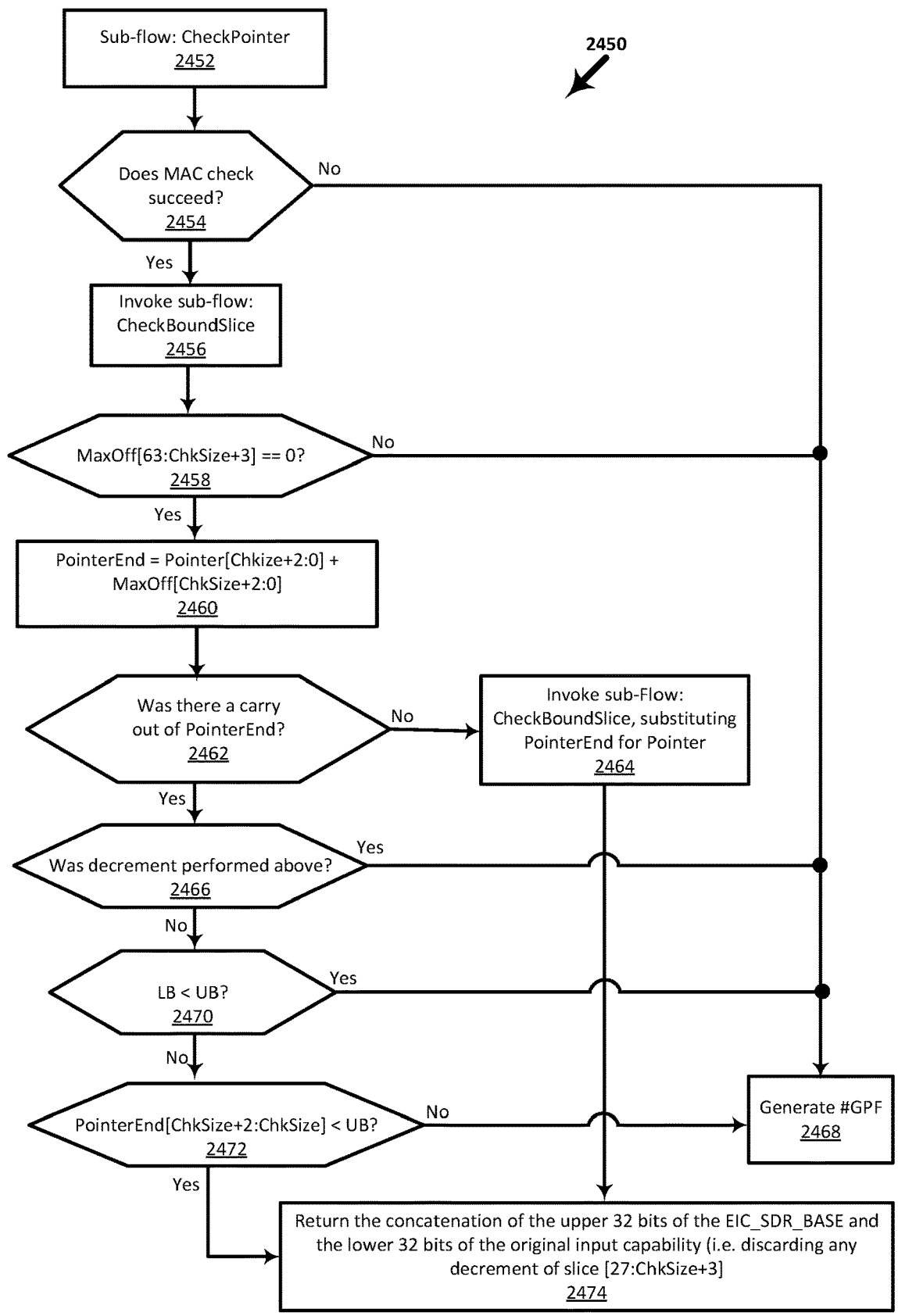
FIG. 24C is a block flow diagram illustrating a CheckBoundSlice sub-flow of a security check flow, according to embodiments of the disclosure.

FIG. 24C is a block flow diagram illustrating a CheckPointer sub-flow of a security check flow, according to some embodiments. CheckPointer is a sub-flow insofar as it is invoked at operation 2440 (FIG. 24B). As shown, a trusted execution environment (TEE) is to execute flow 2450 starting at 2452. At 2454, the TEE is to determine: Does MAC check succeed? If not, the TEE is to generate a fault at 2468, and the flow ends. And if the answer at 2454 is Yes, the TEE at 2456 is to invoke sub-flow CheckBoundSlice (described in FIG. 24D). Then, at 2458, the TEE is to determine: does MaxOff[63:ChkSize+3]==0? If not, the TEE to generate a fault at 2468. But if so, the TEE at 2460 is to set PointerEnd=Pointer[Chkize+2:0]+MaxOff[ChkSize+2:0]. Then, at 2462, the TEE is to determine: was there a carry out of PointerEnd? If not, the TEE at 2464 is to invoke sub-Flow: CheckBoundSlice, substituting PointerEnd for Pointer. But if the answer at 2462 was yes, the TEE at 2466 is to determine: Was decrement performed above? If so, the TEE is to generate a fault at 2468. But if not the TEE is to determine at 2472: is PointerEnd [ChkSize+2:ChkSize] <UB? If not, the TEE is to generate a fault at 2468. But if the answer at 2472 is Yes, the TEE at 2474 is to return the concatenation of the upper 32 bits of the EIC_SDR_BASE and the lower 32 bits of the original input capability (e.g., discarding any decrement of slice [27:ChkSize+3].

Execution and security checking flows of disclosed embodiments are further illustrated and described with respect to FIGS. 19A-23D, 25-28, 33A-B, and 34A-B.

Figure 24D:
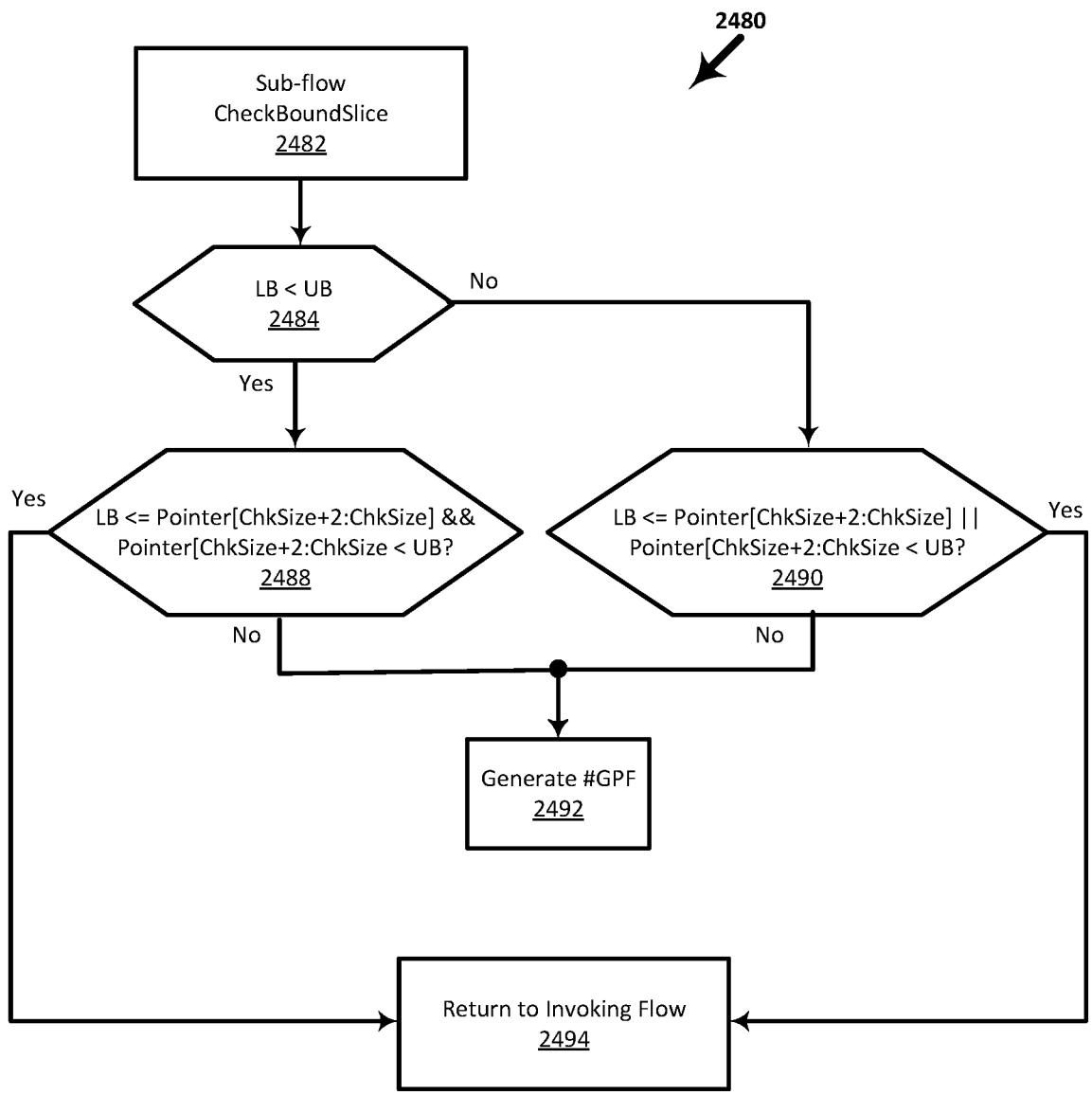
FIG. 24D is a block flow diagram illustrating a CheckBoundSlice sub-flow of a security check flow, according to embodiments of the disclosure.

FIG. 24D is a block flow diagram illustrating a Check-BoundSlice sub-flow of a security check flow, according to some embodiments. CheckBoundSlice is a sub-flow, insofar as it is invoked by operation 2456 (FIG. 24C). CheckBoundSlice flow starts at 2482. At 2484, the TEE is to determine: is LB<UB? If not, the TEE at 2490 is to determine: LB<=Pointe [ChkSize+2:ChkSize]||Pointer[ChkSize+2:ChkSize<UB? If not, the TEE at 2492 is to generate a fault. But if the answer at 2490 is Yes, the TEE at 2494 is to return to the invoking flow, CheckPointer (FIG. 24C).

Returning to 2484, if the answer is Yes, the TEE at 2488 is to determine: is LB<=Pointer[ChkSize+2:ChkSize] && Pointer[ChkSize+2:ChkSize<UB? If not, the TEE at 2492 is to generate a fault. But if the answer at 2488 is Yes, the TEE at 2494 is to return to the invoking flow, CheckPointer (FIG. 24C).

Figure 25:
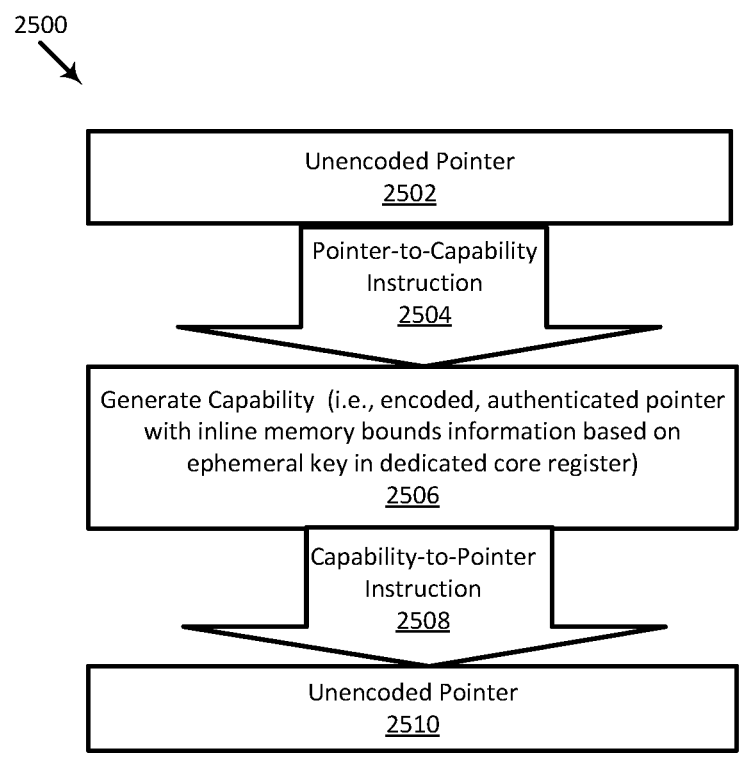
FIG. 25 is a block flow diagram illustrating conversion between an unencoded pointer to a capability, according to embodiments of the disclosure.

FIG. 25 is a block flow diagram illustrating conversion between an unencoded pointer to a capability, according to some embodiments. Illustrated is the overall flow from the trusted execution environment generating an unencoded pointer, authenticating it, providing it to the compartment, and then the compartment using it.

As shown, flow 2500 is to be performed by execution circuitry including a trusted execution environment (TEE), and starts at 2502, at which the TEE receives an unencoded pointer. Along with the input, the TEE at 2504 is to receive a Pointer-to-Capability Instruction, such as GenCap, described above. At 2506, the TEE is to generate a capability (e.g., defined here as an encoded, authenticated pointer with inline memory bounds information based on an ephemeral key in a dedicated core register). At 2508, the TEE is to receive a capability-to-pointer instruction, such as Check-Cap, described above. The flow ends at 2510 by the TEE providing an unencoded pointer (for example, to be used by a destination compartment to access a message block sent from another compartment).

Figure 26:
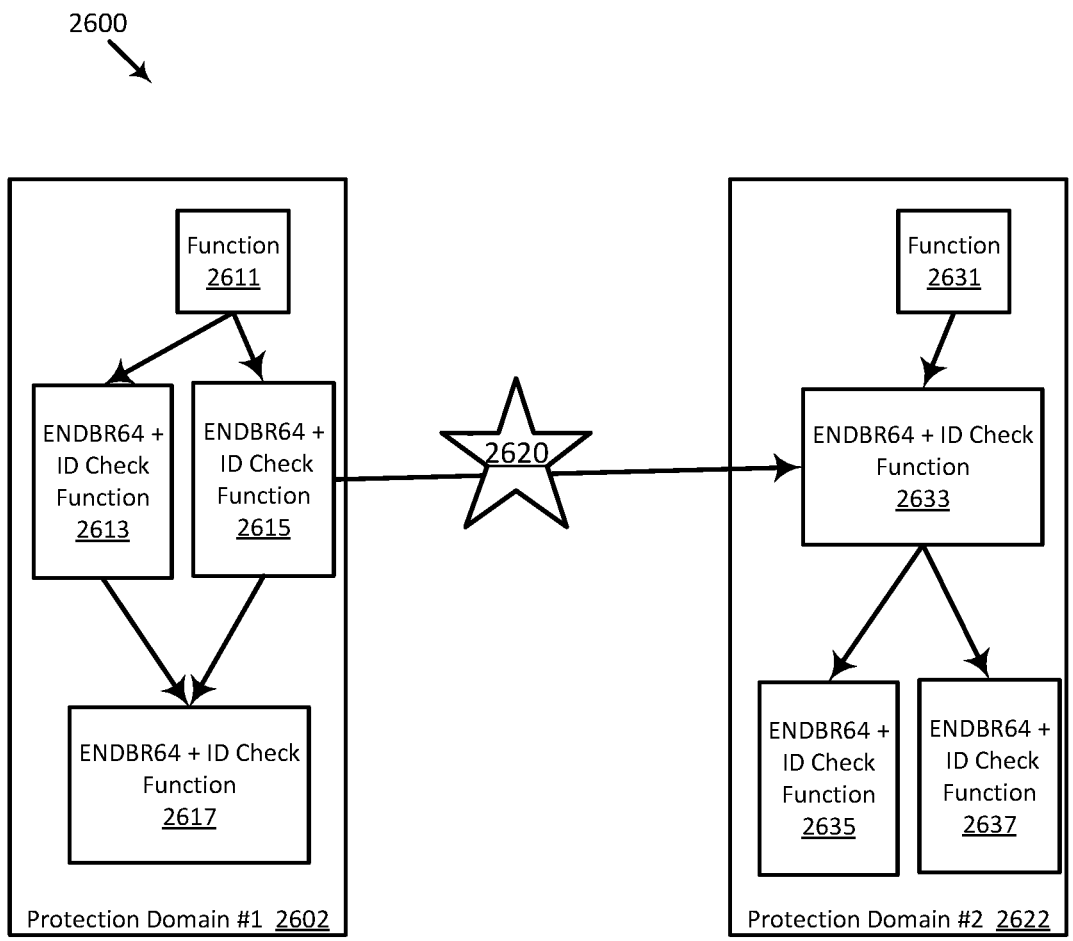
FIG. 26 illustrates maintaining integrity between service compartments by adding bounds checks after each ENDBRANCH, according to embodiments of the disclosure.

FIG. 26 illustrates maintaining integrity between service compartments by adding bounds checks after each END-BRANCH, according to some embodiments. As shown, system 2600 includes protection domain #1 2602, which includes function 2611, ENDBR64+ID Check Function 2613, ENDBR64+ID Check Function 2615, and ENDBR64+ID Check Function 2617. System 2600 further includes protection domain #2 2622, which includes function 2631, ENDBR64+ID Check Function 2633, ENDBR64+ID Check Function 2635, and ENDBR64+ID Check Function 2637.

Also illustrated is message block 2620 transitioning between the protection domains 2602 and 2622.

In operation, the current protection domain ID is stored in a thread-local location and is checked after each authorized indirect branch target. The root protection domain (PD) (sometimes referred to as the TEE) provides one special entry-point usable by non-root PDs to invoke the root PD. It has an ENDBR64 instruction, but that is not followed by an ID check. In operation, the root PD (e.g., TEE) determines which PD to invoke next and updates the thread-local indicator of the current scheduled PD prior to invoking it. The root PD maintains shadow stacks for the service PDs to prevent the use of returns to perform unauthorized control flow transfers between services.

Some embodiments employ an alternative to permit sharing of functions between multiple compartments by checking a bitmask against the current PDID (protection domain ID). If the bit in the bitmask indexed by the current PDID is set, then the call is permitted. This limits the number of PDIDs that are supported simultaneously in each runtime instance, though. In some embodiments, functions that are exclusive to a single compartment as well as those that are shared amongst compartments are supported simultaneously, and each use the appropriate types of checks.

In some embodiments, the code for each compartment is scanned prior to being loaded to ensure that it is appropriately instrumented with CheckCap instructions and Intel® Control-flow Enhancement Technology (CET) control flow checks and to determine that it does not include prohibited instructions such as WRPKRU instructions that are attempted to be used to reconfigure EIC or to extract its key or to invoke unauthorized system calls. Such load-time checks verify that all indirect memory accesses have been generated by CheckCap. CheckCap transparently handles and checks both unencoded references to the private memory region as well as authenticated capabilities pointing to the shared blackboard. In such embodiments, a fault (#GP) results in immediate termination of active service protection domain to mitigate brute-force attacks against EIC. Some embodiments also check direct branches to ensure that they stay within the bounds of the compartment.

Emerging formats such as WebAssembly simplify scanning code, and they are compatible with this approach. WebAssembly also confers benefits such as intrinsic control flow integrity, likely eliminating the need to use CET and hence offering improved performance.

Note that in some embodiments, the code for each compartment resides outside of the private memory region for that compartment, which also effectively enforces execute-only permissions useful for protecting secrets embedded in that code.

There is still some possibility that an adversary may undetectably forge a capability. Some embodiments apply authenticated encryption to data in the shared heap and efficiently transfer the key and nonce for the authenticated encryption to the intended destination of the data via the trusted execution environment. This is a much lighter-weight process than establishing an encrypted tunnel over a network. The authenticated encryption protects both the integrity and confidentiality of the data. Some embodiments use a different key or nonce for each exchange, thereby providing replay protection.

Figure 27:
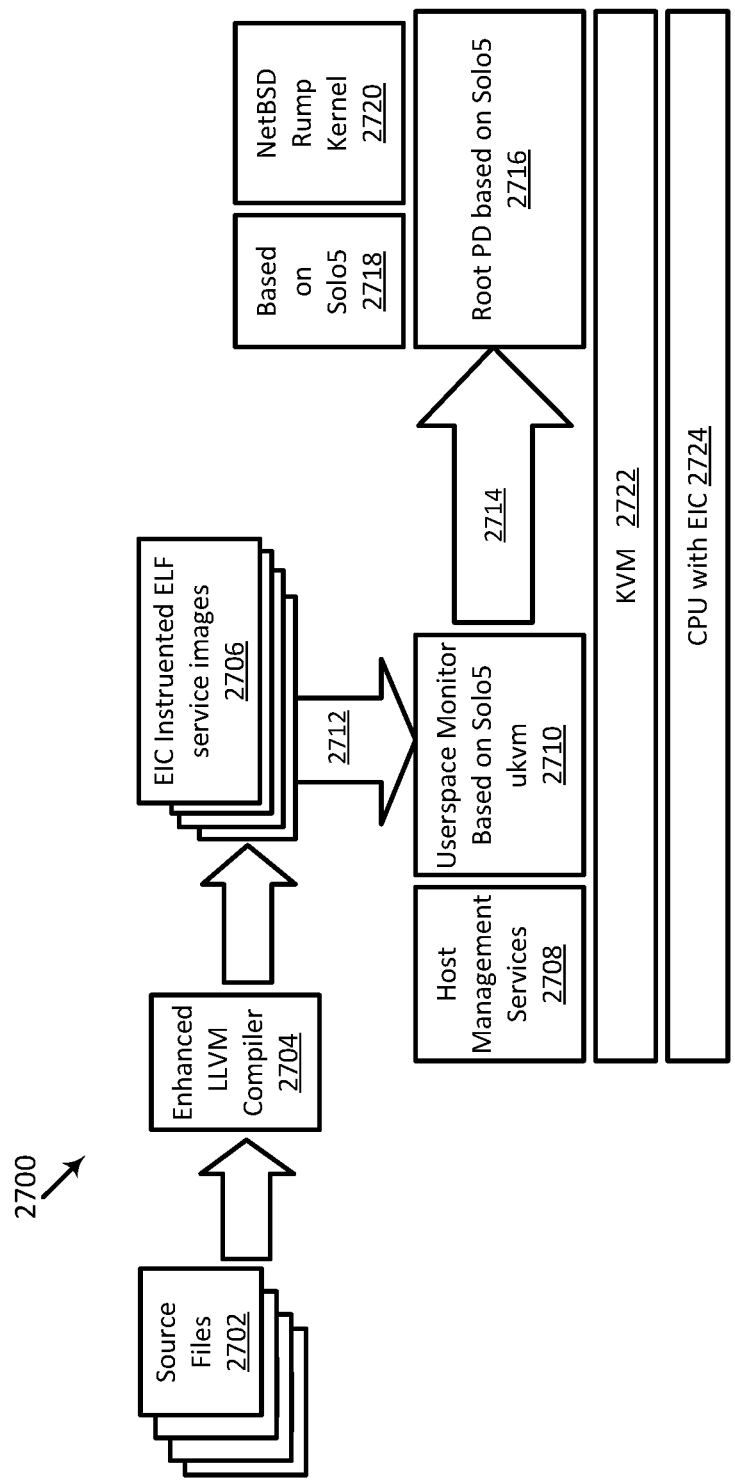
FIG. 27 illustrates an end-to-end system using encoded inline capabilities, according to embodiments of the disclosure.

FIG. 27 illustrates an end-to-end system using encoded inline capabilities, according to an embodiment. As shown, system 2700 includes source files 2702 and enhanced LLVM compiler 2704.

As used herein, LLVM refers to the LLVM compiler infrastructure project, which is a collection of modular and reusable compiler and toolchain technologies used to develop compiler front ends and back ends.

System 2700 further includes EIC instrumented executable and linkable format (ELF) service images 2706, which are fed via arc 2712 to userspace monitor based on Solo5 ukvm 2710, which works with host management services 2708. As used herein, Solo5 is a sandboxed execution environment for unikernels, which here is shown as ukvm. As shown, the system is supported by KVM 2722 and CPU with EIC 2724. As used herein, KVM refers to a Kernel-based Virtual Machine, which is a virtualization infrastructure for the Linux kernel that turns it into a hypervisor.

The output of 2710 passes via arc 2714 to Root PD (sometimes referred to as the TEE) based on Solo5 2716, which is coupled to Based on Solo5 2718 and NetBSD Rump kernel 2720.

Of course, it should be understood that the components illustrated in end-to-end flow are just exemplary components that can benefit from disclosed encoded inline capabilities (EIC). The illustrated components are not meant to limit applicability of disclosed embodiments.

Software Innovations to Support EIC

The compiler must be enhanced to insert the needed CheckCap instructions prior to memory accesses. In some embodiments, compilers are also enhanced to explicitly specify whether a particular global variable needs to be accessible from multiple compartments, although simply placing certain heap allocations in the shared data region may be sufficient.

In some embodiments, a trusted validator component verifies that needed instrumentation (e.g., appropriate CheckCap instructions and PDID checks following END-BRANCH instructions) is in place prior to permitting the compartment to be launched. Alternatively, the validator accepts an intermediate representation as input and inserts the appropriate instrumentation itself.

The trusted execution environment provides services such as memory allocation on the shared heap and private message heaps, reference counting of those allocations, scheduling, adapting local and remote requests, etc.

In some embodiments, the trusted execution environment decides, when allocating and transferring objects, whether it is faster to allocate them in the shared heap (e.g., if they are large) or in a private, runtime-managed message heap in each relevant compartment. Regardless, the application programming interfaces (APIs) for allocating and transferring objects are identical. The trusted execution environment transparently decides on the location and hence whether to use encoded pointers to refer to the object. If the object is small and allocated on the private message heaps, then the runtime directly copies data between the two heaps. The runtime uses reference counting to manage data both in the shared heap and in each private, runtime-managed message heap. Note that, in some embodiments, each compartment also maintains its own private heap that is not managed by the runtime.

In some embodiments, the trusted execution environment offers generic data transfer APIs that detect whether the specified endpoint is in the same address space or a different address space and automatically use the optimal transport mechanism. This also supports transparent interoperability with legacy services.

Note that this same system design can also be used with alternative compartmentalization mechanisms such as Protection Keys.

This is just a sample architecture, and the basic concept of single address space isolation can be implemented in many other ways to suit the requirements of various FaaS frameworks such as OpenWhisk, Oracle Fn, commercial FaaS offerings, etc.

In some embodiments, an EIC state is saved and restored using XSAVE/XRSTOR. EIC is not restricted to userspace; it can also be used in the kernel, e.g., to isolate drivers.

EIC states (EIC_AUTH_KEY, EIC_SDR_BASE, EIC_PDR_BASE, EIC_PDR_MASK), in some embodiments, are saved and restored on context switches. To achieve this, they can be part of the context stored by XSAVE/XRSTOR instructions, and also part of VMCS for VM switches, thus minimizing software changes.

Compartments can be run concurrently on multiple threads/cores as long as the trusted execution environment installs the same EIC key for each of them.

In some embodiments, a separate EIC key is used for each "epoch" of compartment execution. As used herein, a compartment's lifetime consists of one or more epochs. For example, a service that handles network requests defines a separate epoch for each incoming request. That enables the service to save its state in its private memory region across multiple requests, but it still loses access to messages transferred through the shared heap. This is a desirable property to avoid race conditions. For example, in some embodiments, a single packet is propagated through a chain of services, and only one service is granted access to the packet at a time.

In some embodiments, preemption of compartments is also supported by saving and later restoring EIC state, in addition to the ordinary execution context of the compartment.

EIC keys need to be generated very rapidly to keep up with the creation and destruction of epochs. One option for satisfying this requirement is for the trusted execution environment to offload the key generation task to an accelerator, such as Intel® QuickAssist, and store batches of keys received from the accelerator, ready to be installed in the EIC authentication key register on demand. Alternatively, in some embodiments, a new instruction is defined to update the EIC authentication key and even start generating the next key in the background as soon as the previous one is installed.

In some embodiments, the key derivation/generation is performed using Intel® Quick Assist Technology (QAT) cryptographic API Key Derivation Functions (KDFs) such as those defined in cpa_cy_key.h. QAT can support very high throughput of symmetric-key generation (in the range of 100 Gbps), which is sufficient to meet the demands of network infrastructures. Alternatively, NIST-approved KDFs are implemented in hardware (NIST spec SP 800-108 outlines the basic framework for key derivation). For example, KDF in counter mode using a Pseudo-Random Function (PRF) with a Key Derivation Key (KDK) derived from Intel® Digital Random Number Generator (DRNG) software may be used.

Alternative Embodiments

In some embodiments, capability information is encrypted rather than authenticated, which is accompanied by certain tradeoffs. Corruption of authenticated capabilities can be detected prior to decoding the capability/pointer, which may be advantageous for explaining the security semantics of EIC. In contrast, corruption of encrypted capabilities is detected after the capability is decoded, at the point when an access is attempted through the resultant pointer (e.g., general protection fault due to non-canonicality or page fault due to probabilistically pointing to an unmapped page). However, hybrid models are possible, in which fixed bits are encrypted and the scheme is partially reliant on late-detected faults for security, but in which earlier checks are also performed. For example, in some embodiments, an early canonicality check is pulled forwarded into CheckCap to result in a de facto MAC check.

In some embodiments, memory operands for standard instructions are redefined to perform checks equivalent to those in CheckCap inline with memory accesses. In X86, addresses are typically encoded with SIB in a form [BASE+INDEX*SCALE]+DISPLACEMENT.

Example: LEA 16(% RAX+% RCX*8), % RDX

If the base register (% RAX, in this example) is determined to be a capability through a specific pattern in the context field of its pointer value, then the effective address computation involves an implicit CheckCap operation, which advantageously allows the CheckCap operation to be inserted without requiring it to be explicitly inserted. Instrumentation to perform control flow checks, however, is still needed. Some embodiments eliminate that instrumentation by adding some feature such as a linear range register for restricting relative instruction pointer values, with a designated page that can update the range register when switching compartments or code-scanning to verify that no such update instructions are present in any of the code flows within unprivileged services.

EIC is currently defined to minimize hardware touchpoints, so pointer manipulation instructions and the register file do not distinguish between unencoded and authenticated pointers.

However, building in deeper support for encoded capabilities in some embodiments offers performance or assurance benefits. For example, in some embodiments, specialized pointer load instructions are defined that detect whether a pointer is authenticated when loading it into a register and performing authentication at that point. In that case, updates to the pointer are tracked and an exception is generated immediately when an out-of-bounds pointer update is performed, although that can result in incompatibility with certain programming languages that require the ability to temporarily represent out-of-bounds pointers. The register file, in some embodiments, is enhanced to also decode pointers and store them in an expanded format that facilitates more efficient checks and updates.

As another alternative to optimize an implicit CheckCap implementation, in some embodiments, caching of translations is implemented with 'Memory Target Buffers' similar to either TLBs or BTBs, mapping either a capability to base or instruction to base, to avoid the need for subsequent translations. In some embodiments, MTB records contain decoded limits, which simplify validation of bounds. MTB lookup can be based on the capability being used, or on the address of the executing instruction with a tag to check whether the same capability is being used in repeated invocations of the instruction.

Some disclosed embodiments focus on a single authentication key, but other embodiments extend EIC in a straightforward fashion to support multiple, simultaneous keys stored in separate registers or derived from a single master key based on a contextual input (e.g., a key ID). In some such embodiments, each of those keys is associated with a single shared data region or multiple shared data regions. The advantage of supporting multiple keys in different registers, as is done in some embodiments, is to enable different groups of pointers to be revoked separately by refreshing the corresponding key. Even with a single master key register, as in some embodiments, supporting multiple effective keys is useful for coarse-grained type safety enforcement. Different types of objects, in various embodiments, have their pointers authenticated with separate effective keys.

It may also be useful to support rapidly switching EIC compartment configurations (the settings of EIC_AUTH_KEY, EIC_PDR_BASE, EIC_PDR_MASK, and possibly EIC_SDR_BASE) in hardware rather than requiring the involvement of the trusted execution environment. For example, in some embodiments, a new atomic branch type is defined that performs such a switch based on in-memory compartment descriptors.

To reclaim bits for a stronger MAC, in some embodiments, the granularity of the overall pointer is reduced, e.g., by requiring that all pointers be 16-byte aligned to avoid storing the lowest four bits of the pointer. However, that breaks compatibility with standard pointer arithmetic and poses challenges for deriving pointers to fields within structures, etc.

Services narrow capabilities that they have received using approved code sequences, in some embodiments, such as the following:

CheckCap $sz, % RCX⇒% RAX
MOV $(sz-8), % RSI//The new size must be no larger than the original size
GenCap % RSI, % RAX⇒% RDX The necessary property to enforce when deriving a new capability Cl from an existing capability C0 is that the authorized bounds of Cl must not exceed those of C0 in either direction. This property can be checked simply based on inspecting the parameters to the paired GenCap and CheckCap instructions.

As an alternative to the private memory region base/mask pair, in some embodiments, a range register is specified instead to support more flexible alignment.

If it is possible for the compiler to statically distinguish between attempts to access the private memory region vs. the shared data region, in some embodiments, the compiler emits different instrumentation tailored to each. For example, in some embodiments, a range register or base/mask pair is used to specify the private memory region and an instruction checks an address against those, and a different instruction type is used to check attempted accesses against encoded pointers. Alternatively, in some embodiments, implicit checks are performed based on the effective segment of an access (e.g., DS, ES, and SS within the private memory region and GS for accesses through capabilities).

Some embodiments authenticate or encrypt code pointers in addition to data pointers. In some embodiments, a distinct context field value is defined for code pointers. For example, if the context value 2'b01 is used for data pointers, then the context value 2'b10 is used for code pointers. A CheckCodeCap instruction may be defined to authenticate and decode encoded code pointers. In some embodiments, indirect branch instructions are preceded by CheckCodeCap instructions to ensure that indirect branches are directed to authorized destinations. This eliminates the need for CET to control indirect branch destinations. CheckCodeCap performs different checks depending on whether the input code pointer value is encoded, as indicated by it having a context value of 2'b10, or unencoded, as indicated by it having a context value of 2'b00 or 2'b11. In some embodiments, CheckCodeCap checks unencoded code pointers against a base and mask register pair defining the authorized code region for unchecked code pointers, or it may simply not check unencoded code pointers. In some embodiments, passing an encoded data pointer, as indicated by it having a context value of 2'b01, to CheckCodeCap is disallowed and results in an exception being generated. The encoding of code pointers is simpler than that of data pointers, since it is unnecessary to specify object bounds for code pointers. Thus, in some embodiments, it is possible to allocate more of the pointer bits to the MAC to strengthen it. Alternatively, more of the pointer bits could be used to specify code locations, enabling access to a larger code address space. In some embodiments, a GenCodeCap instruction is defined to accept an unencoded code pointer as input and to generate an encoded and authenticated code pointer as output. Such embodiments generate a fault if the input code pointer is unrepresentable in encoded form, e.g., if it has upper address bits set that overlap with the bit positions used for storing the context value or the MAC in the encoded pointer format.

Multi-Address Space Usage

This disclosure has primarily focused on isolating multiple compartments within a single address space, but the underlying mechanisms are equally useful for restricting accesses from multiple address spaces to a memory region that is shared amongst them at the paging level. In some embodiments, EIC imposes a finer-grained level of sharing control so that even though the whole shared data region is available from every process in that set, the sandboxed portion of each process only receives access to particular objects within that shared region. Of course, in some embodiments, this is extended in a straightforward fashion to support multiple compartments in some or all of the processes.

Figure 28:
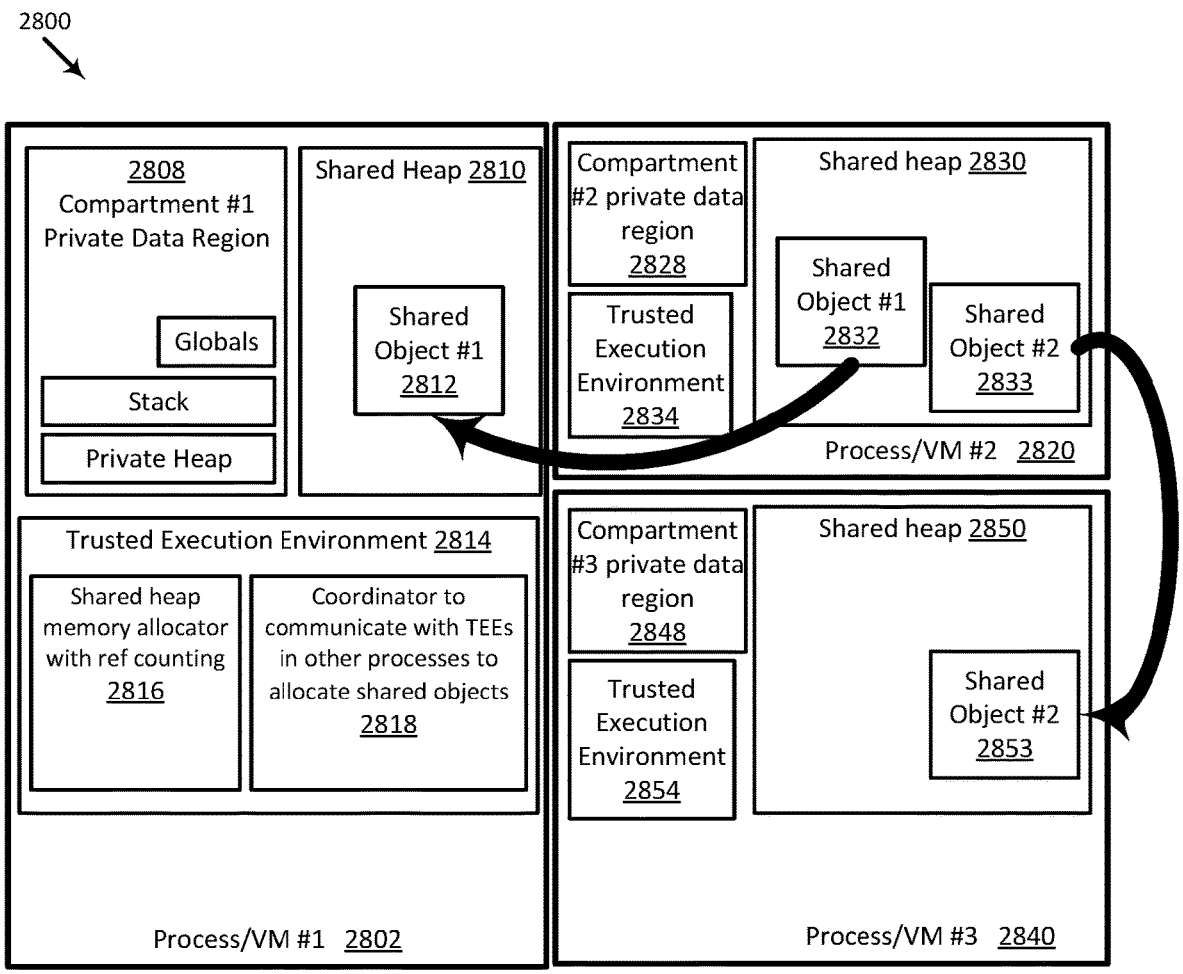
FIG. 28 illustrates a system for using encoded inline capabilities with multiple address spaces, according to embodiments of the disclosure.

FIG. 28 illustrates a system for using encoded inline capabilities with multiple address spaces, according to an embodiment. As shown, memory 2800 includes three process/VM instances, 2802, 2820, and 2840. Process/VM #1 2802 includes compartment #1 private data region 2808, shared heap 2810, which includes shared object #1 2812, and trusted execution environment (TEE) 2814, which includes shared heap memory allocator with ref counting 2816, and coordinator 2818 to communicate with trusted runtimes in other processes to allocate shared objects. Process/VM #2 2820 includes compartment #2 private data region 2828, trusted execution environment 2834, and shared heap 2830, which includes shared object #1 2832 and shared object #2 2833. Process/VM #3 2840 includes compartment #3 private data region 2848, trusted execution environment 2854, and shared heap 2850, which includes shared object #2 2853. Though not shown, each TEE 2834 and 2854 includes a controller like coordinator 2818 to communicate with trusted runtimes in other processes to allocate shared objects.

As shown, each TEE 2814, 2834, and 2854 is to provision and configure the compartments in its address range. In some embodiments, each TEE 2814, 2834, and 2854 is in a different processor or processor core, and in other embodiments, one of more of the TEEs are on a same processor. Each TEE 2814, 2834, and 2854 is further to receive and respond to GenCap and CheckCap requests from its constituent compartments.

Here, the illustrated operation involves a request to send a first and a second message block (via GenCap) received from compartment #2 private data region 2828 to destination compartments #1 private data region 2808 and #3 private data region 2848, respectively. In some embodiments, TEE 2834 receives and responds to a GenCap request from compartment #2 private data region 2828 to generate an access control capability, and TEE 2814 and 2854 are to receive and respond to CheckCap requests from destination compartments #1 private data region 2808 and #3 private data region 2848, respectively. In other embodiments, TEE 2834 receives and responds to the GenCap request from compartment #2 private data region 2828 to generate the access control capability. In some embodiments, TEE 2834 also responds to CheckCap requests received from compartment #1 private data region 2808 and compartment #3 private data region 2848 through their respective TEEs, 2814 and 2854.

Figure 29:
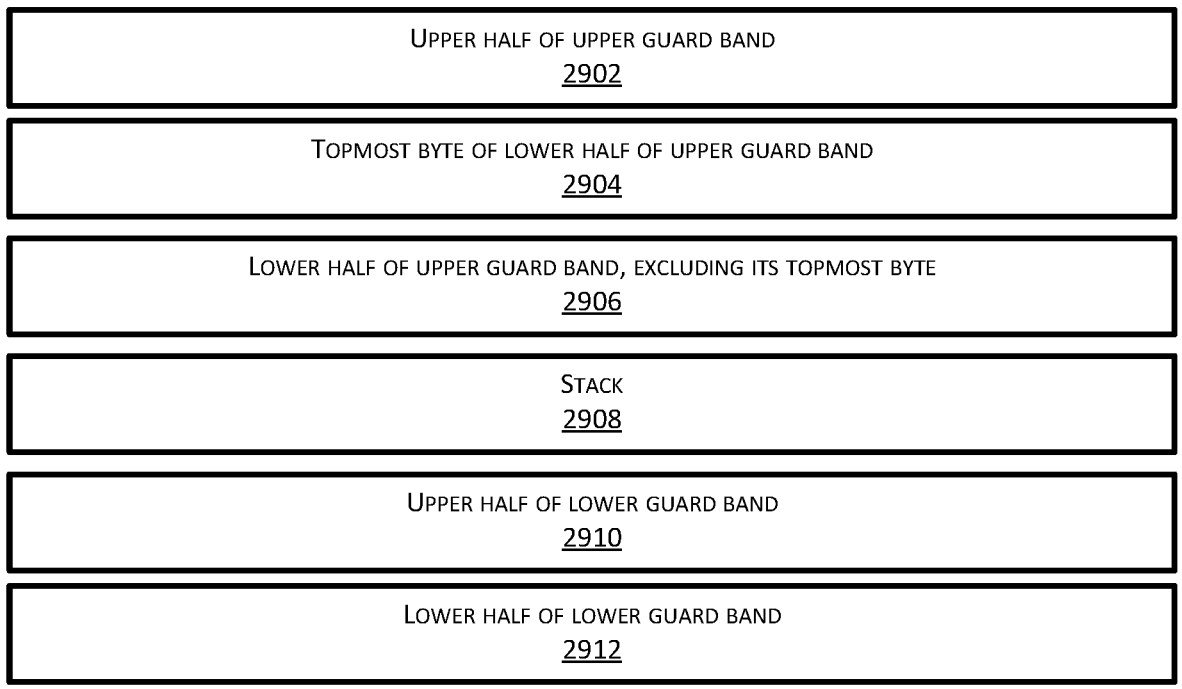
FIG. 29 illustrates a memory map including a stack, according to embodiments of the disclosure.

FIG. 29 illustrates a memory map including a stack, according to some embodiments. As shown, memory map 2900 includes upper half of upper guard band 2902, topmost byte of lower half of upper guard band 2904, upper half of upper guard band, excluding its topmost byte 2906, stack 2908, upper half of lower guard band 2910, and lower half of lower guard band 2912.

Instrumenting Code with GenCap and CheckCap Instructions

In some embodiments, memory accesses are instrumented with CheckCap instructions, e.g.:
(at entry, encoded pointer stored in RAX)
CheckCap 7, % RAX %⇒RCX; Decode pointer from RAX and load into RCX MOV (% RCX)⇒% RDX; Load from object It is possible to optimize sequences of code that access different offsets within the same object to only execute a single CheckCap specifying the maximum offset. Here is an example:
(at entry, encoded pointer stored in RAX)
CheckCap 23, % RAX⇒% RCX; Decode pointer from RAX and load into RCX
MOV (% RCX)⇒% RDX; Load from object
MOV 16(% RCX)⇒% RSI; Load from different offset in object In certain embodiments, it is the responsibility of a validator component to check that the instrumentation is adequate to enforce security prior to launching the compartment. In this example, it checks that anywhere RCX is used, the maximum offset that can be accessed from RCX is less than or equal to the offset that was specified in the check: 23. If any instruction were to modify RCX prior to using it to specify an address, then that must be taken into account during the checks. Certain modifications may be too complex for the validator to statically verify them, depending on the abilities of the validator to analyze complex code. For example, if some other register is added to RCX, as in some embodiments, then the validator needs to determine bounds on the possible values of that addend, which may require additional code analysis. In such cases, the validator rejects the provided binary.

In addition to the simple optimizations described above to reduce the number of CheckCap instructions needed, more advanced optimizations are possible like those used to optimize MPX instrumentation. For example, in some embodiments, loops that iterate through arrays have the CheckCap instruction lifted out of the loop and modified to check the entire set of iterated accesses at once.

Any fault detected while executing CheckCap must trigger the immediate termination of the faulting compartment to preclude brute force attacks against the EIC authentication key. Terminating the compartment results in the erasure of the key used to authenticate capabilities for that compartment. It may still be possible for an adversary to launch a distributed brute force attack by deploying many parallel compartments and attempting the same attack in each, but such an attempt can be detected by a service provider (e.g., if a particular customer's compartments generate a large number of faults, then that customer may be suspected of malicious activity and blocked). Ordinarily, CheckCap instructions should not generate faults, although benign software bugs may result in some faults.

TSX has been misused in the past as a mechanism for suppressing faults during security attacks, and, in some embodiments, such uses are prevented for EIC-enabled workloads. For example, in some embodiments, CheckCap is defined to unconditionally abort to avoid revealing information about the MAC key.

It is also necessary to regulate control flow transitions so that only the trusted execution environment is able to transfer control from one compartment to another. As mentioned above, mechanisms based on Intel® Control-flow Enhancement Technology (CET) control flow checks are suitable for regulating those control flow transitions.

Software Hardening/Exploit Mitigation Usages

Beyond networked service isolation, EIC can be used to define memory regions for data with different sensitivity levels. For example, the SafeStack pass in LLVM stores stack allocations that are always accessed safely separately from those allocations that may be accessed unsafely. This can mitigate ROP vulnerabilities and corruption of spilled register data. However, it is necessary to protect the safe stack from unauthorized accesses, e.g., due to stray pointer writes. In some embodiments, EIC enforces such a policy by placing the safe stack outside of the private memory region and only instrumenting memory accesses that are NOT authorized to access the safe stack with CheckCap instructions. Furthermore, EIC supports making this policy more flexible by offering the ability for the program to define capabilities containing bounds for safe stack allocations and passing those to code that may perform unsafe memory accesses. Since the code is instrumented, the CheckCap instructions will prevent any unsafe accesses. Unsafe stack allocations and other memory allocations will still be accessed with no overhead from checking encoded pointers, only the minimal overhead from the private memory region base/mask check. This enables additional, sensitive stack allocations to be selectively moved to the safe stack, even though the compiler was not previously able to do so given the possibility for unsafe accesses to the objects in the absence of bounds checks. Fundamentally, the ability for a single instruction, CheckCap, to process both encoded and unencoded pointers is what provides this flexibility.

Another similar example is DataShield, which allows developers to annotate sensitive data and ensures that any code that may access that data is instrumented with bounds-checking logic. It improves efficiency relative to bounds-checking all data. Currently, DataShield stores bounds information in a metadata table, which restricts the flexibility of the policy by requiring a strict partition between sensitive and insensitive code and data. Otherwise, if code authorized to access sensitive data tried to access non-sensitive data, it would not find the necessary bounds metadata, resulting in incorrect program behavior. This inflexibility results in high overhead. In some embodiments, EIC helps reduce overhead by embedding metadata inline with only those pointers that require it. In some embodiments, sensitive data is stored in the shared data region, although it is in fact private to a single application in this model. The primary model described above of implicitly specifying chunk size based on location in the shared heap is unlikely to be suitable for protecting a stack structure, but sensitive stack allocations can be converted to heap allocations, or, as in some embodiments, a field is added to the encoded pointers to explicitly specify chunk sizes. Of course, that would require taking those bits from some other field, which may have tradeoffs such as weakening the MAC. Non-sensitive data in some embodiments is stored in the private memory region. The same code, in some embodiments, processes data with either classification, and appropriate bounds checks are performed on both types of accesses to prevent corruption of sensitive data. In some embodiments, EIC is used to track data flows from memory through registers whether it was loaded from the shared data region or the private memory region and ensure that any registers tainted by data from the shared data region are only ever written back to the shared data region if an authorized declassify instruction is used to declassify the data in the register. This serves as a check on the compiler's algorithms that perform static information flow analysis through the program and identify data allocations that may end up tainted with sensitive data and hence must be allocated in the shared data region.

Validating Untrusted Binaries

In some embodiments, untrusted binaries are validated as being properly instrumented with security checks prior to executing them. This section describes possible mechanisms for performing such validation. The method of validation varies depending on the base binary format that is selected. To illustrate the validation, three exemplary embodiments are described:
  1. ELF or other executable formats: A low-level, machine-specific format.
  2. LLVM machine IR: Also low-level and machine-specific, but with more semantic information about control flow structure, etc.
  3. WebAssembly modules: A platform-independent format with expressive control flow instructions and restricted semantics expressly intended to permit easy validation.

"Validation" can take a number of forms. The server may require that all necessary security instrumentation was inserted when the binary was generated. Alternatively, the server may take on some of the responsibility for inserting security instrumentation. This may lead to the preference of one format over another. For example, LLVM machine IR and WebAssembly are both intended to be transformed by a compiler into a final executable representation, so it is natural to insert instrumentation at that stage.

Some memory accesses in programs specifically reference the stack or globals, whereas others are directed by pointers that refer to the heap, stack, or globals. Some embodiments obviate the need for invoking CheckCap by simply validating that such memory accesses do in fact refer only to the authorized stack or global regions.

Accesses to global variables and constants within the current binary file must be performed using RIP-relative addressing so that the code validator can inspect each such access and verify that it points to a memory region that is entirely contained within either the bss or data section of the current binary file. In some embodiments, there are limitations in the types of accesses (e.g., dynamically computed offsets within an array) that can be statically validated, so such accesses need to be treated like other pointer accesses that require dynamic validation as described previously (e.g., using CheckCap).

Some embodiments avoid instrumenting programs that frequently access the stack by restricting stack accesses to always be within some maximum offset from a base register pointing into the stack. The validator also checks updates to base registers pointing into the stack. According to some embodiments, the security property to be enforced is represented by Theorem 1, below.

Theorem 1

Theorem 1: Any attempted stack access that falls outside the authorized bounds of the stack results in a page fault.

This theorem is trivially satisfied by marking all memory outside of the stack as inaccessible, but such a system would not be practically usable. Instead, some embodiments define guard bands of memory above and below the stack that are unmapped and hence inaccessible. With this as context, Theorem 1 is decomposed into the following lemmata. The term "stack base register" as used herein refers to any live register interval that is used as a base register for a stack memory access. RSP is always considered to be a stack base register, but other registers can be used as stack base registers as well. It can be challenging to even identify stack base registers. In some embodiments, a "SafeStack" pass is used to move any stack allocation whose address may be passed to a subroutine to a separately-allocated stack on the heap. Those accesses in some embodiments are fulfilled similarly to other heap accesses as described above. This permits the same stack base register determination to be used as was used for SafeStack hardening: Only RSP initially points into the stack at the start of a function, so only registers that are derived from RSP are stack base registers.

Lemma 1.1: At the time that a register is used as the base for a stack memory access, it is either within the authorized bounds of the stack, no greater than (guard band size/2) bytes below the lower stack boundary, or less than (guard band size/2) bytes above the upper stack boundary. This is represented graphically in FIG. 29 as regions 2906, 2908, and 2910.

Lemma 1 can be argued informally using two sub-lemmata, lemma 1.1.1 and lemma 1.1.2.

Lemma 1.1.1

First, Lemma 1.1.1: At the time that a stack base register is updated, its original value is no lower than the lower stack boundary and it is below the upper stack boundary (not equal to the upper stack boundary). Argument for Lemma 1.1.1: The code validator can statically check that any instruction that updates the stack base register is preceded by an instruction that attempts to access the memory pointed to by the previous value of the stack base register. The code validator also needs to check that no other instruction between these two updates that same stack base register. The compiler may need to be enhanced to ensure that this is always the case by inserting dummy stack accesses immediately preceding stack access instructions that otherwise would invalidate this lemma. Note that some instructions both update the stack pointer (a special stack base register) and access the stack (in different orders), such as PUSH, POP, CALL, and RET.

Lemma 1.1.2

Second, Lemma 1.1.2: No stack base register is updated by more than (guard band size/2) bytes at a time. Argument for Lemma 1.1.2: The code validator can statically check this property, although it may constrain the instructions that can be used to update stack base registers. For example, the code validator may only support a specific set of instructions that update stack base registers by amounts specified as immediate operands or static implicit amounts as in PUSH, POP, CALL, and RET instructions. In practice, this is sufficient to handle most or all code emitted by LLVM. Argument for Lemma 1.1: Lemma 1.1.1 and Lemma 1.1.2 taken together imply that after any update of a stack base register, that register must point within the regions 2906, 2908, or 2910 in FIG. 29.

Lemma 1.2

Lemma 1.2: All stack accesses specify a displacement that is no greater than (guard band size/2) bytes from the base register.

Argument for Lemma 1.2: The code validator can statically check this property, although it may constrain the memory addressing forms that can be used to access the stack. For example, the code validator may only support instructions that specify either no displacement or an immediate displacement. Instructions that implicitly access the current stack slot such as POP and RET are considered to specify no offset from the stack pointer. Instructions that implicitly access the next stack slot such as PUSH and CALL are considered to specify an offset of—(word size) from the stack pointer.

Argument for Theorem 1: Taking Lemma 1.1 and Lemma 1.2 together, the lowest stack address that can be computed is the lowest address in the lower guard band. Any access to this address will result in a page fault. The highest stack address that can be computed is the address of the topmost byte in the upper guard band. Any access to this address will result in a page fault, even if the access is larger than a byte and regardless of any mapping above the upper guard band.

An alternative to the approach described above is to allow the program to invoke a runtime-provided component to safely access a runtime-managed stack, but that would impose substantial overhead.

Hybrid Capability Models

Authenticating or encrypting capabilities simplifies the task of revoking capabilities, as described above. However, tagged memory capabilities may offer advantages such as deterministic protection (e.g., no potential for an adversary to guess a MAC or ciphertext that permits forgery of a capability). The two types of models can be hybridized in a straightforward fashion to obtain the best of both worlds, although such hybridization may provide minimal benefit if MACs or ciphertexts are made sufficiently long. Of course, large MACs/ciphertexts may impose significant memory footprint overhead for many usages.

Zones (e.g., Red Zones)

Zones (e.g., red zones) between allocated objects, e.g., defined by marking pages as inaccessible, can mitigate adjacent spatial safety vulnerabilities, but they may provide little protection against non-adjacent spatial safety vulnerabilities. Zones may be used for protecting allocations that are too large to be represented using a single capability and that are predictably accessed in a linear fashion. In certain embodiments, using zones avoids the overhead of initializing tags for the entire allocation.

Compiler

Certain embodiments herein include improvements to a compiler. In one embodiment, a compiler instruments code to initialize and de-initialize tags (e.g., based on a corresponding memory allocation/deallocation, respectively) appropriately to enforce temporal safety. For example, when a variable goes out of scope, its storage should be reset (e.g., to a different tag value (e.g., tag "color")).

In certain embodiments, for allocations controlled using capabilities, those capabilities should be freed promptly when allocations go out of scope to enforce temporal safety. Furthermore, since capabilities support narrowing, programs should be instrumented to generate narrowed capabilities at appropriate points in certain embodiments. For example, when a pointer to a field is passed to a subroutine, a narrowed capability should be passed rather than the original capability with an adjusted offset. This more precisely enforces spatial safety.

In certain embodiments, strong enforcement of memory safety is highly effective for vulnerability mitigation, and it has the potential to mitigate vulnerabilities even in the absence of other ISA extensions that may be useful for mitigating vulnerabilities and exploits. For example, specialized Control-Flow Integrity (CFI) enforcement may only be necessary if it is possible to corrupt code pointers in the first place, which is mitigated by memory safety. Enabling redundant CFI enforcement may impose additional overhead without mitigating additional vulnerabilities. However, if memory safety is only enforced probabilistically, then deterministic CFI enforcement provides additional hardening in certain embodiments. CET and authenticated code pointer mechanisms may be used in addition to ZMS.

Certain embodiments herein add pure capability-based software stacks. Adding support for intra-address space compartmentalization may create opportunities to produce simplified processors that omit paging support. Paging has obvious value for systems with legacy compatibility requirements, but it may be unnecessary for many (e.g., Internet-of-Things (IoT)) platforms, and it may even be unnecessary for specialized datacenter platforms for cloud-native workloads, e.g., FaaS.

Certain embodiments herein mitigate confused deputy vulnerabilities. In certain embodiments, memory safety mechanisms intrinsically mitigate for confused deputy vulnerabilities between compartments. For example, if compartment A maliciously passes a pointer referring to memory in compartment B to a third compartment C that attempts to access the pointer provided by compartment A, the memory safety mechanism is to detect and prevent the attempted attack. The adversary would need to correctly guess the tag value or the value of the temporal safety bits to evade detection. In certain embodiments, SMEP and SMAP are important mitigations for confused deputy vulnerabilities in kernels, and their functionality is preserved even in pure capability-based software stacks for ZMS.

Exemplary architectures, systems, etc. that the above may be used in are detailed below.

At least some embodiments of the disclosed technologies can be described in view of the following examples:

Example 1. A hardware processor comprising:
an execution unit to execute an instruction to request access to a block of memory through a pointer to the block of memory; and
a memory controller circuit to allow access to the block of memory when an allocated object tag in the pointer is validated with an allocated object tag in an entry of a capability table in memory that is indexed by an index value in the pointer, wherein the memory controller circuit is to clear (e.g., flush) the allocated object tag in the capability table when a corresponding object is deallocated.

Example 2. The hardware processor of example 1, wherein the memory control circuit is to populate the entry of the capability table when allocating the block of memory for the corresponding object of a plurality of objects of object-oriented source code.

Example 3. The hardware processor of example 1, wherein the entry in the capability table includes a field that indicates to the memory controller circuit a type of the corresponding object.

Example 4. The hardware processor of example 3, wherein the memory controller circuit is to cause a fault when the allocated object tag in the pointer is not validated with the allocated object tag in the entry of the capability table, and when the type indicated by the entry of the capability table does not match a type for the pointer.

Example 5. The hardware processor of example 3, wherein the entry in the capability table includes a field that indicates to the memory controller circuit a size of the corresponding object.

Example 6. The hardware processor of example 1, wherein the pointer comprises a leading bit having an opposite value of a next bit in the pointer to cause the memory controller circuit to look up the allocated object tag in the entry of the capability table, and check the allocated object tag in the pointer with the allocated object tag in the entry of the capability table.

Example 7. The hardware processor of example 6, wherein the pointer further comprises a mode bit that, when set to a first value, causes the memory controller circuit to look up the allocated object tag in the entry of the capability table, and check the allocated object tag in the pointer with the allocated object tag in the entry of the capability table.

Example 8. The hardware processor of example 1, wherein the memory controller circuit is to check a user capability table for user pointers and check a separate, supervisor pointer table for supervisor pointers.

Example 9. A method comprising:
receiving a request to access a block of memory through a pointer to the block of memory;
allowing access to the block of memory when an allocated object tag in the pointer is validated with an allocated object tag in an entry of a capability table in memory that is indexed by an index value in the pointer; and
clearing the allocated object tag in the capability table when a corresponding object is deallocated.

Example 10. The method of example 9, further comprising populating the entry of the capability table when allocating the block of memory for the corresponding object of a plurality of objects of object-oriented source code.

Example 11. The method of example 9, wherein the entry in the capability table includes a field that indicates a type of the corresponding object.

Example 12. The method of example 11, further comprising causing a fault when the allocated object tag in the pointer is not validated with the allocated object tag in the entry of the capability table, and when the type indicated by the entry of the capability table does not match a type for the pointer.

Example 13. The method of example 11, wherein the entry in the capability table includes a field that indicates a size of the corresponding object.

Example 14. The method of example 9, wherein the pointer comprises a leading bit having an opposite value of a next bit in the pointer to cause a lookup of the allocated object tag in the entry of the capability table, and a check of the allocated object tag in the pointer with the allocated object tag in the entry of the capability table.

Example 15. The method of example 14, wherein the pointer further comprises a mode bit that, when set to a first value, causes the lookup the allocated object tag in the entry of the capability table, and the check of the allocated object tag in the pointer with the allocated object tag in the entry of the capability table.

Example 16. The method of example 9, further comprising checking a user capability table for user pointers and checking a separate, supervisor pointer table for supervisor pointers.

Example 17. A non-transitory machine readable medium that stores program code that when executed by a machine causes the machine to perform a method comprising:
receiving a request to access a block of memory through a pointer to the block of memory;
allowing access to the block of memory when an allocated object tag in the pointer is validated with an allocated object tag in an entry of a capability table in memory that is indexed by an index value in the pointer; and
clearing the allocated object tag in the capability table when a corresponding object is deallocated.

Example 18. The non-transitory machine readable medium of example 17, further comprising populating the entry of the capability table when allocating the block of memory for the corresponding object of a plurality of objects of object-oriented source code.

Example 19. The non-transitory machine readable medium of example 17, wherein the entry in the capability table includes a field that indicates a type of the corresponding object.

Example 20. The non-transitory machine readable medium of example 19, further comprising causing a fault when the allocated object tag in the pointer is not validated with the allocated object tag in the entry of the capability table, and when the type indicated by the entry of the capability table does not match a type for the pointer.

Example 21. The non-transitory machine readable medium of example 19, wherein the entry in the capability table includes a field that indicates a size of the corresponding object.

Example 22. The non-transitory machine readable medium of example 17, wherein the pointer comprises a leading bit having an opposite value of a next bit in the pointer to cause a lookup of the allocated object tag in the entry of the capability table, and a check of the allocated object tag in the pointer with the allocated object tag in the entry of the capability table.

Example 23. The non-transitory machine readable medium of example 22, wherein the pointer further comprises a mode bit that, when set to a first value, causes the lookup the allocated object tag in the entry of the capability table, and the check of the allocated object tag in the pointer with the allocated object tag in the entry of the capability table.

Example 24. The non-transitory machine readable medium of example 17, further comprising checking a user capability table for user pointers and checking a separate, supervisor pointer table for supervisor pointers.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 30A:
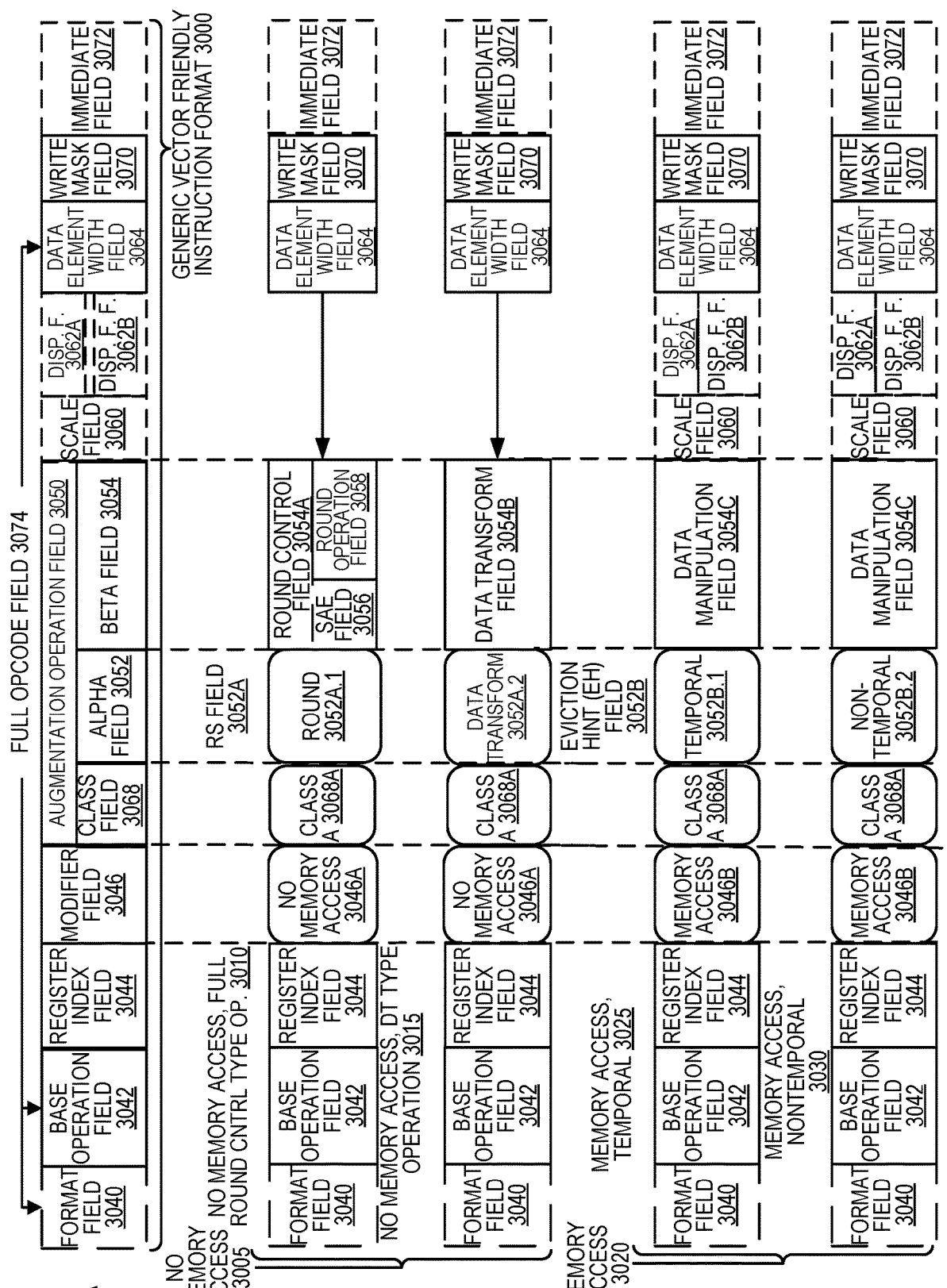
FIG. 30A is a block diagram illustrating a generic vector friendly instruction format and class A instruction templates thereof according to embodiments of the disclosure.
Figure 30B:
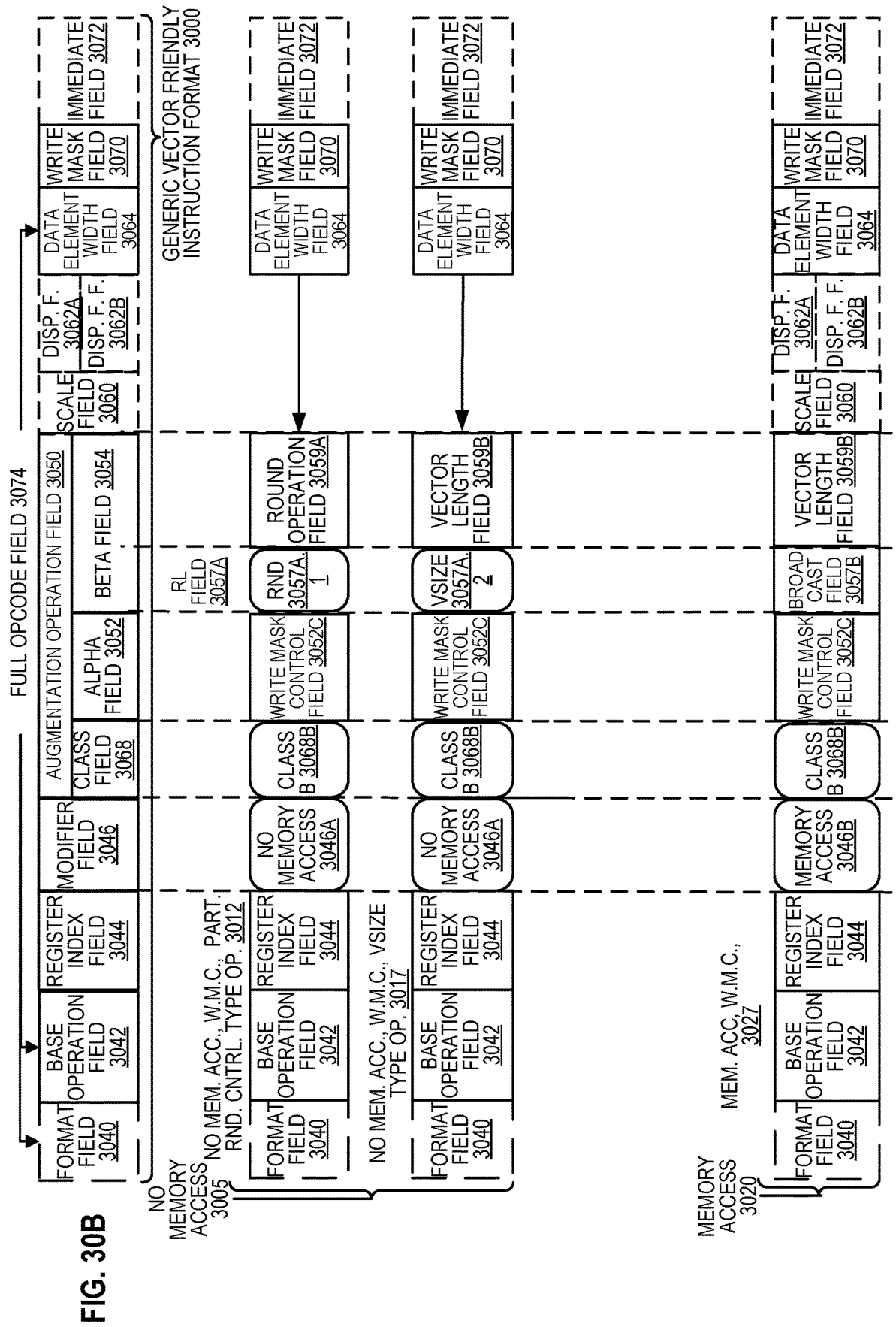
FIG. 30B is a block diagram illustrating the generic vector friendly instruction format and class B instruction templates thereof according to embodiments of the disclosure.

FIGS. 30A-30B are block diagrams illustrating a generic vector friendly instruction format and instruction templates thereof according to embodiments of the disclosure. FIG. 30A is a block diagram illustrating a generic vector friendly instruction format and class A instruction templates thereof according to embodiments of the disclosure; while FIG. 30B is a block diagram illustrating the generic vector friendly instruction format and class B instruction templates thereof according to embodiments of the disclosure. Specifically, a generic vector friendly instruction format 3000 for which are defined class A and class B instruction templates, both of which include no memory access 3005 instruction templates and memory access 3020 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 30A include: 1) within the no memory access 3005 instruction templates there is shown a no memory access, full round control type operation 3010 instruction template and a no memory access, data transform type operation 3015 instruction template; and 2) within the memory access 3020 instruction templates there is shown a memory access, temporal 3025 instruction template and a memory access, non-temporal 3030 instruction template. The class B instruction templates in FIG. 30B include: 1) within the no memory access 3005 instruction templates there is shown a no memory access, write mask control, partial round control type operation 3012 instruction template and a no memory access, write mask control, vsize type operation 3017 instruction template; and 2) within the memory access 3020 instruction templates there is shown a memory access, write mask control 3027 instruction template.

The generic vector friendly instruction format 3000 includes the following fields listed below in the order illustrated in FIGS. 30A-30B.

Format field 3040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 3042—its content distinguishes different base operations.

Register index field 3044—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 3046—its content distinguishes occurrences of instructions in the generic vector instruction format that specify memory access from those that do not; that is, between no memory access 3005 instruction templates and memory access 3020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 3050—its content distinguishes which one of a variety of different operations to be performed in addition to the base operation. This field is context specific. In one embodiment of the disclosure, this field is divided into a class field 3068, an alpha field 3052, and a beta field 3054. The augmentation operation field 3050 allows common groups of operations to be performed in a single instruction rather than 2, 3, or 4 instructions.

Scale field 3060—its content allows for the scaling of the index field's content for memory address generation (e.g., for address generation that uses $2^{scale}*index+base$).

Displacement Field 3062A—its content is used as part of memory address generation (e.g., for address generation that uses $2^{scale}*index+base+displacement$).

Displacement Factor Field 3062B (note that the juxtaposition of displacement field 3062A directly over displacement factor field 3062B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 3074 (described later herein) and the data manipulation field 3054C. The displacement field 3062A and the displacement factor field 3062B are optional in the sense that they are not used for the no memory access 3005 instruction templates and/or different embodiments may implement only one or none of the two.

Data element width field 3064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 3070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 3070 allows for partial vector operations, including loads, stores, arithmetic, logical, etc. While embodiments of the disclosure are described in which the write mask field's 3070 content selects one of a number of write mask registers that contains the write mask to be used (and thus the write mask field's 3070 content indirectly identifies that masking to be performed), alternative embodiments instead or additional allow the mask write field's 3070 content to directly specify the masking to be performed.

Immediate field 3072—its content allows for the specification of an immediate. This field is optional in the sense that is it not present in an implementation of the generic vector friendly format that does not support immediate and it is not present in instructions that do not use an immediate.

Class field 3068—its content distinguishes between different classes of instructions. With reference to FIGS. 30A-B, the contents of this field select between class A and class B instructions. In FIGS. 30A-B, rounded corner squares are used to indicate a specific value is present in a field (e.g., class A 3068A and class B 3068B for the class field 3068 respectively in FIGS. 30A-B).

Instruction Templates of Class A

In the case of the non-memory access 3005 instruction templates of class A, the alpha field 3052 is interpreted as an RS field 3052A, whose content distinguishes which one of the different augmentation operation types are to be performed (e.g., round 3052A.1 and data transform 3052A.2 are respectively specified for the no memory access, round type operation 3010 and the no memory access, data transform type operation 3015 instruction templates), while the beta field 3054 distinguishes which of the operations of the specified type is to be performed. In the no memory access 3005 instruction templates, the scale field 3060, the displacement field 3062A, and the displacement scale filed 3062B are not present.

No-Memory Access Instruction Templates—Full Round Control Type Operation

In the no memory access full round control type operation 3010 instruction template, the beta field 3054 is interpreted as a round control field 3054A, whose content(s) provide static rounding. While in the described embodiments of the disclosure the round control field 3054A includes a suppress all floating point exceptions (SAE) field 3056 and a round operation control field 3058, alternative embodiments may support may encode both these concepts into the same field or only have one or the other of these concepts/fields (e.g., may have only the round operation control field 3058).

SAE field 3056—its content distinguishes whether or not to disable the exception event reporting; when the SAE field's 3056 content indicates suppression is enabled, a given instruction does not report any kind of floating-point exception flag and does not raise any floating point exception handler.

Round operation control field 3058—its content distinguishes which one of a group of rounding operations to perform (e.g., Round-up, Round-down, Round-towards-zero and Round-to-nearest). Thus, the round operation control field 3058 allows for the changing of the rounding mode on a per instruction basis. In one embodiment of the disclosure where a processor includes a control register for specifying rounding modes, the round operation control field's 3050 content overrides that register value.

No Memory Access Instruction Templates—Data Transform Type Operation

In the no memory access data transform type operation 3015 instruction template, the beta field 3054 is interpreted as a data transform field 3054B, whose content distinguishes which one of a number of data transforms is to be performed (e.g., no data transform, swizzle, broadcast).

In the case of a memory access 3020 instruction template of class A, the alpha field 3052 is interpreted as an eviction hint field 3052B, whose content distinguishes which one of the eviction hints is to be used (in FIG. 30A, temporal 3052B.1 and non-temporal 3052B.2 are respectively specified for the memory access, temporal 3025 instruction template and the memory access, non-temporal 3030 instruction template), while the beta field 3054 is interpreted as a data manipulation field 3054C, whose content distinguishes which one of a number of data manipulation operations (also known as primitives) is to be performed (e.g., no manipulation; broadcast; up conversion of a source; and down conversion of a destination). The memory access 3020 instruction templates include the scale field 3060, and optionally the displacement field 3062A or the displacement scale field 3062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 3052 is interpreted as a write mask control (Z) field 3052C, whose content distinguishes whether the write masking controlled by the write mask field 3070 should be a merging or a zeroing.

In the case of the non-memory access 3005 instruction templates of class B, part of the beta field 3054 is interpreted as an RL field 3057A, whose content distinguishes which one of the different augmentation operation types are to be performed (e.g., round 3057A.1 and vector length (VSIZE) 3057A.2 are respectively specified for the no memory access, write mask control, partial round control type operation 3012 instruction template and the no memory access, write mask control, VSIZE type operation 3017 instruction template), while the rest of the beta field 3054 distinguishes which of the operations of the specified type is to be performed. In the no memory access 3005 instruction templates, the scale field 3060, the displacement field 3062A, and the displacement scale filed 3062B are not present.

In the no memory access, write mask control, partial round control type operation 3010 instruction template, the rest of the beta field 3054 is interpreted as a round operation field 3059A and exception event reporting is disabled (a given instruction does not report any kind of floating-point exception flag and does not raise any floating point exception handler).

Round operation control field 3059A—just as round operation control field 3058, its content distinguishes which one of a group of rounding operations to perform (e.g., Round-up, Round-down, Round-towards-zero and Round-to-nearest). Thus, the round operation control field 3059A allows for the changing of the rounding mode on a per instruction basis. In one embodiment of the disclosure where a processor includes a control register for specifying rounding modes, the round operation control field's 3050 content overrides that register value.

In the no memory access, write mask control, VSIZE type operation 3017 instruction template, the rest of the beta field 3054 is interpreted as a vector length field 3059B, whose content distinguishes which one of a number of data vector lengths is to be performed on (e.g., 128, 256, or 512 byte).

In the case of a memory access 3020 instruction template of class B, part of the beta field 3054 is interpreted as a broadcast field 3057B, whose content distinguishes whether or not the broadcast type data manipulation operation is to be performed, while the rest of the beta field 3054 is interpreted the vector length field 3059B. The memory access 3020 instruction templates include the scale field 3060, and optionally the displacement field 3062A or the displacement scale field 3062B.

With regard to the generic vector friendly instruction format 3000, a full opcode field 3074 is shown including the format field 3040, the base operation field 3042, and the data element width field 3064. While one embodiment is shown where the full opcode field 3074 includes all of these fields, the full opcode field 3074 includes less than all of these fields in embodiments that do not support all of them. The full opcode field 3074 provides the operation code (opcode).

The augmentation operation field 3050, the data element width field 3064, and the write mask field 3070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 31 is a block diagram illustrating an exemplary specific vector friendly instruction format according to embodiments of the disclosure. FIG. 31 shows a specific vector friendly instruction format 3100 that is specific in the sense that it specifies the location, size, interpretation, and order of the fields, as well as values for some of those fields. The specific vector friendly instruction format 3100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 30 into which the fields from FIG. 31 map are illustrated.

It should be understood that, although embodiments of the disclosure are described with reference to the specific vector friendly instruction format 3100 in the context of the generic vector friendly instruction format 3000 for illustrative purposes, the disclosure is not limited to the specific vector friendly instruction format 3100 except where claimed. For example, the generic vector friendly instruction format 3000 contemplates a variety of possible sizes for the various fields, while the specific vector friendly instruction format 3100 is shown as having fields of specific sizes. By way of specific example, while the data element width field 3064 is illustrated as a one bit field in the specific vector friendly instruction format 3100, the disclosure is not so limited (that is, the generic vector friendly instruction format 3000 contemplates other sizes of the data element width field 3064).

The generic vector friendly instruction format 3000 includes the following fields listed below in the order illustrated in FIG. 31A.

EVEX Prefix (Bytes 0-3) 3102—is encoded in a four-byte form.

Format Field 3040 (EVEX Byte 0, bits [7:0])—the first byte (EVEX Byte 0) is the format field 3040 and it contains 0x62 (the unique value used for distinguishing the vector friendly instruction format in one embodiment of the disclosure).

The second-fourth bytes (EVEX Bytes 1-3) include a number of bit fields providing specific capability.

REX field 3105 (EVEX Byte 1, bits [7-5])—consists of a EVEX.R bit field (EVEX Byte 1, bit [7]—R), EVEX.X bit field (EVEX byte 1, bit [6]—X), and 3057 BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 3010—this is the first part of the REX' field 3010 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 3115 (EVEX byte 1, bits [3:0]—mmmm)—its content encodes an implied leading opcode byte (0F, 0F 38, or 0F 3).

Data element width field 3064 (EVEX byte 2, bit [7]—W)—is represented by the notation EVEX.W. EVEX.W is used to define the granularity (size) of the datatype (either 32-bit data elements or 64-bit data elements).

EVEX.vvvv 3120 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 3120 encodes the 4 low-order bits of the first source register specifier stored in inverted (1s complement) form. Depending on the instruction, an extra different EVEX bit field is used to extend the specifier size to 32 registers.

EVEX.U 3068 Class field (EVEX byte 2, bit [2]—U)—If EVEX.U=0, it indicates class A or EVEX.U0; if EVEX.U=1, it indicates class B or EVEX.U1.

Prefix encoding field 3125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 3052 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 3054 (EVEX byte 3, bits [6:4]—SSS, also known as EVEX.$s_{2-0}$, EVEX.$r_{2-0}$, EVEX.rr1, EVEX.LL0, EVEX.LLB; also illustrated with PP(3)—as previously described, this field is context specific.

REX' field 3010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 3070 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 3130 (Byte 4) is also known as the opcode byte. Part of the opcode is specified in this field.

MOD R/M Field 3140 (Byte 5) includes MOD field 3142, Reg field 3144, and R/M field 3146. As previously described, the MOD field's 3142 content distinguishes between memory access and non-memory access operations. The role of Reg field 3144 can be summarized to two situations: encoding either the destination register operand or a source register operand, or be treated as an opcode extension and not used to encode any instruction operand. The role of R/M field 3146 may include the following: encoding the instruction operand that references a memory address, or encoding either the destination register operand or a source register operand.

Scale, Index, Base (SIB) Byte (Byte 6)—As previously described, the scale field's 3050 content is used for memory address generation. SIB.xxx 3154 and SIB.bbb 3156—the contents of these fields have been previously referred to with regard to the register indexes Xxxx and Bbbb.

Displacement field 3062A (Bytes 7-10)—when MOD field 3142 contains 10, bytes 7-10 are the displacement field 3062A, and it works the same as the legacy 32-bit displacement (disp32) and works at byte granularity.

Displacement factor field 3062B (Byte 7)—when MOD field 3142 contains 01, byte 7 is the displacement factor field 3062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 3062B is a reinterpretation of disp8; when using displacement factor field 3062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 3062B substitutes the legacy x86 instruction set 8-bit displacement. Thus, the displacement factor field 3062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 3072 operates as previously described.

Full Opcode Field

FIG. 31B is a block diagram illustrating the fields of the specific vector friendly instruction format 3100 that make up the full opcode field 3074 according to one embodiment of the disclosure. Specifically, the full opcode field 3074 includes the format field 3040, the base operation field 3042, and the data element width (W) field 3064. The base operation field 3042 includes the prefix encoding field 3125, the opcode map field 3115, and the real opcode field 3130.

Register Index Field

FIG. 31C is a block diagram illustrating the fields of the specific vector friendly instruction format 3100 that make up the register index field 3044 according to one embodiment of the disclosure. Specifically, the register index field 3044 includes the REX field 3105, the REX' field 3110, the MODR/M.reg field 3144, the MODR/M.r/m field 3146, the VVVV field 3120, xxx field 3154, and the bbb field 3156.

Augmentation Operation Field

Figure 31D:
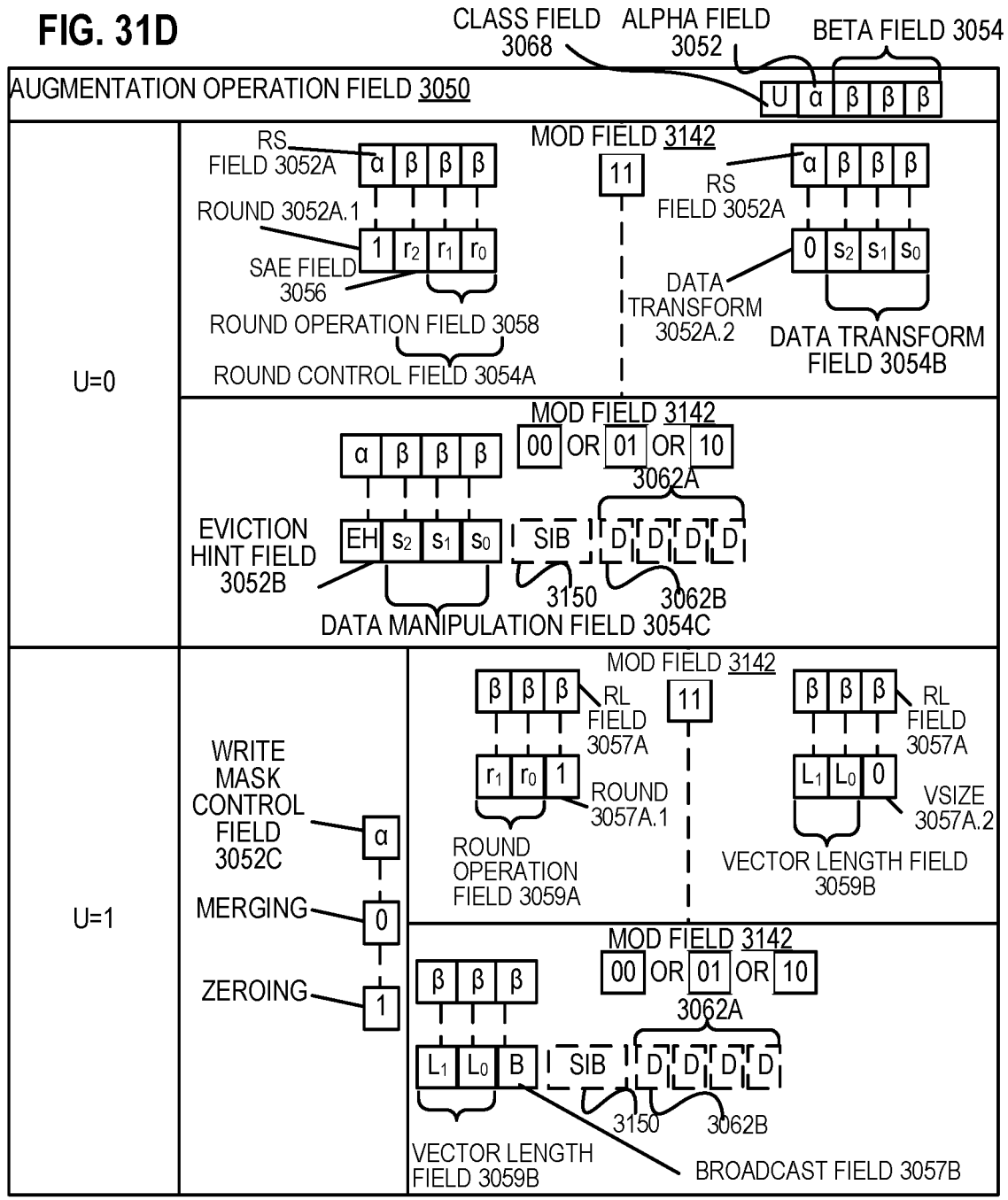
FIG. 31D is a block diagram illustrating the fields of the specific vector friendly instruction format in FIG. 31A that make up the augmentation operation field 3050 according to one embodiment of the disclosure.

FIG. 31D is a block diagram illustrating the fields of the specific vector friendly instruction format 3100 that make up the augmentation operation field 3050 according to one embodiment of the disclosure. When the class (U) field 3068 contains 0, it signifies EVEX.U0 (class A 3068A); when it contains 1, it signifies EVEX.U1 (class B 3068B). When U=0 and the MOD field 3142 contains 11 (signifying a no memory access operation), the alpha field 3052 (EVEX byte 3, bit [7]—EH) is interpreted as the rs field 3052A. When the rs field 3052A contains a 1 (round 3052A.1), the beta field 3054 (EVEX byte 3, bits [6:4]—SSS) is interpreted as the round control field 3054A. The round control field 3054A includes a one bit SAE field 3056 and a two bit round operation field 3058. When the rs field 3052A contains a 0 (data transform 3052A.2), the beta field 3054 (EVEX byte 3, bits [6:4]—SSS) is interpreted as a three bit data transform field 3054B. When U=0 and the MOD field 3142 contains 00, 01, or 10 (signifying a memory access operation), the alpha field 3052 (EVEX byte 3, bit [7]—EH) is interpreted as the eviction hint (EH) field 3052B and the beta field 3054 (EVEX byte 3, bits [6:4]—SSS) is interpreted as a three bit data manipulation field 3054C.

When U=1, the alpha field 3052 (EVEX byte 3, bit [7]—EH) is interpreted as the write mask control (Z) field 3052C. When U=1 and the MOD field 3142 contains 11 (signifying a no memory access operation), part of the beta field 3054 (EVEX byte 3, bit [4]—$S_0$) is interpreted as the RL field 3057A; when it contains a 1 (round 3057A.1) the rest of the beta field 3054 (EVEX byte 3, bit [6-5]—$S_{2-1}$) is interpreted as the round operation field 3059A, while when the RL field 3057A contains a 0 (VSIZE 3057.A2) the rest of the beta field 3054 (EVEX byte 3, bit [6-5]—$S_{2-1}$) is interpreted as the vector length field 3059B (EVEX byte 3, bit [6-5]—$L_{1-0}$). When U=1 and the MOD field 3142 contains 00, 01, or 10 (signifying a memory access operation), the beta field 3054 (EVEX byte 3, bits [6:4]—SSS) is interpreted as the vector length field 3059B (EVEX byte 3, bit [6-5]—$L_{1-0}$) and the broadcast field 3057B (EVEX byte 3, bit [4]—B).

Exemplary Register Architecture

Figure 32:
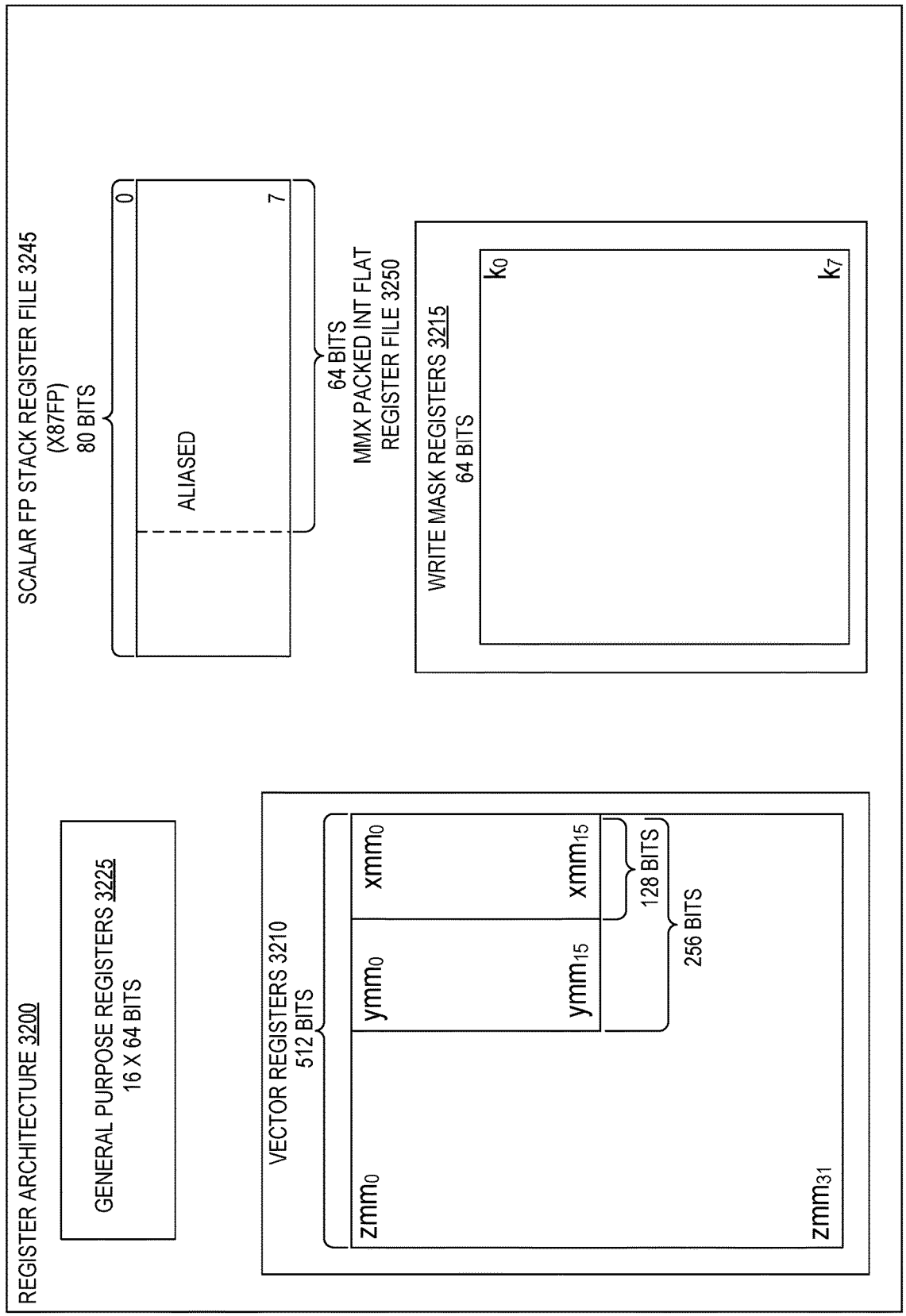
FIG. 32 is a block diagram of a register architecture according to one embodiment of the disclosure

FIG. 32 is a block diagram of a register architecture 3200 according to one embodiment of the disclosure. In the embodiment illustrated, there are 32 vector registers 3210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 3100 operates on these overlaid register file as illustrated in the below tables.

| Adjustable Vector Length | Class | Operations | Registers |
|---|---|---|---|
| Instruction Templates that do not include the vector length field 3059B | A (FIG. 30A; U = 0) | 3010, 3015, 3025, 3030 | zmm registers (the vector length is 64 byte) |
| | B (FIG. 30B; U = 1) | 3012 | zmm registers (the vector length is 64 byte) |
| Instruction templates that do include the vector length field 3059B | B (FIG. 30B; U = 1) | 3017, 3027 | zmm, ymm, or xmm registers (the vector length is 64 byte, 32 byte, or 16 byte) depending on the vector length field 3059B |

In other words, the vector length field 3059B selects between a maximum length and one or more other shorter lengths, where each such shorter length is half the length of the preceding length; and instructions templates without the vector length field 3059B operate on the maximum vector length. Further, in one embodiment, the class B instruction templates of the specific vector friendly instruction format 3100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 3215—in the embodiment illustrated, there are 8 write mask registers (k0 through k7), each 64 bits in size. In an alternate embodiment, the write mask registers 3215 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 3225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3245, on which is aliased the MMX packed integer flat register file 3250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 33A is a block diagram illustrating both an exemplary in-order pipeline and an exemplary register renaming, out-of-order issue/execution pipeline according to embodiments of the disclosure. FIG. 33B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 33A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 33A, a processor pipeline 3300 includes a fetch stage 3302, a length decode stage 3304, a decode stage 3306, an allocation stage 3308, a renaming stage 3310, a scheduling (also known as a dispatch or issue) stage 3312, a register read/memory read stage 3314, an execute stage 3316, a write back/memory write stage 3318, an exception handling stage 3322, and a commit stage 3324.

FIG. 33B shows processor core 3390 including a front end unit 3330 coupled to an execution engine unit 3350, and both are coupled to a memory unit 3370. The core 3390 may be a reduced instruction set computing (RISC) core, a complex instruction set computing (CISC) core, a very long instruction word (VLIW) core, or a hybrid or alternative core type. As yet another option, the core 3390 may be a special-purpose core, such as, for example, a network or communication core, compression engine, coprocessor core, general purpose computing graphics processing unit (GPGPU) core, graphics core, or the like.

The front end unit 3330 includes a branch prediction unit 3332 coupled to an instruction cache unit 3334, which is coupled to an instruction translation lookaside buffer (TLB) 3336, which is coupled to an instruction fetch unit 3338, which is coupled to a decode unit 3340. The decode unit 3340 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 3340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3390 includes a microcode ROM or other medium that stores microcode for certain macro-instructions (e.g., in decode unit 3340 or otherwise within the front end unit 3330). The decode unit 3340 is coupled to a rename/allocator unit 3352 in the execution engine unit 3350.

The execution engine unit 3350 includes the rename/allocator unit 3352 coupled to a retirement unit 3354 and a set of one or more scheduler unit(s) 3356. The scheduler unit(s) 3356 represents any number of different schedulers, including reservations stations, central instruction window, etc. The scheduler unit(s) 3356 is coupled to the physical register file(s) unit(s) 3358. Each of the physical register file(s) units 3358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3358 comprises a vector registers unit, a write mask registers unit, and a scalar registers unit. These register units may provide architectural vector registers, vector mask registers, and general purpose registers. The physical register file(s) unit(s) 3358 is overlapped by the retirement unit 3354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3354 and the physical register file(s) unit(s) 3358 are coupled to the execution cluster(s) 3360. The execution cluster(s) 3360 includes a set of one or more execution units 3362 and a set of one or more memory access units 3364. The execution units 3362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3356, physical register file(s) unit(s) 3358, and execution cluster(s) 3360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3364). It should also be understood that where separate pipelines are used, one or more of these pipelines may be out-of-order issue/execution and the rest in-order.

The set of memory access units 3364 is coupled to the memory unit 3370, which includes a data TLB unit 3372 coupled to a data cache unit 3374 coupled to a level 2 (L2) cache unit 3376. In one exemplary embodiment, the memory access units 3364 may include a load unit, a store address unit, and a store data unit, each of which is coupled to the data TLB unit 3372 in the memory unit 3370. The instruction cache unit 3334 is further coupled to a level 2 (L2) cache unit 3376 in the memory unit 3370. The L2 cache unit 3376 is coupled to one or more other levels of cache and eventually to a main memory.

In certain embodiments, a prefetch circuit 3378 is included to prefetch data, for example, to predict access addresses and bring the data for those addresses into a cache or caches (e.g., from memory 3380). In one embodiment, prefetch circuit 3378 is an instance of the prefetch circuit in FIG. 3B.

By way of example, the exemplary register renaming, out-of-order issue/execution core architecture may implement the pipeline 3300 as follows: 1) the instruction fetch 3338 performs the fetch and length decoding stages 3302 and 3304; 2) the decode unit 3340 performs the decode stage 3306; 3) the rename/allocator unit 3352 performs the allocation stage 3308 and renaming stage 3310; 4) the scheduler unit(s) 3356 performs the schedule stage 3312; 5) the physical register file(s) unit(s) 3358 and the memory unit 3370 perform the register read/memory read stage 3314; the execution cluster 3360 perform the execute stage 3316; 6) the memory unit 3370 and the physical register file(s) unit(s) 3358 perform the write back/memory write stage 3318; 7) various units may be involved in the exception handling stage 3322; and 8) the retirement unit 3354 and the physical register file(s) unit(s) 3358 perform the commit stage 3324.

The core 3390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 3334/3374 and a shared L2 cache unit 3376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 34B:
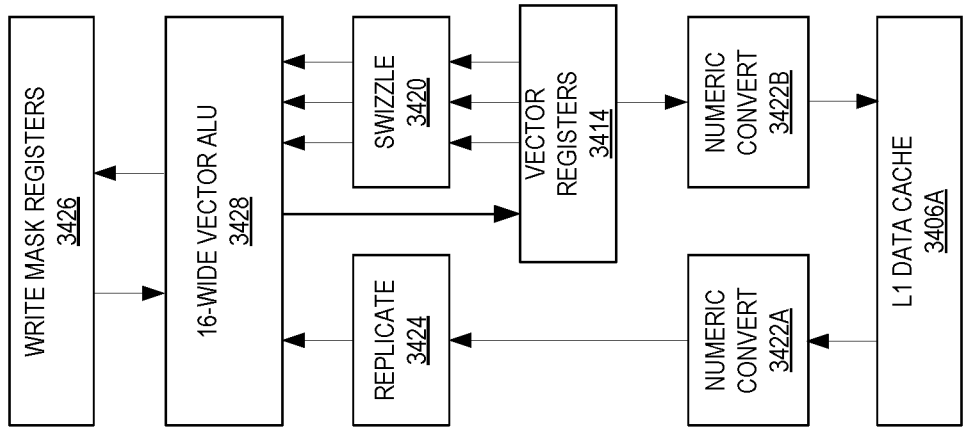
FIG. 34B is an expanded view of part of the processor core in FIG. 34A according to embodiments of the disclosure.
Figure 34A:
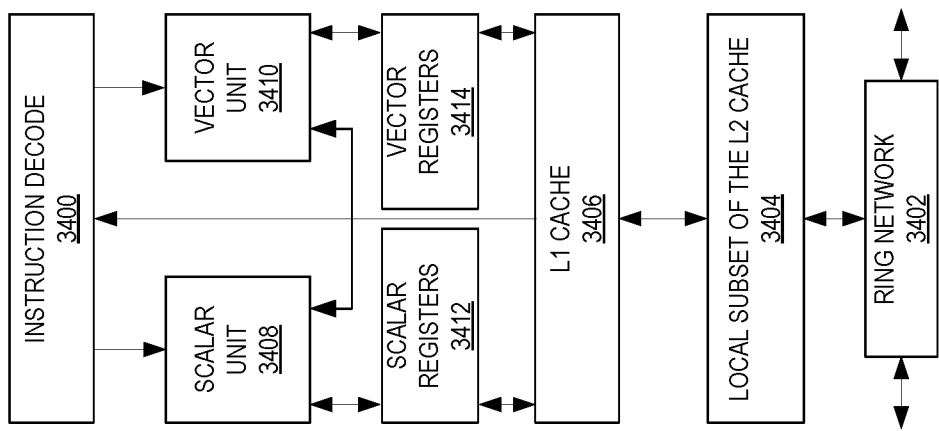
FIG. 34A is a block diagram of a single processor core, along with its connection to the on-die interconnect network and with its local subset of the Level 2 (L2) cache, according to embodiments of the disclosure.

FIGS. 34A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 34A is a block diagram of a single processor core, along with its connection to the on-die interconnect network 3402 and with its local subset of the Level 2 (L2) cache 3404, according to embodiments of the disclosure. In one embodiment, an instruction decode unit 3400 supports the x86 instruction set with a packed data instruction set extension. An L1 cache 3406 allows low-latency accesses to cache memory into the scalar and vector units. While in one embodiment (to simplify the design), a scalar unit 3408 and a vector unit 3410 use separate register sets (respectively, scalar registers 3412 and vector registers 3414) and data transferred between them is written to memory and then read back in from a level 1 (L1) cache 3406, alternative embodiments of the disclosure may use a different approach (e.g., use a single register set or include a communication path that allow data to be transferred between the two register files without being written and read back).

The local subset of the L2 cache 3404 is part of a global L2 cache that is divided into separate local subsets, one per processor core. Each processor core has a direct access path to its own local subset of the L2 cache 3404. Data read by a processor core is stored in its L2 cache subset 3404 and can be accessed quickly, in parallel with other processor cores accessing their own local L2 cache subsets. Data written by a processor core is stored in its own L2 cache subset 3404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 34B is an expanded view of part of the processor core in FIG. 34A according to embodiments of the disclosure. FIG. 34B includes an L1 data cache 3406A part of the L1 cache 3404, as well as more detail regarding the vector unit 3410 and the vector registers 3414. Specifically, the vector unit 3410 is a 16-wide vector processing unit (VPU) (see the 16-wide ALU 3428), which executes one or more of integer, single-precision float, and double-precision float instructions. The VPU supports swizzling the register inputs with swizzle unit 3420, numeric conversion with numeric convert units 3422A-B, and replication with replication unit 3424 on the memory input. Write mask registers 3426 allow predicating resulting vector writes.

FIG. 35 is a block diagram of a processor 3500 that may have more than one core, may have an integrated memory controller, and may have integrated graphics according to embodiments of the disclosure. The solid lined boxes in FIG. 35 illustrate a processor 3500 with a single core 3502A, a system agent 3510, a set of one or more bus controller units 3516, while the optional addition of the dashed lined boxes illustrates an alternative processor 3500 with multiple cores 3502A-N, a set of one or more integrated memory controller unit(s) 3514 in the system agent unit 3510, and special purpose logic 3508.

Thus, different implementations of the processor 3500 may include: 1) a CPU with the special purpose logic 3508 being integrated graphics and/or scientific (throughput) logic (which may include one or more cores), and the cores 3502A-N being one or more general purpose cores (e.g., general purpose in-order cores, general purpose out-of-order cores, a combination of the two); 2) a coprocessor with the cores 3502A-N being a large number of special purpose cores intended primarily for graphics and/or scientific (throughput); and 3) a coprocessor with the cores 3502A-N being a large number of general purpose in-order cores. Thus, the processor 3500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3506, and external memory (not shown) coupled to the set of integrated memory controller units 3514. The set of shared cache units 3506 may include one or more mid-level caches, such as level 2 (L2), level 3 (L3), level 4 (L4), or other levels of cache, a last level cache (LLC), and/or combinations thereof. While in one embodiment a ring based interconnect unit 3512 interconnects the integrated graphics logic 3508, the set of shared cache units 3506, and the system agent unit 3510/integrated memory controller unit(s) 3514, alternative embodiments may use any number of well-known techniques for interconnecting such units. In one embodiment, coherency is maintained between one or more cache units 3506 and cores 3502-A-N.

In some embodiments, one or more of the cores 3502A-N are capable of multithreading. The system agent 3510 includes those components coordinating and operating cores 3502A-N. The system agent unit 3510 may include for example a power control unit (PCU) and a display unit. The PCU may be or include logic and components needed for regulating the power state of the cores 3502A-N and the integrated graphics logic 3508. The display unit is for driving one or more externally connected displays.

The cores 3502A-N may be homogenous or heterogeneous in terms of architecture instruction set; that is, two or more of the cores 3502A-N may be capable of execution the same instruction set, while others may be capable of executing only a subset of that instruction set or a different instruction set.

Exemplary Computer Architectures

FIGS. 36-39 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 36:
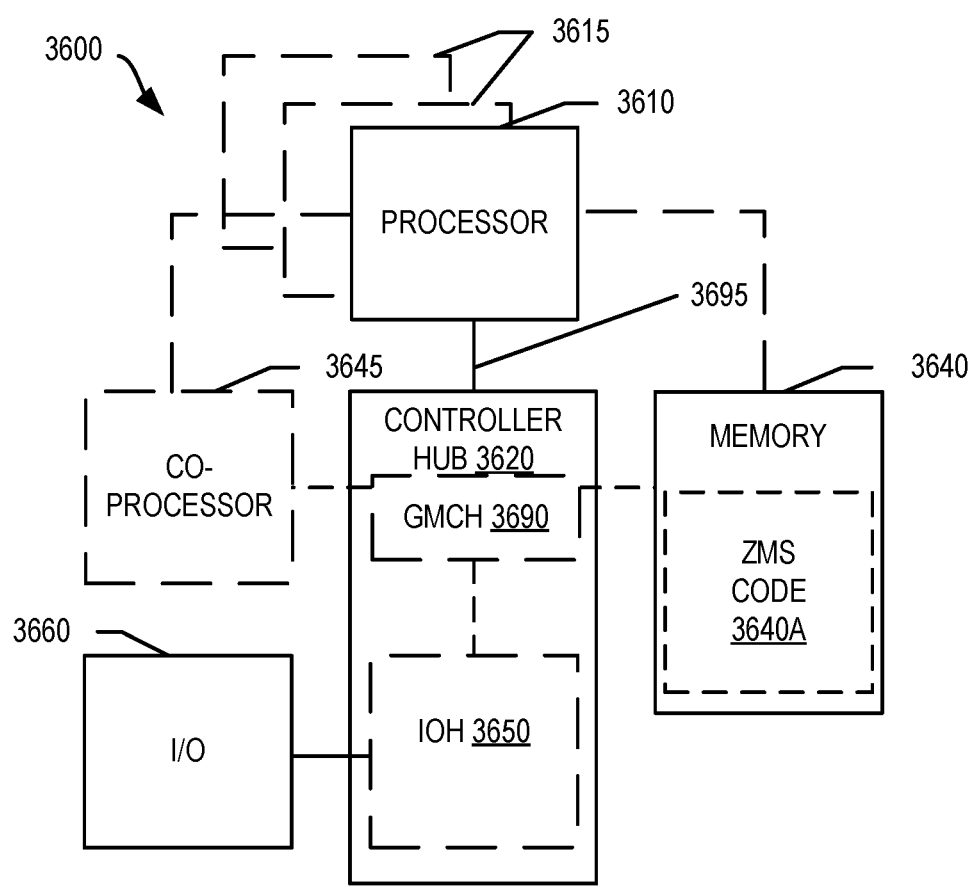
FIG. 36 is a block diagram of a system in accordance with one embodiment of the present disclosure.

Referring now to FIG. 36, shown is a block diagram of a system 3600 in accordance with one embodiment of the present disclosure. The system 3600 may include one or more processors 3610, 3615, which are coupled to a controller hub 3620. In one embodiment the controller hub 3620 includes a graphics memory controller hub (GMCH) 3690 and an Input/Output Hub (IOH) 3650 (which may be on separate chips); the GMCH 3690 includes memory and graphics controllers to which are coupled memory 3640 and a coprocessor 3645; the IOH 3650 is couples input/output (I/O) devices 3660 to the GMCH 3690. Alternatively, one or both of the memory and graphics controllers are integrated within the processor (as described herein), the memory 3640 and the coprocessor 3645 are coupled directly to the processor 3610, and the controller hub 3620 in a single chip with the IOH 3650. Memory 3640 may include ZMS code 3640A, for example, to store code that when executed causes a processor to perform any method of this disclosure.

The optional nature of additional processors 3615 is denoted in FIG. 36 with broken lines. Each processor 3610, 3615 may include one or more of the processing cores described herein and may be some version of the processor 3500.

The memory 3640 may be, for example, dynamic random access memory (DRAM), phase change memory (PCM), or a combination of the two. For at least one embodiment, the controller hub 3620 communicates with the processor(s) 3610, 3615 via a multi-drop bus, such as a frontside bus (FSB), point-to-point interface such as Quickpath Interconnect (QPI), or similar connection 3695.

In one embodiment, the coprocessor 3645 is a special-purpose processor, such as, for example, a high-throughput MIC processor, a network or communication processor, compression engine, graphics processor, GPGPU, embedded processor, or the like. In one embodiment, controller hub 3620 may include an integrated graphics accelerator.

There can be a variety of differences between the physical resources 3610, 3615 in terms of a spectrum of metrics of merit including architectural, microarchitectural, thermal, power consumption characteristics, and the like.

In one embodiment, the processor 3610 executes instructions that control data processing operations of a general type. Embedded within the instructions may be coprocessor instructions. The processor 3610 recognizes these coprocessor instructions as being of a type that should be executed by the attached coprocessor 3645. Accordingly, the processor 3610 issues these coprocessor instructions (or control signals representing coprocessor instructions) on a coprocessor bus or other interconnect, to coprocessor 3645. Coprocessor(s) 3645 accept and execute the received coprocessor instructions.

Figure 37:
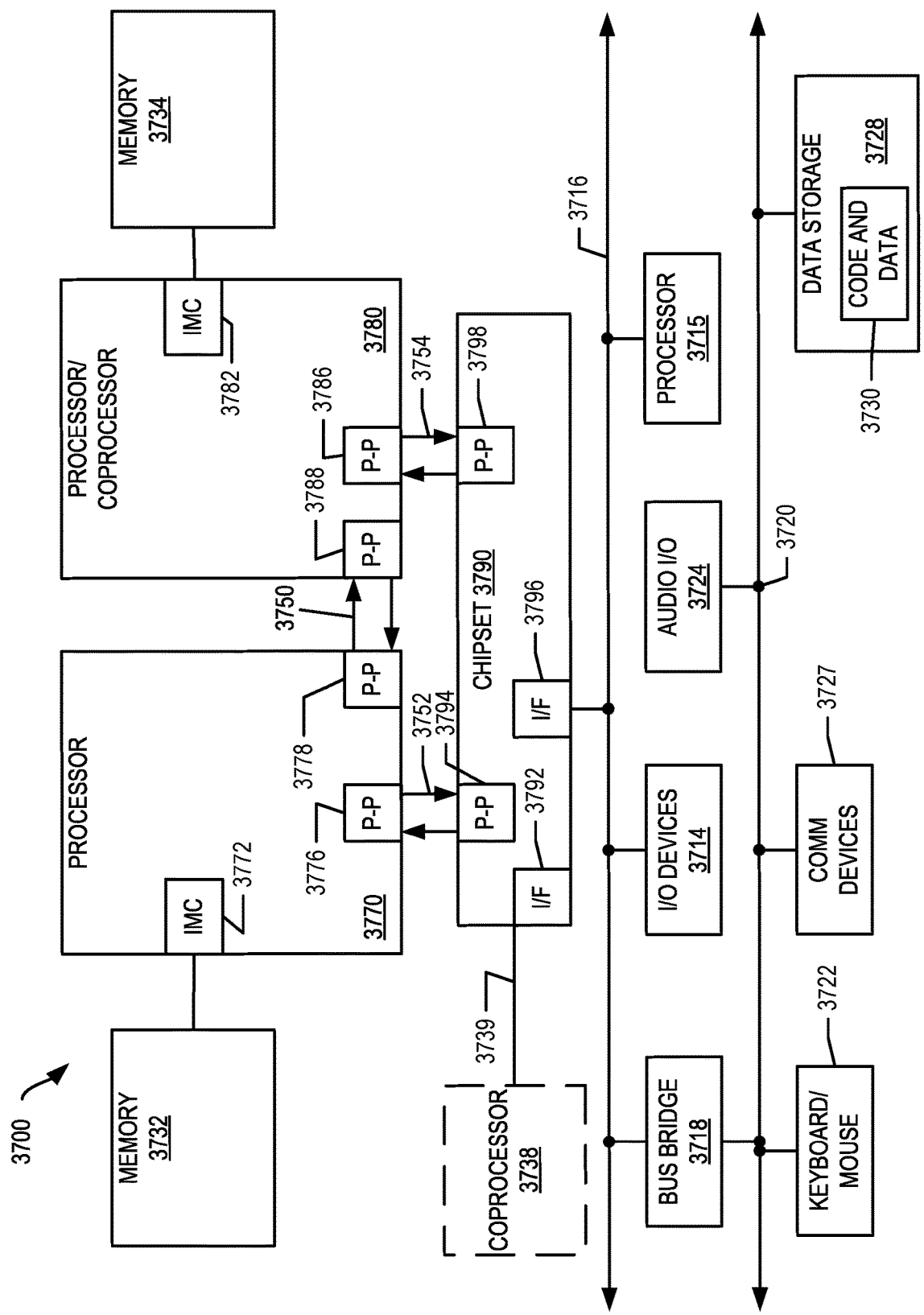
FIG. 37 is a block diagram of a more specific exemplary system in accordance with an embodiment of the present disclosure.

Referring now to FIG. 37, shown is a block diagram of a first more specific exemplary system 3700 in accordance with an embodiment of the present disclosure. As shown in FIG. 37, multiprocessor system 3700 is a point-to-point interconnect system, and includes a first processor 3770 and a second processor 3780 coupled via a point-to-point interconnect 3750. Each of processors 3770 and 3780 may be some version of the processor 3500. In one embodiment of the disclosure, processors 3770 and 3780 are respectively processors 3610 and 3615, while coprocessor 3738 is coprocessor 3645. In another embodiment, processors 3770 and 3780 are respectively processor 3610 coprocessor 3645.

Processors 3770 and 3780 are shown including integrated memory controller (IMC) units 3772 and 3782, respectively. Processor 3770 also includes as part of its bus controller units point-to-point (P-P) interfaces 3776 and 3778; similarly, second processor 3780 includes P-P interfaces 3786 and 3788. Processors 3770, 3780 may exchange information via a point-to-point (P-P) interface 3750 using P-P interface circuits 3778, 3788. As shown in FIG. 37, IMCs 3772 and 3782 couple the processors to respective memories, namely a memory 3732 and a memory 3734, which may be portions of main memory locally attached to the respective processors.

Processors 3770, 3780 may each exchange information with a chipset 3790 via individual P-P interfaces 3752, 3754 using point to point interface circuits 3776, 3794, 3786, 3798. Chipset 3790 may optionally exchange information with the coprocessor 3738 via a high-performance interface 3739. In one embodiment, the coprocessor 3738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3790 may be coupled to a first bus 3716 via an interface 3796. In one embodiment, first bus 3716 may be a Peripheral Component Interconnect (PCI) bus, or a bus such as a PCI Express bus or another third generation I/O interconnect bus, although the scope of the present disclosure is not so limited.

As shown in FIG. 37, various I/O devices 3714 may be coupled to first bus 3716, along with a bus bridge 3718 which couples first bus 3716 to a second bus 3720. In one embodiment, one or more additional processor(s) 3715, such as coprocessors, high-throughput MIC processors, GPGPU's, accelerators (such as, e.g., graphics accelerators or digital signal processing (DSP) units), field programmable gate arrays, or any other processor, are coupled to first bus 3716. In one embodiment, second bus 3720 may be a low pin count (LPC) bus. Various devices may be coupled to a second bus 3720 including, for example, a keyboard and/or mouse 3722, communication devices 3727 and a storage unit 3728 such as a disk drive or other mass storage device which may include instructions/code and data 3730, in one embodiment. Further, an audio I/O 3724 may be coupled to the second bus 3720. Note that other architectures are possible. For example, instead of the point-to-point architecture of FIG. 37, a system may implement a multi-drop bus or other such architecture.

Figure 38:
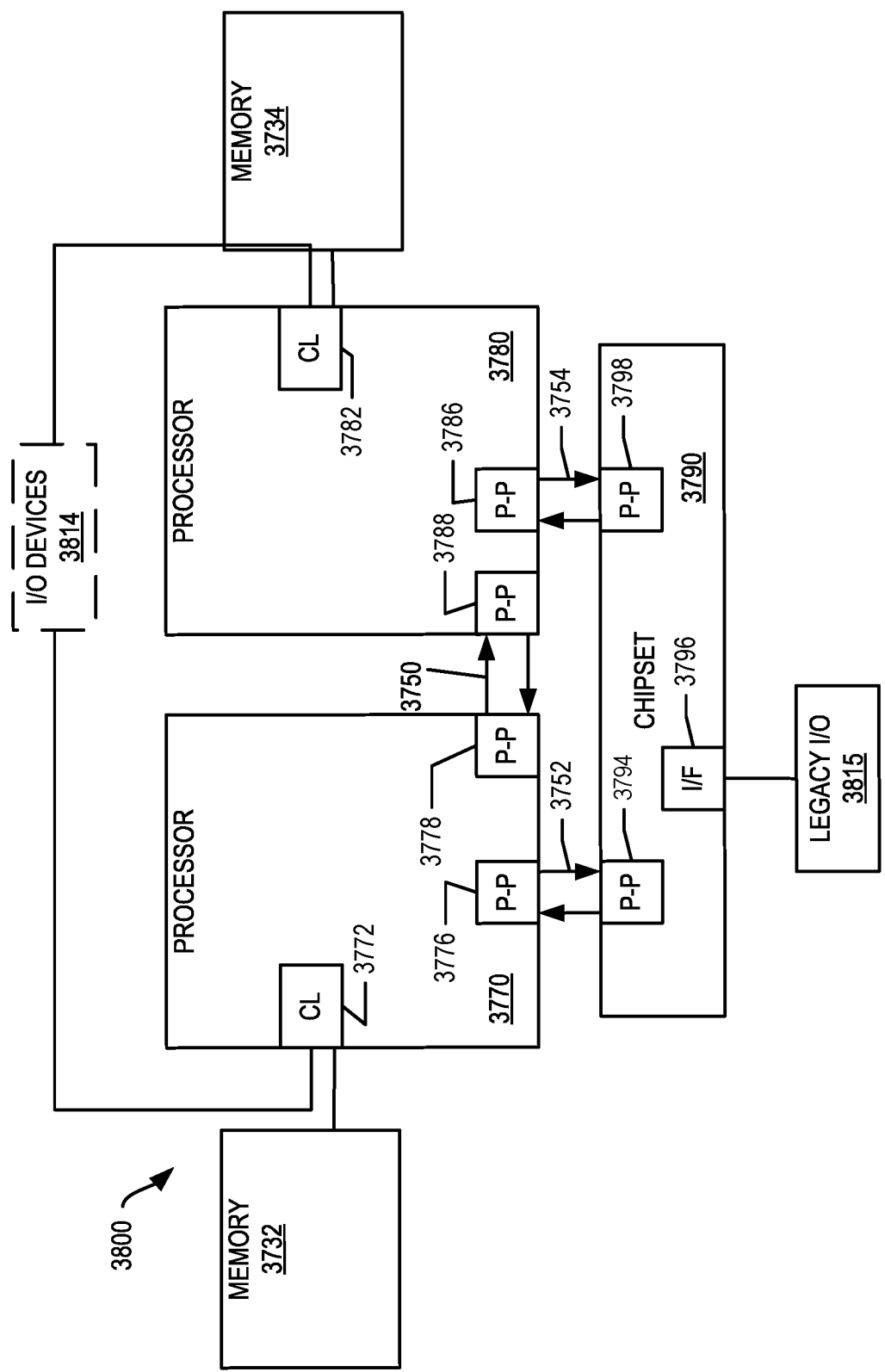
FIG. 38, shown is a block diagram of a second more specific exemplary system in accordance with an embodiment of the present disclosure.

Referring now to FIG. 38, shown is a block diagram of a second more specific exemplary system 3800 in accordance with an embodiment of the present disclosure Like elements in FIGS. 37 and 38 bear like reference numerals, and certain aspects of FIG. 37 have been omitted from FIG. 38 in order to avoid obscuring other aspects of FIG. 38.

FIG. 38 illustrates that the processors 3770, 3780 may include integrated memory and I/O control logic ("CL") 3772 and 3782, respectively. Thus, the CL 3772, 3782 include integrated memory controller units and include I/O control logic. FIG. 38 illustrates that not only are the memories 3732, 3734 coupled to the CL 3772, 3782, but also that I/O devices 3814 are also coupled to the control logic 3772, 3782. Legacy I/O devices 3815 are coupled to the chipset 3790.

Figure 39:
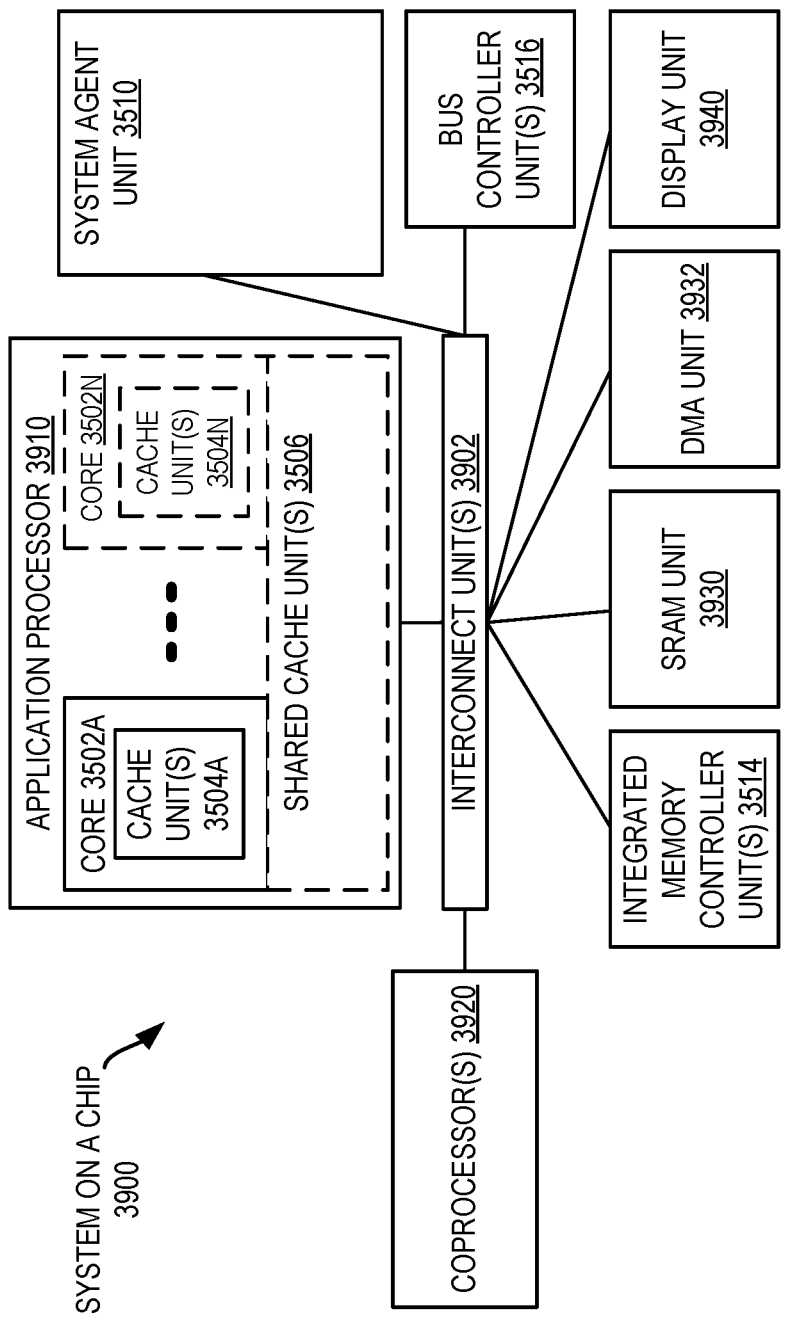
FIG. 39, shown is a block diagram of a system on a chip (SoC) in accordance with an embodiment of the present disclosure.

Referring now to FIG. 39, shown is a block diagram of a SoC 3900 in accordance with an embodiment of the present disclosure. Similar elements in FIG. 35 bear like reference numerals. Also, dashed lined boxes are optional features on more advanced SoCs. In FIG. 39, an interconnect unit(s) 3902 is coupled to: an application processor 3910 which includes a set of one or more cores 202A-N and shared cache unit(s) 3506; a system agent unit 3510; a bus controller unit(s) 3516; an integrated memory controller unit(s) 3514; a set or one or more coprocessors 3920 which may include integrated graphics logic, an image processor, an audio processor, and a video processor; an static random access memory (SRAM) unit 3930; a direct memory access (DMA) unit 3932; and a display unit 3940 for coupling to one or more external displays. In one embodiment, the coprocessor(s) 3920 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3730 illustrated in FIG. 37, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 40:
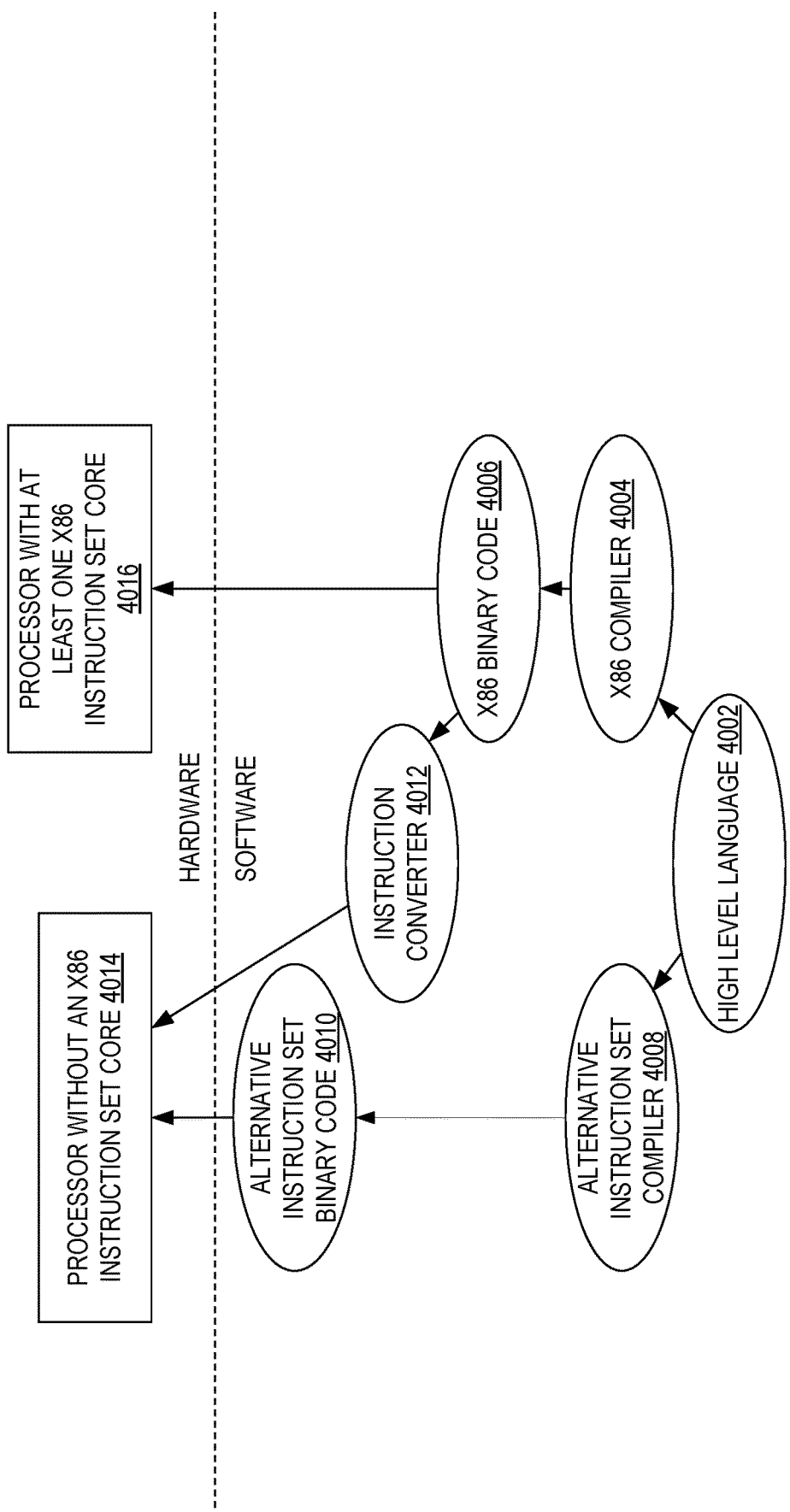
FIG. 40 is a block diagram contrasting the use of a software instruction converter to convert binary instructions in a source instruction set to binary instructions in a target instruction set according to embodiments of the disclosure.

FIG. 40 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 40 shows a program in a high level language 4002 may be compiled using an x86 compiler 4004 to generate x86 binary code 4006 that may be natively executed by a processor with at least one x86 instruction set core 4016. The processor with at least one x86 instruction set core 4016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4004 represents a compiler that is operable to generate x86 binary code 4006 (e.g., object code) that can, with or without additional linkage processing, be executed on the processor with at least one x86 instruction set core 4016. Similarly, FIG. 40 shows the program in the high level language 4002 may be compiled using an alternative instruction set compiler 4008 to generate alternative instruction set binary code 4010 that may be natively executed by a processor without at least one x86 instruction set core 4014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 4012 is used to convert the x86 binary code 4006 into code that may be natively executed by the processor without an x86 instruction set core 4014. This converted code is not likely to be the same as the alternative instruction set binary code 4010 because an instruction converter capable of this is difficult to make; however, the converted code will accomplish the general operation and be made up of instructions from the alternative instruction set. Thus, the instruction converter 4012 represents software, firmware, hardware, or a combination thereof that, through emulation, simulation or any other process, allows a processor or other electronic device that does not have an x86 instruction set processor or core to execute the x86 binary code 4006.

What is claimed is:

1. A hardware processor comprising:
    an execution unit to execute an instruction to request access to a block of memory through a pointer to the block of memory; and
    a memory controller circuit to allow access to the block of memory when an allocated object tag in the pointer is validated with an allocated object tag in an entry of a capability table in memory that is indexed by an index value in the pointer, wherein the memory controller circuit is to clear the allocated object tag in the capability table when a corresponding object is deallocated.

2. The hardware processor of claim 1, wherein the memory controller circuit is to populate the entry of the capability table when allocating the block of memory for the corresponding object of a plurality of objects of object-oriented source code.

3. The hardware processor of claim 1, wherein the entry in the capability table includes a field that indicates to the memory controller circuit a type of the corresponding object.

4. The hardware processor of claim 3, wherein the memory controller circuit is to cause a fault when the allocated object tag in the pointer is not validated with the allocated object tag in the entry of the capability table, and when the type indicated by the entry of the capability table does not match a type for the pointer.

5. The hardware processor of claim 3, wherein the entry in the capability table includes a field that indicates to the memory controller circuit a size of the corresponding object.

6. The hardware processor of claim 1, wherein the pointer comprises a leading bit having an opposite value of a next bit in the pointer to cause the memory controller circuit to look up the allocated object tag in the entry of the capability table, and check the allocated object tag in the pointer with the allocated object tag in the entry of the capability table.

7. The hardware processor of claim 6, wherein the pointer further comprises a mode bit that, when set to a first value, causes the memory controller circuit to look up the allocated object tag in the entry of the capability table, and check the allocated object tag in the pointer with the allocated object tag in the entry of the capability table.

8. The hardware processor of claim 1, wherein the memory controller circuit is to check a user capability table for user pointers and check a separate, supervisor pointer table for supervisor pointers.

9. A method comprising:
    receiving a request to access a block of memory through a pointer to the block of memory;
    allowing access to the block of memory when an allocated object tag in the pointer is validated with an allocated object tag in an entry of a capability table in memory that is indexed by an index value in the pointer; and
    clearing the allocated object tag in the capability table when a corresponding object is deallocated.

10. The method of claim 9, further comprising populating the entry of the capability table when allocating the block of memory for the corresponding object of a plurality of objects of object-oriented source code.

11. The method of claim 9, wherein the entry in the capability table includes a field that indicates a type of the corresponding object.

12. The method of claim 11, further comprising causing a fault when the allocated object tag in the pointer is not validated with the allocated object tag in the entry of the capability table, and when the type indicated by the entry of the capability table does not match a type for the pointer.

13. The method of claim 11, wherein the entry in the capability table includes a field that indicates a size of the corresponding object.

14. The method of claim 9, wherein the pointer comprises a leading bit having an opposite value of a next bit in the pointer to cause a lookup of the allocated object tag in the entry of the capability table, and a check of the allocated object tag in the pointer with the allocated object tag in the entry of the capability table.

15. The method of claim 14, wherein the pointer further comprises a mode bit that, when set to a first value, causes the lookup the allocated object tag in the entry of the capability table, and the check of the allocated object tag in the pointer with the allocated object tag in the entry of the capability table.

16. The method of claim 9, further comprising checking a user capability table for user pointers and checking a separate, supervisor pointer table for supervisor pointers.

17. A non-transitory machine readable medium that stores program code that when executed by a machine causes the machine to perform a method comprising:
    receiving a request to access a block of memory through a pointer to the block of memory;
    allowing access to the block of memory when an allocated object tag in the pointer is validated with an allocated object tag in an entry of a capability table in memory that is indexed by an index value in the pointer; and clearing the allocated object tag in the capability table when a corresponding object is deallocated.

18. The non-transitory machine readable medium of claim 17, further comprising populating the entry of the capability table when allocating the block of memory for the corresponding object of a plurality of objects of object-oriented source code.

19. The non-transitory machine readable medium of claim 17, wherein the entry in the capability table includes a field that indicates a type of the corresponding object.

20. The non-transitory machine readable medium of claim 19, further comprising causing a fault when the allocated object tag in the pointer is not validated with the allocated object tag in the entry of the capability table, and when the type indicated by the entry of the capability table does not match a type for the pointer.

21. The non-transitory machine readable medium of claim 19, wherein the entry in the capability table includes a field that indicates a size of the corresponding object.

22. The non-transitory machine readable medium of claim 17, wherein the pointer comprises a leading bit having an opposite value of a next bit in the pointer to cause a lookup of the allocated object tag in the entry of the capability table, and a check of the allocated object tag in the pointer with the allocated object tag in the entry of the capability table.

23. The non-transitory machine readable medium of claim 22, wherein the pointer further comprises a mode bit that, when set to a first value, causes the lookup the allocated object tag in the entry of the capability table, and the check of the allocated object tag in the pointer with the allocated object tag in the entry of the capability table.

24. The non-transitory machine readable medium of claim 17, further comprising checking a user capability table for user pointers and checking a separate, supervisor pointer table for supervisor pointers.

* * * * *